US012056203B2

(12) United States Patent
Ilker et al.

(10) Patent No.: US 12,056,203 B2
(45) Date of Patent: Aug. 6, 2024

(54) WEBSITE KEY PAGES IDENTIFICATION AND ANALYSIS SYSTEM

(71) Applicant: Siteimprove A/S, Copenhagen (DK)

(72) Inventors: Cavit Ilker, Hareskovby (DK); Ana Urcelay Lorenzo, Copenhagen (DK); Martin Birkebæk, Copenhagen (DK)

(73) Assignee: Siteimprove A/S, Copenhagen (DK)

( * ) Notice: Subject to any disclaimer, the term of this patent is extended or adjusted under 35 U.S.C. 154(b) by 203 days.

(21) Appl. No.: 17/590,553

(22) Filed: Feb. 1, 2022

(65) Prior Publication Data

US 2023/0140454 A1 May 4, 2023

Related U.S. Application Data

(60) Provisional application No. 63/274,749, filed on Nov. 2, 2021.

(51) Int. Cl.
*G06F 16/957* (2019.01)
*G06F 16/951* (2019.01)
*H04L 67/02* (2022.01)

(52) U.S. Cl.
CPC ........ *G06F 16/9574* (2019.01); *G06F 16/951* (2019.01); *H04L 67/02* (2013.01)

(58) Field of Classification Search
CPC ............. G06F 16/9574; G06F 3/04842; G06F 16/951; G06F 3/0481; G06F 3/0482; G06F 16/957; H04L 67/02
See application file for complete search history.

(56) References Cited

U.S. PATENT DOCUMENTS

| | | | |
|---|---|---|---|
| 836,414 | A | 11/1906 | Toles |
| 6,360,235 | B1 | 3/2002 | Tilt |
| 7,231,606 | B2 | 6/2007 | Miller et al. |

(Continued)

FOREIGN PATENT DOCUMENTS

| | | |
|---|---|---|
| WO | WO 2012/027022 | 3/2012 |

OTHER PUBLICATIONS

EP Supplementary Search Report in European Application No. EP18853482, dated Mar. 29, 2020, 9 pages.

(Continued)

*Primary Examiner* — Mariela Reyes
*Assistant Examiner* — Fatima P Mina
(74) *Attorney, Agent, or Firm* — Barnes & Thornburg LLP

(57) ABSTRACT

Described herein are systems and methods for determining key website pages based on automated website analysis. A method can include identifying, by a computing system, a website to evaluate, the website having webpages, locally executing and interpreting webpages code to render the webpages as they would appear on user devices, receiving an indication that user input was received at a user device indicating selection of criteria that specify webpage characteristics, determining an initial quantity of webpages that satisfy the criteria, providing information to the user device to cause the device to present an indication of the initial quantity of webpages, designating multiple webpages as key webpages of the website based on determining that each of the multiple webpages satisfies the criteria, adding the multiple webpages to a list of key pages, and providing information to the user device to cause the device to present the list of key pages.

20 Claims, 18 Drawing Sheets

(56) References Cited

U.S. PATENT DOCUMENTS

| | | | |
|---|---|---|---|
| 7,475,067 B2 | 1/2009 | Clary et al. | |
| 7,558,795 B2 | 7/2009 | Malik et al. | |
| 7,584,435 B2 | 9/2009 | Bailey et al. | |
| 7,797,200 B2 | 9/2010 | Patrawala | |
| 7,805,428 B2 | 9/2010 | Batista Reyes et al. | |
| 8,065,410 B1 | 11/2011 | Breen et al. | |
| 8,196,104 B2 | 6/2012 | Cohrs et al. | |
| 8,447,751 B2 | 5/2013 | Stouffer et al. | |
| 8,533,684 B2 | 9/2013 | Brunet et al. | |
| 8,554,698 B2 | 10/2013 | Bando et al. | |
| 8,613,039 B2 | 12/2013 | Chen et al. | |
| 8,972,379 B1 | 3/2015 | Grieselhuber et al. | |
| 9,009,784 B2 | 4/2015 | Chen et al. | |
| 9,087,035 B1 | 7/2015 | Bandaru et al. | |
| 9,152,729 B2 | 10/2015 | Ajoku et al. | |
| 9,537,732 B2 | 1/2017 | Mukherjee et al. | |
| 9,563,422 B2 | 2/2017 | Cragun et al. | |
| 10,114,902 B2 | 10/2018 | Byakod et al. | |
| 10,169,188 B2 | 1/2019 | Belekar et al. | |
| 10,534,512 B2 | 1/2020 | Jadhav et al. | |
| 10,706,122 B2 | 7/2020 | Sabbavarpu | |
| 10,831,831 B2 | 11/2020 | Greene | |
| 10,860,594 B2 | 12/2020 | Jamshidi | |
| 10,963,470 B2 | 3/2021 | Jamshidi | |
| 10,970,294 B2 | 4/2021 | Jamshidi | |
| 11,113,276 B2 | 9/2021 | Zhao | |
| 11,262,979 B2 | 3/2022 | Deshmukh et al. | |
| 2004/0039734 A1 | 2/2004 | Judd et al. | |
| 2006/0253345 A1 | 11/2006 | Herber | |
| 2008/0133500 A1 | 6/2008 | Edwards | |
| 2008/0140679 A1* | 6/2008 | Deyo | G06F 16/9558 |
| 2009/0113287 A1 | 4/2009 | Yee | |
| 2009/0319456 A1* | 12/2009 | Consul | H04L 51/212 706/21 |
| 2010/0042608 A1 | 2/2010 | Kane | |
| 2012/0010927 A1 | 1/2012 | Attenberg et al. | |
| 2012/0017281 A1 | 1/2012 | Bannerjee et al. | |
| 2012/0047120 A1 | 2/2012 | Connolly | |
| 2012/0254405 A1 | 10/2012 | Ganesh et al. | |
| 2012/0254723 A1 | 10/2012 | Kasa et al. | |
| 2013/0046747 A1* | 2/2013 | Gouyet | G06F 16/24578 707/706 |
| 2013/0246405 A1* | 9/2013 | Annau | G06F 16/24578 707/723 |
| 2013/0282691 A1 | 10/2013 | Stouffer et al. | |
| 2014/0164345 A1 | 6/2014 | Connolly et al. | |
| 2014/0304578 A1 | 10/2014 | Parkinson et al. | |
| 2015/0039746 A1 | 2/2015 | Mukherjee et al. | |
| 2015/0317132 A1 | 11/2015 | Rempell et al. | |
| 2015/0348071 A1 | 12/2015 | Cochrane et al. | |
| 2016/0055490 A1 | 2/2016 | Keren et al. | |
| 2016/0210360 A9* | 7/2016 | Stouffer | G06F 16/9535 |
| 2016/0353148 A1 | 12/2016 | Prins et al. | |
| 2018/0210965 A1 | 7/2018 | Grigoryan et al. | |
| 2019/0073365 A1 | 3/2019 | Jamshidi | |
| 2019/0087508 A1 | 3/2019 | Karppanen | |
| 2020/0151187 A1 | 5/2020 | Jamshidi | |
| 2020/0394200 A1 | 12/2020 | Jamshidi | |
| 2021/0326348 A1 | 10/2021 | Jamshidi | |
| 2021/0406685 A1* | 12/2021 | Carmody | G06N 3/04 |

OTHER PUBLICATIONS

Gustafsdottir [online], "CMS Plugin: Frequently Asked Questions," Siteimprove.com, Jul. 9, 2020, 3 pages.

Gustafsdottir [online], "How to navigate the Siteimprove CMS Plugin," Siteimprove.com, Sep. 10, 2020, 7 pages.

International Preliminary Report on Patentability in PCT Appln. No. PCT/US2018/049809, dated Mar. 10, 2020, 13 pages.

International Search Report and Written Opinion in Application No. PCT/US2018/049809, mailed on Nov. 19, 2018, 13 pages.

Kamal, "Evaluating web accessibility metrics for Jordanian Universities, " International Journal of Advanced Computer Science and Applications, 2016, 7(7):113-122.

Needham [online], "CMS Plugin: Security FAQ," Siteimprove.com, Aug. 9, 2020, 2 pages.

Needham [online], "On which CMS is the Siteimprove plugin available?," Siteimprove.com, May 7, 2020, 11 pages.

Sergio Pedercini [online], "How to code a responsive circular percentage chart with SVG and CSS", retrieved from URL: https://nnediunn.conn/@pppped/how-to-code-a-responsive-circular-percentage-chart-with-svg-and-css-3632f8cd7705, May 17, 2017, 5 pages.

Silktide.com [online], "Silktide," available on or before Feb. 8, 2017, via Internet Archive: Wayback Machine URL <https://web.archive.org/web/20170208112649/https://silktide.com/>, retrieved on May 7, 2020, URL<http://www.silktide.comt>, 2 pages.

Sitebeam.net [online], "Sitebeam," available on or before Feb. 4, 2017, via Internet Archive: Wayback Machine URL <https://web.archive.org/web/20170204162753/http://sitebeam.net/>, retrieved on May 7, 2020, URL<http://www.sitebeam.net>, 4 pages.

Siteimprove.com [online], "Adobe Experience Manager: Siteimprove provided plugin," available on or before Aug. 12, 2020, via Internet Archive: Wayback Machine URL <https://web.archive.org/web/20200812065134/https:/siteimprove.com/en/core-platform/integrations/cms-plugin/adobe-experience-manager/>, retrieved on Mar. 21, 2022, URL<https://siteimprove.com/en/core-platform/integrations/cms-plugin/adobe-experience-manager/>, 18 pages.

Siteimprove.com [online], "Adobe Experience Manager: Siteimprove provided plugin," available on or before Sep. 20, 2020, via Internet Archive: Wayback Machine URL <https://web.archive.org/web/20200920011517/https:/siteimprove.com/en/core-platform/integrations/cms-plugin/adobe-experience-manager//>, retrieved on Mar. 21, 2022, URL<https://siteimprove.com/en/core-platform/integrations/cms-plugin/adobe-experience-manager/>, 18 pages.

Siteimprove.com [online], "August & September 2021 Release Highlights," Oct. 8, 2021, retrieved on Mar. 21, 2022, retrieved from URL<https://help.siteimprove.com/support/solutions/articles/80000946947-august-september-2021-release-highlights>, 2 pages.

Siteimprove.com [online], "Drupal," available on or before Aug. 12, 2020, via Internet Archive: Wayback Machine URL <https://web.archive.org/web/20200812071254/https:/siteimprove.com/en/core-platform/integrations/cms-plugin/drupal/>, retrieved on Mar. 21, 2022, URL<https://siteimprove.com/en/core-platform/integrations/cms-plugin/drupal/>, 12 pages.

Siteimprove.com [online], "Feb. 2021 Release Highlights," Sep. 23, 2021, retrieved on Mar. 21, 2022, retrieved from URL<https://help.siteimprove.com/support/solutions/articles/80000863866#h_01F0GCPTWX5H3ZS558V1GVEQQN>, 3 pages.

Siteimprove.com [online], "February 2021 Release Highlights," Sep. 23, 2021, retrieved on Mar. 21, 2022, retrieved from URL<https://help.siteimprove.com/support/solutions/articles/80000863866-february-2021-release-highlights>, 3 pages.

Siteimprove.com [online], "January 2021 Release Highlights," Oct. 1, 2021, retrieved on Mar. 21, 2022, retrieved from URL<https://help.siteimprove.com/support/solutions/articles/80000863867-january-2021-release-highlights>, 3 pages.

Siteimprove.com [online], "July 2021 Release Highlights," Sep. 23, 2021, retrieved on Mar. 21, 2022, retrieved from URL<https://help.siteimprove.com/support/solutions/articles/80000863850-july-2021-release-highlights>, 4 pages.

Siteimprove.com [online], "October & November 2021 Release Highlights," Dec. 7, 2021, retrieved on Mar. 21, 2022, retrieved from URL<https://help.siteimprove.com/support/solutions/articles/80000958280-october-november-2021-release-highlights>, 3 pages.

Siteimprove.com [online], "October 2020 Release Highlights," Nov. 16, 2021, retrieved on Mar. 21, 2022, retrieved from URL<https://help.siteimprove.com/support/solutions/articles/80000448376-october-2020-release-highlights>, 2 pages.

Siteimprove.com [online], "Optimizely + Siteimprove," available on or before Jun. 16, 2021, via Internet Archive: Wayback Machine URL <https://web.archive.org/web/20210616140532/https:/siteimprove.com/en/core-platform/integrations/cms-plugin/optimizely/>, retrieved on Mar. 21, 2022, URL<https://siteimprove.com/en/core-platform/integrations/cms-plugin/optimizely//>, 12 pages.

Siteimprove.com [online], "Siteimprove CMS Plugin Integration Cookbook," available on or before Aug. 5, 2020, via Internet Archive: Wayback Machine URL <https://web.archive.org/web/

(56) References Cited

OTHER PUBLICATIONS

20200805195514/https:/developer.siteimprove.com/cms-plugin-integration-cookbook/>, retrieved on Mar. 21, 2022, URL<https://developer.siteimprove.com/cms-plugin-integration-cookbook/>, 13 pages.
Siteimprove.com [online], "Web accessibility for all with the next generation of Siteimprove Accessibility," Mar. 20, 2020, retrieved on Mar. 21, 2022, retrieved from URL<https://siteimprove.com/en-US/blog/web-accessibility-for-all-with-next-generation-siteimprove-accessibility/>, 36 pages.
Wikipedia.com [online], "URI normalization," Oct. 20, 2020, retrieved on Mar. 21, 2022, retrieved from URL<https://en.wikipedia.org/w/index.php?title=URI_normalization&oldid=984473278>, 2 pages.
Zhou, "Evaluating Websites Using a Practical Quality Model", Software Technology Research Laboratory, De Montfort University, 2009, 113 pages.
International Search Report and Written Opinion in PCT/IB2022/060570.

* cited by examiner

| Key Pages - Sites | × | Another Page | × | + | | |
|---|---|---|---|---|---|---|
| ← → C ☆ | http://www.example.com/searchengine.htm 800 | | | | | |

≡ Hide Menu　　　　⊙Help Center and Acadamy▾ ⊛Settings▾ &SiteimproveUser▾

(Search in menu 🔍)

▣ Dashboard　802

< MAIN MENU

Key pages

Pages ⊛

Sites ⊛

Manage key pages  804

| ⇅ Name | ⇅ URL | ▾ Total pages | ⇅ Key pages ⓘ | ⇅ Sets of criteria ⓘ | Add criteria set |
|---|---|---|---|---|---|
| | | | | URL ▾ Search | ⬇ CSV |
| Examplewebsite.com | | 7,568 | 4,544 | 8 ▾ | ⊕ |
| Staging.Examplewebsite.com | | 3,679 | 0 | 1 ▾ | ⊕ |
| DevSite.Examplewebsite.com | | 3,500 | 0 | | ⊕ |
| Examplewebsite.2018.com | | 3,017 | 1,365 | 5 ▾ | ⊕ |

Key pages criteria for Examplewebsite.2018.com  806

| ▾ Name of criteria set | ⇅ Date Created | ⇅ Created by | ⇅ Modified Date | ⇅ Modified by | ⇅ Criteria | ⇅ Key pages | Options |
|---|---|---|---|---|---|---|---|
| Behavior False | 10/8/2021 | User | — | — | 1 ▾ | 29 | ⋯ |
| Camp | 10/4/2021 | User | 10/4/2021 | User | 1 ▾ | 11 | ⋯ |
| Funnel ⓘ | 10/4/2021 | User | 10/4/2021 | User | 2 ▾ | 1,289 | ⋯ |
| RFL campaign | 10/6/2021 | User | — | — | 1 ▾ | 7 | ⋯ |
| Test | 10/5/2021 | User | — | — | 1 ▾ | 133 | ⋯ |

1-5 of 5 items　　　　　　　　　Show [5 items ▾] per page

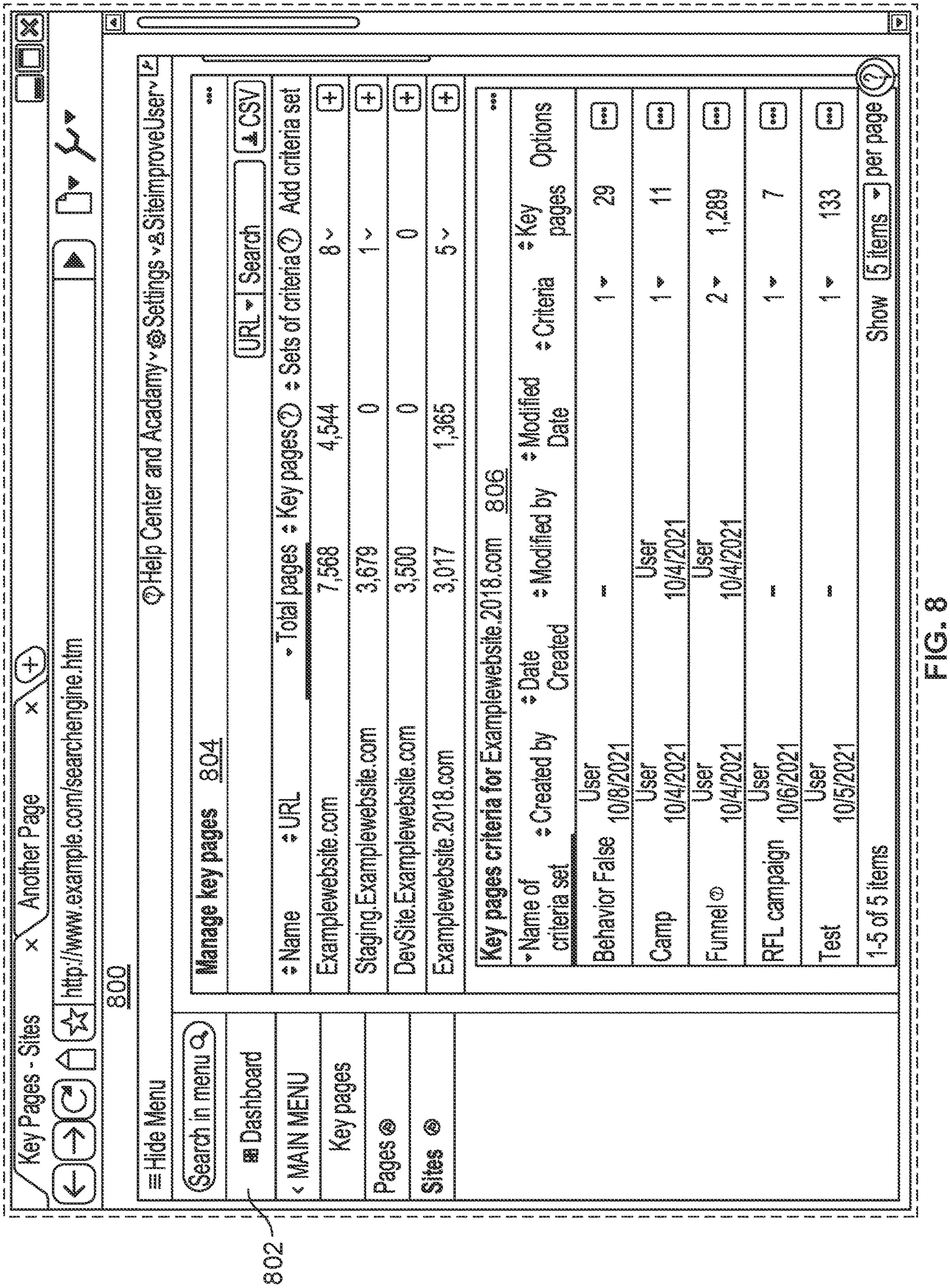

FIG. 8

WEBSITE KEY PAGES IDENTIFICATION AND ANALYSIS SYSTEM

REFERENCE TO CO-PENDING APPLICATION

This application claims the benefit of priority under 35 U.S.C. § 119(e) to U.S. Provisional Patent Application No. 63/274,749, filed Nov. 2, 2021 and entitled WEBSITE KEY PAGES IDENTIFICATION AND ANALYSIS SYSTEM, and the entire disclosure set forth therein is incorporated herein by reference.

TECHNICAL FIELD

This document describes devices, systems, and methods related to assessing website quality, particularly regarding key pages within a website.

BACKGROUND

Websites can vary in their quality. The quality of a website can affect user experience of users who visit the website. For example, websites with broken links, misspellings, and other features that do not function as intended can be frustrating for users visiting a site. Additionally, websites that are not optimized for search engines (also referred to as "search engine optimization" or SEO) may have a low level of quality because users may not be able to locate relevant pages on the website (or locate the website more generally) using a search engine. For example, websites that do not have information formatted properly for search engines to retrieve and associate with other information on the page may have low levels of SEO, which may result in those websites not appearing as prominently in search results as they otherwise should for relevant search strings. Websites can also have a low level of quality if they are not readily accessible to all users regardless of impairment (also referred to as "website accessibility"). For example, if a website is not formatted properly, users who are seeing or hearing impaired may not be able to use website reader applications to review and navigate through the content.

SUMMARY

The document generally relates to assessing quality of a website, particularly regarding key pages of the website. A website owner, or client (e.g., website operator), can have many webpages that make up their website. Sometimes, it can be challenging to identify and target which webpages to fix, especially when the website owner does not have enough time to fix all issues that may appear in the website. It can also be challenging to determine how to prioritize fixing webpages in the website in order to improve overall quality of the website, thereby improving user experiences for users who visit the website. Therefore, the disclosed techniques provide website owners with an ability to set criteria for identifying key pages in their website.

The website owner can designate one or more criteria that can be used by a computing system to identify key pages within the website of the owner. The criteria can include but is not limited to top viewed webpages, newly added pages, SEO target pages, number of clicks, and particular elements in the webpages. A same criteria can also be used across different website domains, thereby making it easy and efficient for the website owner to address issues in all their websites. Key pages can be critical, popular, or important webpages in the website, as designated by the website owner. The key pages may receive a lot of traffic and/or visitors. The key pages may also be landing pages for one or more campaigns, advertisements, or other types of digital components. The key pages can also be defined by the website owner using custom factors that are unique to each website and/or each website owner. For example, a key page can be a webpage where a user can select an "Apply Now" button to apply for a job. Another key page can be a webpage listing products for sale at the website and current sales on those products.

Once the website owner sets their criteria, the computing system can crawl the owner's website and identify any webpages that meet the criteria. Those webpages can be identified as key pages and presented as such to the website owner. The key pages can be tagged, ranked, and viewed together or separately from other, non-key pages in the website. Key pages can be tagged as such across modules, tools, or other software applications provided by the computing system to create visibility and make it easy for the website owner to keep track of key pages. The disclosed techniques can provide for interfaces permitting dynamic and iterative review of key pages criteria, including real-time estimates of a number of pages returned for one or more of the criteria that is selected by the website owner. The disclosed techniques can also provide for tracking of modifications made to pages that are identified as key pages over time.

The website owner can view the key pages in a variety of different graphical user interface (GUI) displays at a device of the owner. The website owner can also view issues that are identified in the key pages. The website owner can focus their attention and resources on quickly and easily addressing those issues in the key pages before moving on to addressing other issues in the website (e.g., issues at webpages that are not key pages).

The disclosed techniques therefore provide a website owner with customization of key pages criteria. A breadth of different criteria can be readily selected and polled to generate results that identify key pages, a quantity of key pages, and issues that can be fixed in each of those key pages. The website owner can view real-time changes in a quantity and/or count of key pages over time, which can help the website owner assess how their website is improving and/or increasing in quality to provide users with improved experiences when visiting the website.

Although the disclosed inventive concepts include those defined in the attached claims, it should be understood that the inventive concepts can also be defined in accordance with the following embodiments.

Embodiment A1 is a system for determining key pages in a website based on automated analysis of the website, the system comprising: a website analysis server system to assess website quality; and a particular client computing device to provide a graphical user interface (GUI) presenting information on website quality as determined by the website analysis server system, the particular client computing device being configured to: output the GUI on a display of the particular client computing device; present graphical elements in the GUI that each correspond to criteria that can be selected and used to identify key pages in a website; receive user input indicating selection of one or more of the graphical elements; and transmit the user input to the website analysis server system, the website analysis server system being configured to: receive the user input from the particular client computing device; identify the website to evaluate, the website comprising webpages; retrieve code for the webpages that the website comprises from one or more web server systems that host the website; locally execute and interpret the code to render the webpages as they would appear on a client computing device; identify a criteria to evaluate across the webpages for the website based on the user input; determine an initial quantity of webpages that satisfy the criteria; transmit the initial quantity of webpages that satisfy the criteria to the particular client computing device to be presented in the GUI on the display of the particular client computing device; tag one or more of the webpages based on evaluation of the criteria across the webpages for the website, the evaluation of the criteria including determining whether the criteria is present across the webpages; add the tagged webpages to a list of key pages; store a quantity of the tagged webpages that are added to the list of key pages; and transmit the list of key pages for the website to the particular client computing device to be presented in a second GUI on the display of the particular client computing device.

Embodiment A2 is the system of embodiment A1, wherein the criteria includes at least one of (i) content in any of the webpages matching user-defined content that is provided in the user input, (ii) a webpage being published within a user-defined period of time that is provided in the user input, (iii) a number of times a webpage is referred to being within a user-defined number of times that is provided in the user input, (iv) a webpage containing at least one tag matching at least one user-defined tag that is provided in the user input, (v) a webpage containing at least one hypertext markup language (HTML) element matching at least one user-defined HTML element that is provided in the user input, (vi) a page level of a webpage matching a user-defined page level that is provided in the user input, (vii) a webpage appearing in a user-defined ranking of results in a search engine, (viii) a webpage having a user-defined quantity of clicks, (ix) a webpage being associated with a user-defined campaign, (x) a webpage having a corresponding behavior map, (xi) a webpage being identified as a target page, (xii) a webpage being monitored for performance, and (xiii) a webpage being associated with a digital components provider.

Embodiment A3 is the system of any one of embodiments A1 through A2, wherein the particular client computing device is configured to receive user input to filter the list of key pages based on the criteria.

Embodiment A4 is the system of any one of embodiments A1 through A3, wherein the website analysis server system is further configured to: generate a quality score for each of the webpages for the website based on evaluation of a set of conditions across the webpages for the website, the evaluation of the set of conditions including determining whether and to what extend the set of conditions are present across the webpages, the quality scores including numerical range values and Boolean values, the numerical range values being determined based on proportions of the website that satisfy corresponding numerical range conditions from the set of conditions, the Boolean values being determined based on whether the website satisfies corresponding Boolean conditions from the set of conditions; and store the quality score for each of the webpages for the website.

Embodiment A5 is the system of any one of embodiments A1 through A4, wherein transmitting the list of key pages for the website to the particular client computing device to be presented in the second GUI on the display of the particular client computing device further comprises transmitting quality scores for the tagged webpages to the particular client computing device to be presented in the second GUI with the list of key pages.

Embodiment A6 is the system of any one of embodiments A1 through A4, wherein the proportions of the website that satisfy the corresponding numerical range conditions include percentages of particular types of website elements on the webpages for the website that satisfy the corresponding numerical range conditions.

Embodiment A7 is the system of any one of embodiments A1 through A6, wherein the particular types of website elements include at least one of words on the webpages for the website, links on the webpages for the website, and image data on the webpages for the website.

Embodiment A8 is the system of any one of embodiments A1 through A7, wherein the website analysis server system is further configured to identify, for each of the tagged webpages, one or more features that can be improved by the user based on the quality score of the tagged webpage being less than a threshold score.

Embodiment A9 is the system of any one of embodiments A1 through A8, wherein the website analysis server system is further configured to transmit the identified features for each of the tagged webpages to the particular client computing device to be presented in the second GUI with the list of key pages.

Embodiment A10 is the system of any one of embodiments A1 through A9, wherein: the particular client computing device is further configured to: receive updated user input indicating selection of one or more of the graphical elements; and transmit the updated user input to the website analysis server system; and the website analysis server system is further configured to: receive the updated user input from the particular client computing device; update the criteria to evaluate across the webpages for the website based on the updated user input; determine an updated quantity of webpages that satisfy the updated criteria; transmit the updated quantity of webpages that satisfy the updated criteria to the particular client computing device to be presented in the GUI on the display of the particular client computing device; tag one or more of the webpages based on evaluation of the updated criteria across the webpages for the website; and update the list of key pages with the tagged webpages.

Embodiment A11 is the system of any one of embodiments A1 through A10, wherein the particular client computing device is further configured to: identify permissions for the user of the particular client computing device, wherein the permissions indicate what information about the website that the user is allowed to view; and present, based on the identified permissions for the user, a portion of the list of key pages that the user is allowed to view for the website in the second GUI.

Embodiment A12 is a method for determining, by a computing system, key website pages based on automated website analysis, the method comprising: identifying, by a computing system, a website to evaluate, the website comprising webpages; retrieving, by the computing system, code for the webpages that the website comprises from one or more web server systems that host the website; locally executing and interpreting, by the computing system, the code to render the webpages as they would appear on client computing devices; receiving, by the computing system, an indication that user input was received at a client computing device indicating selection of criteria that specify webpage characteristics; determining, by the computing system, an initial quantity of webpages that satisfy the criteria; providing, by the computing system, information to the client computing device to cause the client computing device to present an indication of the initial quantity of webpages of the website that satisfy the criteria, the initial quantity of webpages that satisfy the criteria being at least two webpages; designating, by the computing system, multiple webpages as key webpages of the website, based on determining that each of the multiple webpages satisfies the criteria; adding, by the computing system, the multiple webpages to a list of key pages; and providing, by the computing system, information to the client computing device to cause the client computing device to present the list of key pages for the website.

Embodiment A13 is the method of embodiment A12, further comprising: generating, by the computing system, a quality score for each of the webpages for the website based on evaluation of a set of conditions across the webpages for the website, the evaluation of the set of conditions including determining whether and to what extend the set of conditions are present across the webpages, the quality scores including numerical range values and Boolean values, the numerical range values being determined based on proportions of the website that satisfy corresponding numerical range conditions from the set of conditions, the Boolean values being determined based on whether the website satisfies corresponding Boolean conditions from the set of conditions; and storing, by the computing system, the quality score for each of the webpages for the website.

Embodiment A14 is the method of any one of embodiments A12 through A13, wherein providing, by the computing system, information to the client computing device to cause the client computing device to present the list of key pages for the website further comprises providing information to present the quality scores for the multiple webpages that have been designated as key webpages.

Embodiment A15 is the method of any one of embodiments A12 through A14, wherein the proportions of the website that satisfy the corresponding numerical range conditions include percentages of particular types of website elements on the webpages for the website that satisfy the corresponding numerical range conditions.

Embodiment A16 is the method of any one of embodiments A12 through A15, wherein the particular types of website elements include at least one of words on the webpages for the website, links on the webpages for the website, and image data on the webpages for the website.

Embodiment A17 is the method of any one of embodiments A12 through A16, further comprising identifying, by the computing system, for each of the multiple webpages that have been designated as key webpages, one or more features that can be improved by the user based on the quality score of the respective webpage being less than a threshold score.

Embodiment A18 is the method of any one of embodiments A12 through A17, further comprising providing, by the computing system, information to the client computing device to cause the client computing device to present the identified features for each of the multiple webpages that have been designated as key webpages presented by the list of key pages.

Embodiment A19 is the method of any one of embodiments A12 through A18, wherein the criteria includes at least one of (i) content in any of the webpages matching user-defined content that is provided in the user input, (ii) a webpage being published within a user-defined period of time that is provided in the user input, (iii) a number of times a webpage is referred to being within a user-defined number of times that is provided in the user input, (iv) a webpage containing at least one tag matching at least one user-defined tag that is provided in the user input, (v) a webpage containing at least one hypertext markup language (HTML) element matching at least one user-defined HTML element that is provided in the user input, (vi) a page level of a webpage matching a user-defined page level that is provided in the user input, (vii) a webpage appearing in a user-defined ranking of results in a search engine, (viii) a webpage having a user-defined quantity of clicks, (ix) a webpage being associated with a user-defined campaign, (x) a webpage having a corresponding behavior map, (xi) a webpage being identified as a target page, (xii) a webpage being monitored for performance, and (xiii) a webpage being associated with a digital components provider.

Embodiment A20 is the method of any one of embodiments A12 through A19, further comprising: identifying, by the computing system, permissions for the user of the client computing device, wherein the permissions indicate what information about the website that the user is allowed to view; and providing, by the computing system and based on the permissions for the user, information to the client computing device to cause the client computing device to present a portion of the list of key pages that the user is allowed to view for the website.

Embodiment B1 is a computer-implemented method for determining a set of website pages based on automated website analysis, the method comprising: identifying, by a computing system, a user-selected website to evaluate, the user-selected website comprising multiple webpages; retrieving, by the computing system, code for the multiple webpages of the user-selected website from one or more web server systems that host the user-selected website; locally executing and interpreting, by the computing system, the code to render the multiple webpages as client computing devices would render the multiple webpages; receiving, by the computing system, an indication that user input at a remote computing device indicated user-specified criteria that specify webpage characteristics; determining, by the computing system, a first matching subset of webpages from the user-selected website that satisfy the user-specified criteria, including identifying an initial quantity of webpages of the user-selected website that satisfy the user-specified criteria and therefore form the first matching subset of webpages; and providing, by the computing system, information to the remote computing device to cause the remote computing device to present an indication of the initial quantity of webpages that satisfy the user-specified criteria, the initial quantity of webpages that satisfy the user-specified criteria being at least two webpages from the user-selected website.

Embodiment B2 is the computer-implemented method of embodiment B1, comprising: providing, by the computing system, information to the remote computing device to cause the remote computing device to present a user interface that: (i) includes a first section that lists multiple different available types of criteria; (ii) includes a second section provides a region to present user-selected types of criteria; and (iii) is configured to receive user input to transfer a first type of criteria of the multiple different types of criteria from the first section to the second section to add the first type of criteria as a user-selected type of criteria.

Embodiment B3 is the method of any one of embodiments B1 through B2, wherein: receiving user input to transfer the first type of criteria from the first section to the second section includes receiving user selection of a visual depiction of the first type of criteria within the first section of the user interface.

Embodiment B4 is the method of any one of embodiments B1 through B3,5 wherein responsive to receiving user input to transfer the first type of criteria from the first section to the second section, the user interface is configured to add a visual depiction of the first type of criteria to the second section of the user interface.

Embodiment B5 is the method of any one of embodiments B1 through B4, wherein responsive to receiving user input to transfer the first type of criteria from the first section to the second section, the user interface is configured to remove the visual depiction of the first type of criteria from the first section of the user interface.

Embodiment B6 is the method of any one of embodiments B1 through B5, wherein: the visual depiction of the first type of criteria within the first section of the user interface includes no user-editable field; and the visual depiction of the first type of criteria within the second section of the user interface after its addition to the second section of the user interface includes a user-editable field.

Embodiment B7 is the method of any one of embodiments B1 through B6, wherein the user input at the remote computing device that indicated user-specified criteria includes user input that interacts with the user-editable field to specify a first value.

Embodiment B8 is the method of any one of embodiments B1 through B7, comprising: receiving, by the computing system, an indication that user input at the remote computing device interacted with the user-editable field to change the field from the first value to a second value, to update the user-specified criteria to an updated user-specified criteria; determining, by the computing system, a second matching subset of webpages of the user-selected website that satisfy the updated user-specified criteria, including identifying a updated quantity of webpages of the user-selected website that satisfy the updated user-specified criteria and therefore form the second matching subset of webpages, the updated quantity of webpages being different from the initial quantity of webpages; and providing, by the computing system, information to the remote computing device to cause the remote computing device to modify the user interface by changing (i) the initial indication of the quantity of webpages that satisfy the user-specified criteria, to (ii) an indication of the updated quantity of webpages that satisfy the updated user-specified criteria.

Embodiment B9 is the method of any one of embodiments B1 through B8, wherein: the user input at the remote computing device that indicated user-specified criteria includes the user input that transferred the first type of criteria from the first section to the second section; the identifying the initial quantity of webpages that satisfy the user-specified criteria is based on the user-specified criteria including the first type of criteria and not including a second type of criteria; the method comprises receiving, by the computing system an indication that user input at the remote computing device transferred the second type of criteria from the first section to the second section to update the user-specified criteria to an updated user-specified criteria that includes both the first type of criteria and the second type of criteria; the method comprises determining, by the computing system, a second matching subset of webpages of the user-selected website that satisfy the updated user-specified criteria, by satisfying both the first type of criteria and the second type of criteria, including identifying an updated quantity of webpages of the user-selected website that satisfy the updated user-specified criteria; and the method comprises providing, by the computing system, information to the remote computing device to cause the remote computing device to present an indication of the updated quantity of webpages that satisfy the updated user-specified criteria, the updated quantity of webpages being different from the initial quantity of webpages.

Embodiment B10 is the method of any one of embodiments B1 through B9, wherein the remote computing device presenting the indication of the updated quantity of webpages includes the user interface replacing the presentation of the initial quantity of webpages with the updated quantity of webpages while continuing to present the user interface.

Embodiment B11 is the method of any one of embodiments B1 through B10, comprising: receiving, by the computing system after the computing system has received the indication that user input at the remote computing device indicated the user-specified criteria, a request to view a list of the first matching subset of webpages that satisfy the user-specified criteria; and providing, by the computing system responsive to receiving the request to view the listing of the first matching subset of webpages, information to the remote computing device to cause the remote computing device to present: (1) an indication of an overall quality score based on a combined analysis of all webpages in the first matching subset of webpages; and (2) for each respective webpage of at least a plurality of webpages in the first matching subset of webpages: (i) a name or URL of the respective webpage, and (ii) a quality score for the respective webpage determined by the computing system based on analysis of code of the respective webpage.

Embodiment B12 is the method of any one of embodiments B1 through B11, wherein the information provided to the remote computing device responsive to receiving the request to view the listing of the first matching subset of webpages is configured to cause the remote computing device to present, for each respective webpage of the at least plurality of webpages in the first matching subset of webpages: (iii) a number of issues identified for the respective webpage by the computing system, the number of issues identified for the respective webpage resulting in the respective webpage being provided as a less-than perfect value for the quality score.

Embodiment B13 is a computer-implemented system, comprising: one or more processors; and one or more computer-readable devices including instructions that, when executed by the one or more processors, cause the computer-implemented system to perform operations that include: identifying a user-selected website to evaluate, the user-selected website comprising multiple webpages; retrieving code for the multiple webpages of the user-selected website from one or more web server systems that host the user-selected website; locally executing and interpreting the code to render the multiple webpages as client computing devices would render the multiple webpages; receiving an indication that user input at a remote computing device indicated user-specified criteria that specify webpage characteristics; determining a first matching subset of webpages from the user-selected website that satisfy the user-specified criteria, including identifying an initial quantity of webpages of the user-selected website that satisfy the user-specified criteria and therefore form the first matching subset of webpages; and providing information to the remote computing device to cause the remote computing device to present an indication of the initial quantity of webpages that satisfy the user-specified criteria, the initial quantity of webpages that satisfy the user-specified criteria being at least two webpages from the user-selected website.

Embodiment B14 is the method of embodiment B13, the operations further comprising: providing information to the remote computing device to cause the remote computing device to present a user interface that: (i) includes a first section that lists multiple different available types of criteria; (ii) includes a second section provides a region to present user-selected types of criteria; and (iii) is configured to receive user input to transfer a first type of criteria of the multiple different types of criteria from the first section to the second section to add the first type of criteria as a user-selected type of criteria.

Embodiment B15 is the method of any one of embodiments B13 through B14, wherein: receiving user input to transfer the first type of criteria from the first section to the second section includes receiving user selection of a visual depiction of the first type of criteria within the first section of the user interface.

Embodiment B16 is the method of any one of embodiments B13 through B15, wherein: responsive to receiving user input to transfer the first type of criteria from the first section to the second section, the user interface is configured to add a visual depiction of the first type of criteria to the second section of the user interface.

Embodiment B17 is the method of any one of embodiments B13 through B16, wherein: responsive to receiving user input to transfer the first type of criteria from the first section to the second section, the user interface is configured to remove the visual depiction of the first type of criteria from the first section of the user interface.

Embodiment B18 is the method of any one of embodiments B13 through B17, wherein: the visual depiction of the first type of criteria within the first section of the user interface includes no user-editable field; and the visual depiction of the first type of criteria within the second section of the user interface after its addition to the second section of the user interface includes a user-editable field.

Embodiment B19 is the method of any one of embodiments B13 through B18, wherein the user input at the remote computing device that indicated user-specified criteria includes user input that interacts with the user-editable field to specify a first value.

Embodiment B20 is the method of any one of embodiments B13 through B19, the operations further comprising: receiving an indication that user input at the remote computing device interacted with the user-editable field to change the field from the first value to a second value, to update the user-specified criteria to an updated user-specified criteria; determining a second matching subset of webpages of the user-selected website that satisfy the updated user-specified criteria, including identifying a updated quantity of webpages of the user-selected website that satisfy the updated user-specified criteria and therefore form the second matching subset of webpages, the updated quantity of webpages being different from the initial quantity of webpages; and providing information to the remote computing device to cause the remote computing device to modify the user interface by changing (i) the initial indication of the quantity of webpages that satisfy the user-specified criteria, to (ii) an indication of the updated quantity of webpages that satisfy the updated user-specified criteria.

The devices, system, and techniques described herein may provide one or more of the following advantages. For example, the disclosed techniques provide a breadth of criteria that can be selected and customized by the website owner to identify key pages in their website. The website owner can create custom criteria for identifying key pages in each website. The website owner can also use a same criteria across different website domains, thereby making it easy and efficient for the website owner to identify and subsequently address issues in all their websites.

As another example, the disclosed techniques provide for automatically identifying and presenting issues to be fixed in the website based on user-defined criteria for key pages in the website. By first identifying what webpages matter the most to the website owner as key pages and then prioritizing issues to fix for the key pages relative to non-key pages, the disclosed techniques can help the website owner efficiently use their time and resources to fix the issues affecting their most important webpages. By focusing on fixing their most important webpages, the website owner can improve an overall quality of their website and, consequently, user experiences at the website.

The disclosed techniques also provide for improving processing efficiency for real-time website assessments to be generated, which can allow website owners to evaluate the current version of their websites, to respond more quickly to decreased quality by addressing or fixing issues on key pages, and to improve user experiences on the website. For instance, website owners can use an outputted list of key pages and their corresponding issues to better manage their websites, such as to make particular changes on the website that would resolve the issues and improve overall quality of the website.

In another example, although key pages criteria is customizable by a website owner, the breadth of the criteria allows for a standardized and objective way for website quality to be quantified and addressed. Such quantification can provide a variety of advantages, such as permitting quality of a website to be readily compared and tracked over time, and/or permitting the quality of different websites to be readily compared to each other. Additionally, the disclosed techniques provide for digesting multitudes of webpages and content of a website to make it less difficult for the website owner to manage and improve the website.

In another example, GUIs and specific GUI features can be provided to assist the website owner in readily and quickly understanding what potential issues exist in the website and which potential issues to prioritize. For example, graphical features can be presented to visually and textually identify key pages, potential issues associated with each key page, and other information about the key pages. Moreover, since webpages are tagged as key pages, the website owner can readily identify and keep track of key pages across dashboards, modules, applications, or other software that is provided to the website owner by the computing system. Such GUI features can permit for complex information to be presented in a simplified manner, permitting for it to be provided on a variety of different displays and to be easily digestible by the website owner.

The details of one or more implementations are set forth in the accompanying drawings and the description below. Other features and advantages will be apparent from the description and drawings, and from the claims.

BRIEF DESCRIPTION OF THE DRAWINGS

FIG. 8 is an example GUI for displaying key pages across multiple websites.

Like reference symbols in the various drawings indicate like elements.

DETAILED DESCRIPTION OF ILLUSTRATIVE EMBODIMENTS

This document generally relates to identifying key pages in a website to assist a website owner in prioritizing their resources and time in fixing potential issues in the key pages versus non-key pages. A website owner (e.g., client, operator) can select one or more criteria that a system can use to identify key pages in their website. The website owner can select criteria for identifying different sets of key pages. The website owner can also select different criteria for identifying each type of key page in the website. Once the website owner sets the criteria, a computing system can use the criteria to automatically identify key pages in the website. As the computing system identifies key pages, the computing system can generate output indicating a live count of key pages that are identified in the website or across multiple websites of the website owner. The website owner can also modify the criteria and the computing system can dynamically identify new or different key pages in real-time.

Once key pages are identified for the website, the computing system can provide output at a device of the website owner that lists the key pages and issues associated with the key pages. The website owner can select any of the listed key pages and address their corresponding issues. By prioritizing resources and time in fixing potential issues in key pages, the website owner can improve overall quality of their website as well as end user experiences with the website.

Figure 1:
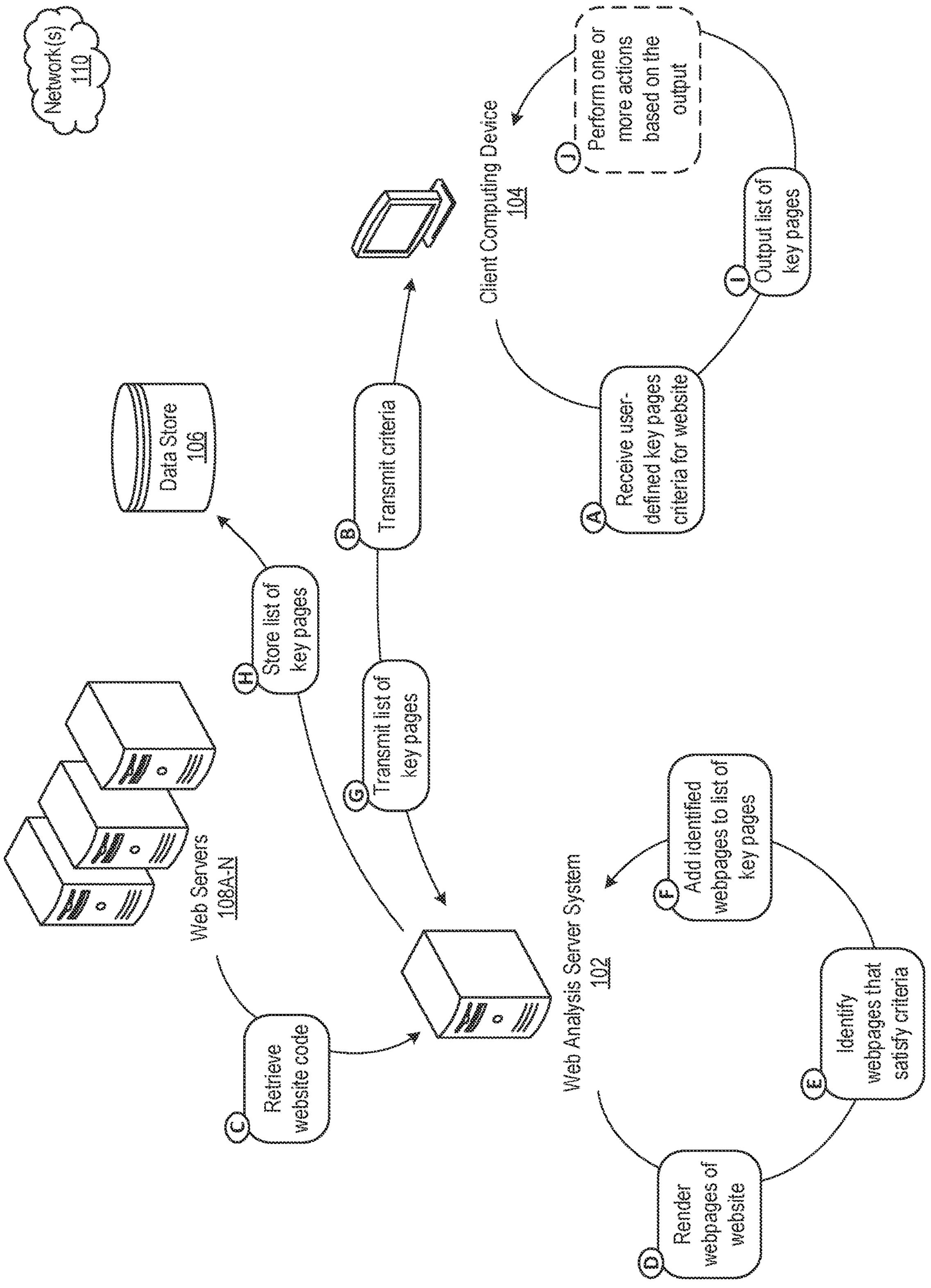
FIG. 1 is a conceptual diagram of a system and operations for identifying key pages in a website.

Referring to the figures, FIG. 1 is a conceptual diagram of a system and operations for identifying key pages in a website. A web analysis server system 102, client computing device 104, data store 106, and web servers 108A-N can be in communication (e.g., wired and/or wireless) via network(s) 110. Although shown as separate components and systems, in some implementations, one or more of 102, 104, 106, and 108A-N can be combined into a computing system or otherwise part of a network of computing devices, systems, and/or cloud-based services.

The web analysis server system 102 can be a computer, computing system, computing device, network of devices, cloud-based system, and/or cloud-based server that can provide website analytics to website owners (e.g., clients), website operators, and other relevant users. For example, the web analysis server system 102 can generate quality scores for websites of clients and provide suggestions for improving those websites based on particular client needs. As described herein, the web analysis server system 102 can also identify key pages in a website and present the key pages and their corresponding issues, quality scores, and other relevant information to a website owner or other user. Thus, the website owner can prioritize review and fixing of the key pages versus other webpages in the website to improve overall website quality and user experiences when visiting the website.

The client computing device 104 can be a user device, including but not limited to a mobile phone, smartphone, laptop, tablet, computer, or other type of user device. The client computing device 104 can be used by the website owner (e.g., client) or other relevant user who operates the website and/or improves, changes, or modifies the website. The website owner can access services provided by the web analysis server system 102 at the client computing device 104 so that the website owner can resolve potential issues at their website and improve their overall website.

The data store 106 can be any type of storage device, including but not limited to cloud storage, a data lake, and/or a data base. The web servers 108A-N can be any type of server system, such as a cloud-based server system, that can be configured to host websites. The web servers 108A-N thus can maintain code for webpages of a website, to be transmitted to a user device of an end user and/or the client computing device 104. The website can then be rendered at the respective device, using the code from one or more of the web servers 108A-N.

Still referring to FIG. 1, the client computing device 104 can receive user-defined key pages criteria for a website in step A. The website owner can define different criteria for different sets of key pages for their website. In other words, multiple subsets of key pages can be created and identified in a website using one or more different criteria. Each set of key pages can be marked, tagged, or otherwise identified as such to improve visibility and assist the website owner in viewing the different sets of pages. For example, the website owner can define criteria for a Christmas campaign set of key pages. Thus, any webpages in the owner's website that meet the criteria can be tagged as a Christmas key page. The website owner can also define another set of criteria for any webpage whose CSS is currently being redesigned. Websites that meet the other set of criteria can be tagged as a redesign key page. Thus, the website owner can define different criteria to cause a computing system to identify different sets of key pages in a particular website. The website owner can also define criteria that can be applied to multiple websites of the owner.

The website owner can create narrowed criteria to return a smaller set of key pages on which to focus. For example, the criteria can include parameters that are case sensitive and/or containing exact language, values, etc. The website owner can also set criteria with multiple parameters or conditions. The criteria can thus use an "AND" condition to require all the parameters to be satisfied in order to be identified as a key page.

Figure 6:
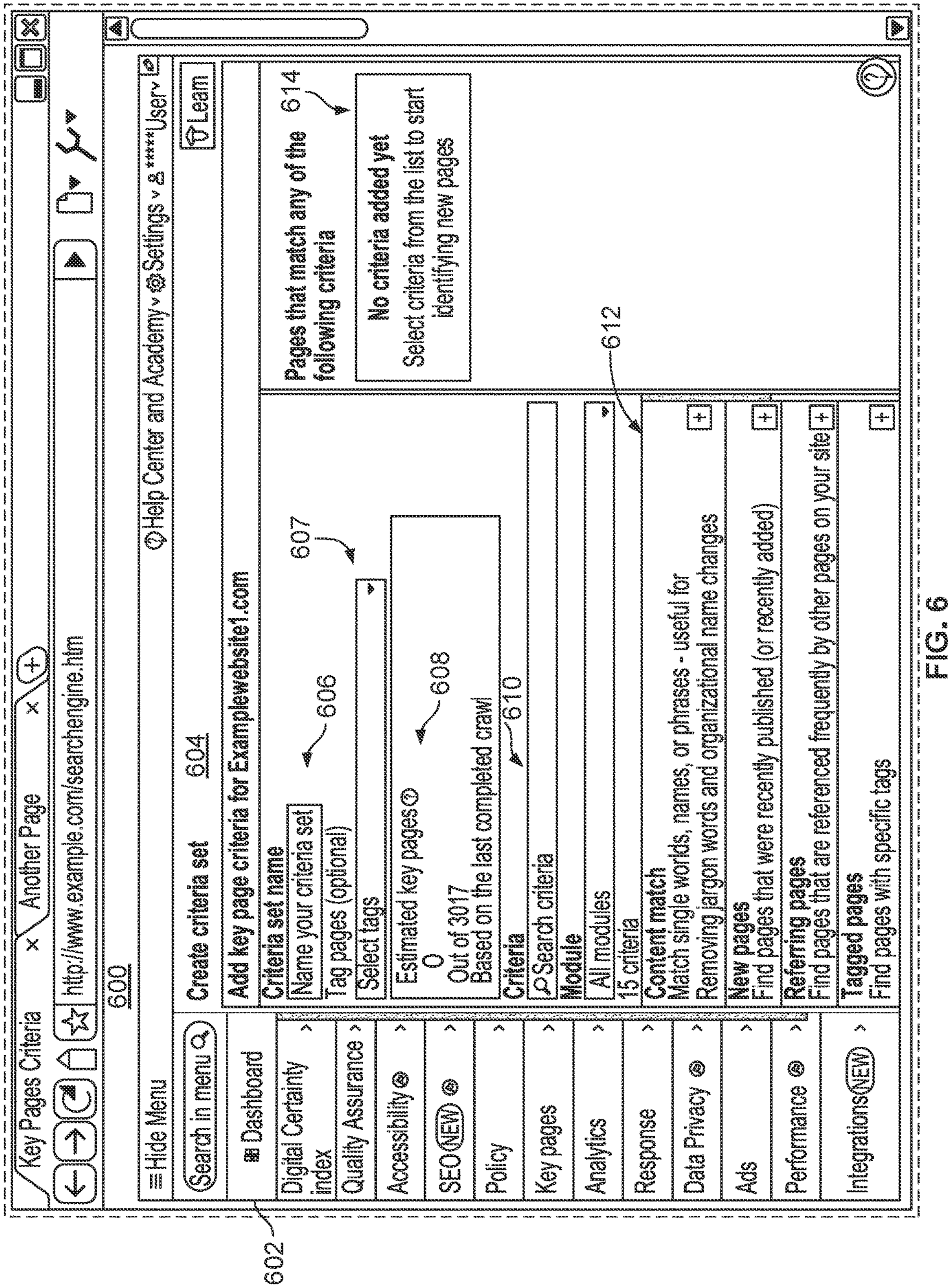
FIG. 6 is an example graphical user interface (GUI) for user-selection of criteria that a system can use to identify key pages in a website.

The user-defined key pages criteria can be inputted into a mobile application, module, or other software that is presented at the client computing device 104 and provided by the web analysis server system 102. In some implementations, default criteria can be set for any website and the website owner can customize that criteria based on the website owner's needs and website features. As a result, each website owner can define different criteria or sets of criteria to identify their key pages. The default criteria can be based on views, clicks, page referrals, and/or page level of a particular website. The website owner can further refine this default criteria (or set entirely new criteria) based on actual content in the owner's website. Refer to FIGS. 6-7 for additional discussion regarding defining key pages criteria.

The user-defined key pages criteria can be transmitted by the client computing device 104 to the web analysis server system 102 (step B). As described herein, the system 102 can identify key pages in the owner's website using the user-defined key pages criteria. The system 102 can continuously crawl the owner's website to identify key pages. The system 102 can also crawl the website at periodic time intervals. In some implementations, the website owner can trigger when individual webpages are crawled by the system 102 instead of or in addition to crawling the entire website. The system 102 may also crawl the website in the background as the website owner runs other analytics engines, performance tests, or otherwise updates their website. Thus, the system 102 may identify key pages before the website owner requests to view a user interface that identifies the key pages. When the website owner requests to view the key pages, a list of identified key pages can be quickly retrieved by the system 102, transmitted to the client computing device 104, and presented thereon. As a result, compute resources and processing power can be efficiently used to provide for fast results that are presented to the website owner at the client computing device 104.

The website owner can also change or update the criteria at any time, and the system 102 may automatically crawl the website to identify key pages based on the updated criteria. The newly identified key pages can be presented to the website owner at the client computing device 104 in real-time. A count of identified key pages can also be presented to the website owner in real-time as the system 102 identifies the key pages. Thus, the website owner can view a real-time count of key pages as the website owner defines, sets, or updates criteria for identifying key pages.

The system 102 can also retrieve code for the website of the owner (step C). The code can be retrieved from the web servers 108A-N. Using the code, the system 102 can render webpages of the website as they would appear at a user device, such as the client computing device 104 (step D). Once the website is rendered, the system 102 can identify webpages that satisfy the key pages criteria (step E). As described herein, this can be a binary decision, such as Yes or No (or True or False). In other words, a webpage is either a key page or not a key page. If a webpage in the website meets the criteria, then that webpage is identified and tagged as a key page. If the criteria, for example, requires only that a webpage mention "free trial," any webpage in the website that contains "free trial" is identified and tagged as a key page. As another example, if the criteria requires only that a webpage be viewed at least 10,000 times by end users, any webpage that has a viewing history of at least 10,000 is marked as a key page.

Figure 9A:
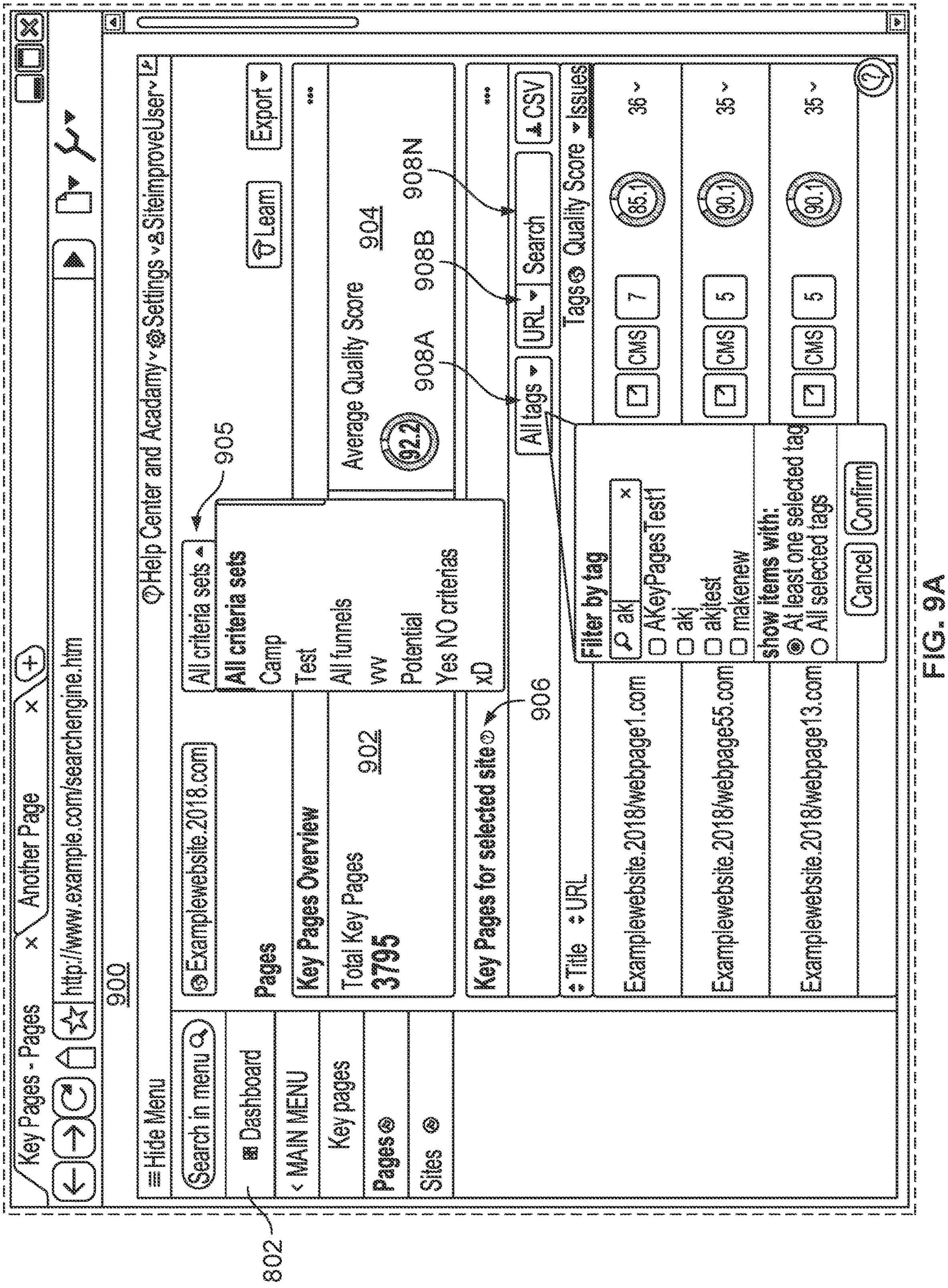
FIG. 9A is an example GUI for displaying key pages in a particular website.
Figure 9B:
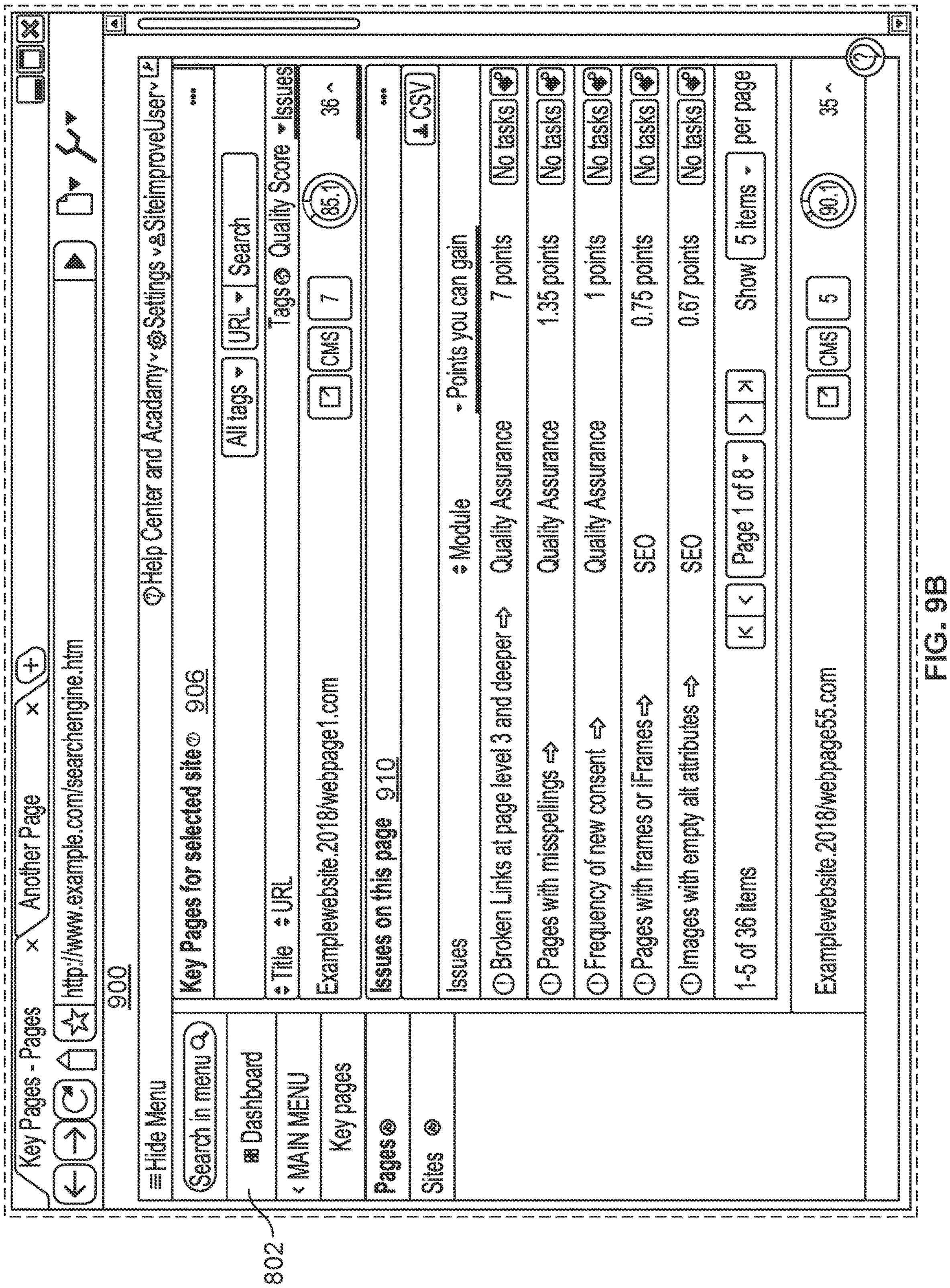
FIG. 9B is an example GUI for displaying issues in a key page of a particular website.
Figure 10:
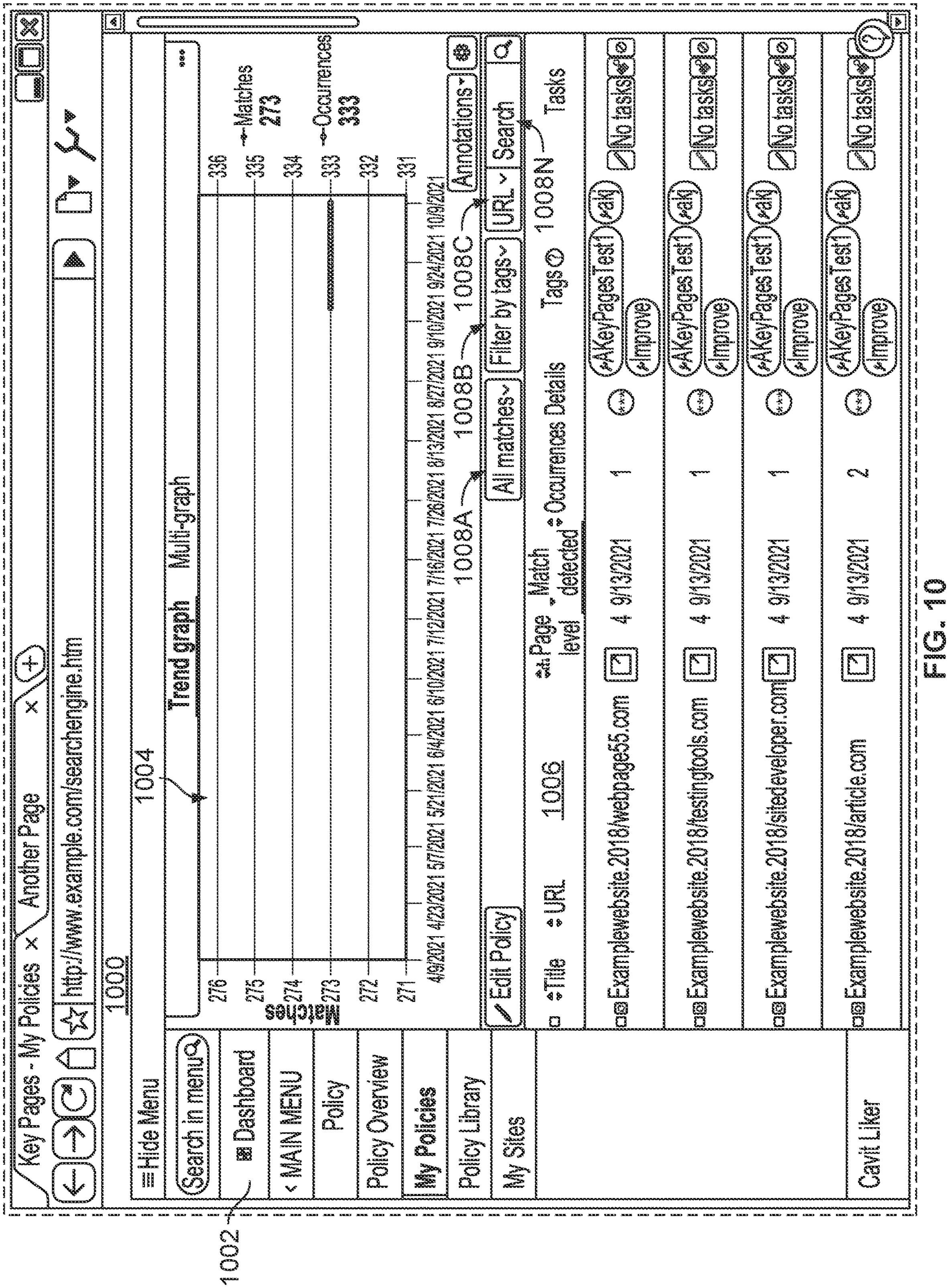
FIG. 10 is an example GUI for displaying key pages based on policies of a website.

Webpages that are identified and tagged as key pages can be added to a list of key pages by the system 102 (step F). As mentioned herein, this list can be dynamically updated as the system 102 continuously checks the website for key pages that satisfy the user-defined criteria. The system 102 can transmit the list of key pages to the client computing device 104 (step G). The system 102 may also generate output that includes the list of key pages and transmit that output to the client computing device 104. Refer to FIGS. 8-10 for additional discussion on outputting the key pages and relevant information about the key pages.

The system 102 may also store a quantity of identified key pages in the data store 106 (step H). The system 102 may also store a quality score for each of the identified key pages. This can be advantageous to perform historical analysis on improvements that are made to the website. A website owner can use the stored data to identify progress in improving key pages. The system 102 can perform analytics to determine whether identified key pages have been changed, improved, or modified, and/or whether the key pages have been removed from the list of key pages over time. The system 102 may also analyze changes to the identified key pages and determine whether the key pages, over time, are performing better or worse (and thus having higher quality scores). Progress can be quantified based on the key page's quality score over time and a number of key pages that are identified.

The client computing device 104 can output the list of key pages (step I). Any other output generated by the system 102 can also be presented in one or more GUI displays at the client computing device 104. As described further in reference to FIGS. 8-10, the output can include a list of key pages, including issues that have been identified for each of the key pages. The output may also include one or more options that can be selected by the website owner to address the identified issues.

Optionally, the client computing device 104 can perform one or more actions based on the output (step J). For example, the website owner may select an option to correct an issue in one of the key pages. The client computing device 104 can present another GUI display for the website owner that allows the website owner to change one or more elements in the key page to correct the identified issue. The website owner can also select one or more options that cause the client computing device 104 (or the system 102) to automatically implement one or more user-defined changes (or system 102-suggested changes) to remedy the issue(s) in the key page(s). Sometimes, for example, the system 102 can implement a change, such as correcting spelling of a particular word, across all webpages of the website having the particular word. As a result, changes and fixes can be made quickly, efficiently, and accurately across the website, thereby improving overall quality of the entire website and not just a particular webpage of the website.

Figure 2A:
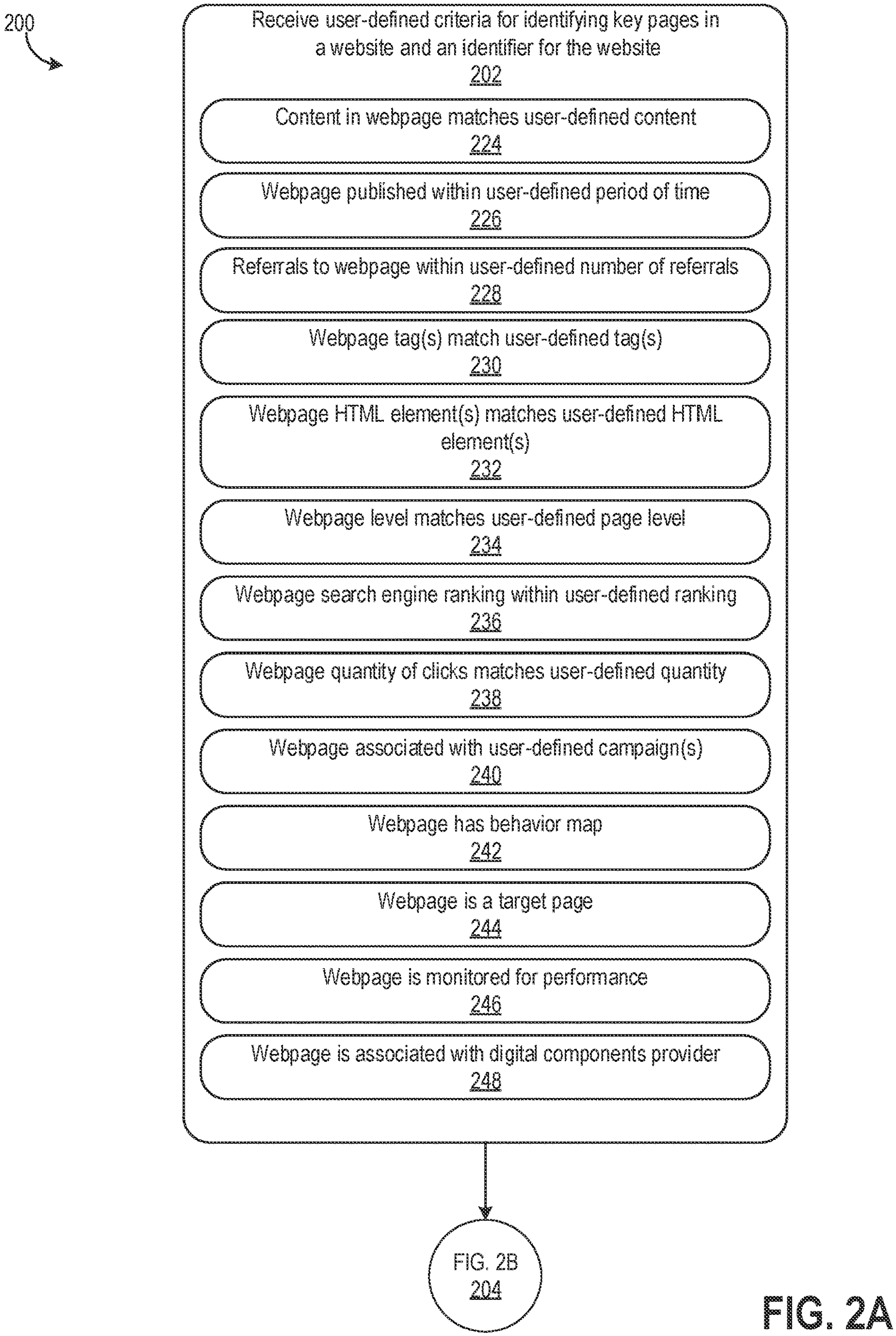
FIGS. 2A-C is a flowchart of a process for identifying key pages in a website.
Figure 2B:
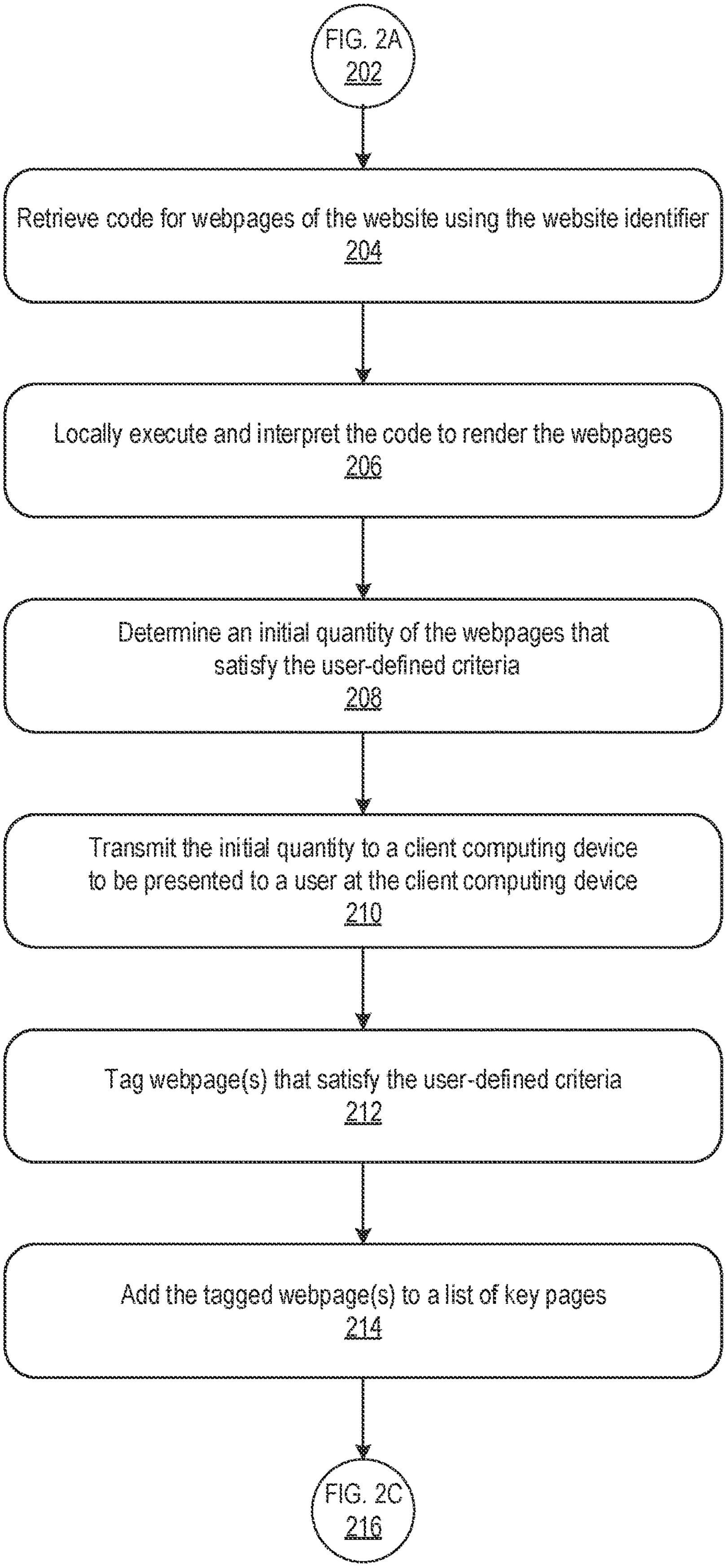
Figure 2C:
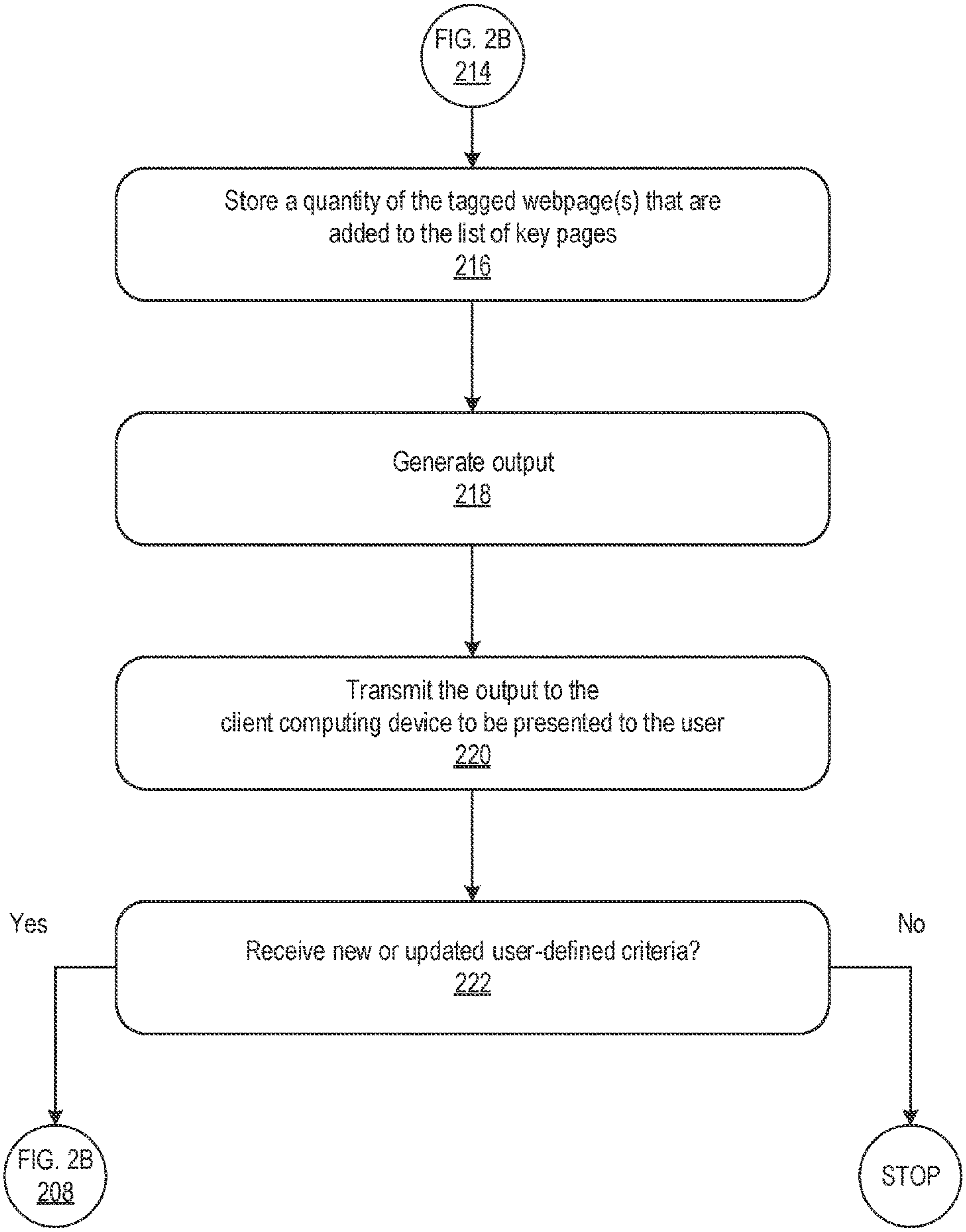

FIGS. 2A-C is a flowchart of a process 200 for identifying key pages in a website. The process 200 can be performed at predetermined time intervals. The process 200 can also be continuously performed, as described throughout this disclosure. In some implementations, the process 200 can also be performed at different times, based on user input designating a user's desire for key pages to be identified in the website at a present time.

The process 200 can be performed by the web analysis server system 102. The process 200 can also be performed by one or more other computing systems, devices, computers, networks, cloud-based systems, and/or cloud-based services. For illustrative purposes, the process 200 is described from the perspective of a computer system.

Referring to the process 200 in FIGS. 2A-C, the computer system can receive user-defined criteria for identifying key pages in a website and an identifier for the website (202). As described herein, a website owner, operator, or client (e.g., a user) can review, analyze, fix, update, and create their website or websites at a client computing device (e.g., remote computing device). The computer system can provide services (e.g., cloud-based services, software application, module, etc.) that can be executed at the client computing device, such as in a web browser. The website owner can use these services to analyze and/or work on their website(s). These services can include a module for identifying key pages in the website. The module can be presented in a GUI display at the client computing device and can include a set of criteria that the website owner can choose from and further customize to then be used by the computer system to identify key pages. Refer to FIGS. 6-7 for additional discussion on generating criteria to identify key pages.

The user-defined criteria can include selection of one or more criteria presented to the website owner in the GUI display at the client computing device. The user-defined criteria can specify webpage characteristics. For example, criteria can be defined that includes, but is not limited to: content in a webpage that matches user-defined content (224), a webpage that is published within a user-defined period of time (226), referrals to a webpage that are within a user-defined number of referrals (228), webpage tag(s) that match user-defined tag(s) (230), webpage HTML element(s) that match user-defined HTML element(s) (232), a webpage level that matches a user-defined page level (234), a webpage search engine ranking that is within a user-defined ranking (236), a webpage quantity of clicks that matches a user-defined quantity (238), a webpage being associated with a user-defined campaign(s) (240), a webpage having a behavior map (242), a webpage being a target page (244), a webpage being monitored for performance (246), and/or a webpage being associated with a digital components provider (248).

In brief, content in a webpage that matches user-defined content (224) criteria can identify webpages as key pages if those webpages include particular text. The website owner can input, into a text field, one or more textual values (e.g., String values) that they want the computer system to look for across all the webpages of the website. For example, the user-defined content can be "Santa Claus." When the computer system crawls the website to identify key pages, any time the computer system identifies a webpage containing the text "Santa Claus," the computer system can identify that webpage as a key page (or at least as satisfying one of multiple criteria that must be satisfied to be identified as a key page). The more text the website owner enters for this criteria, the narrower list of returned key pages.

The webpage that is published within a user-defined period of time (226) criteria can identify webpages as key pages depending on how recently those webpages were published. The website owner can input a number of days since publishing for this criteria. Thus, how recently a webpage published can indicate whether that webpage is a key page. For example, the user-defined period of time can be webpages published within a most recent 30 days. When the computer system crawls the website, any webpage that has been published within the last 30 days will be tagged as a key page (or at least as satisfying one of multiple criteria that must be satisfied to be identified as a key page), according to this user-defined criteria.

The referrals to a webpage that are within a user-defined number of referrals (228) criteria can identify webpages as key pages depending on a quantity of referrals to the web page. This criteria can be used to identify any webpage that is referred to in a campaign or is used as an advertisement landing page. A webpage that is referred to many times by other pages in the website can be an important webpage to the website owner, and thus defined as a key page. This criteria can define only internal references, or references made to webpages by the website, not external references such as other websites. The website owner can input a number of referrals that the webpage must at least have to be a key page. For example, the user-defined number of referrals can be at least 200 referrals. The website owner can also input a range of referrals that the webpage must have (e.g., 200-300 referrals). In some implementations, the website owner can input an exact number of referrals that the webpage must have (e.g., exactly 200 referrals). In yet some implementations, the website owner can input a quantity of webpages that refer to the webpage. Sometimes, a webpage can make multiple referrals to another webpage, so the number of referrals quantity may be higher than the actual quantity of webpages making a referral to a particular webpage. In this example, the user-defined number of referrals can be at least 200 webpages that make referrals to a particular page. When the computer system crawls the website, any webpage that satisfies the user-defined number of referrals can be tagged as a key page (or at least as satisfying one of multiple criteria that must be satisfied to be identified as a key page).

The webpage tag(s) that match user-defined tag(s) (230) criteria can identify webpages as key pages based on whether those webpages contain one or more particular tags. The website owner can define exact tags (e.g., HTML tags) and/or content that can appear in tags (such as letters, numbers, symbols, and/or words/strings) as the user-defined tags. Any webpage that has the user-defined tag(s) can be identified, by the computer system, as a key page (or at least as satisfying one of multiple criteria that must be satisfied to be identified as a key page).

Webpage HTML element(s) that match user-defined HTML element(s) (232) criteria can be used to identify webpages as key pages based content of their HTML/CSS files. The website owner can input one or more HTML elements that, as considered by the website owner, render a webpage a key page. When crawling the website, the computer system can determine whether a webpage contains the specific HTML elements defined by the website owner. For example, the computer system can check the CSS file for a webpage to determine whether the file references the user-defined HTML element(s). An example HTML element can be a div.table element. The website owner can define any quantity of HTML element(s) in the criteria 232. Any webpage that contains the user-defined HTML element(s) can thus be identified as a key page (or at least as satisfying one of multiple criteria that must be satisfied to be identified as a key page).

The webpage level matching a user-defined page level (234) criteria can be used to identify webpages as key pages based on how many mouse clicks it takes to reach each of the webpages. Webpages that take fewer mouse clicks may be identified as key pages. The user-defined page level can be a numeric value, such as 1, 2, 3, etc. For example, if the website owner defines the criteria 234 as 1 click, any webpage that requires 1 click to reach that webpage can be identified as a key page. To return a larger list of key pages, the website owner may define this criteria as 1 or 2 clicks. The computer system can crawl the website to automatically determine a page level for each of the webpages. For example, the computer system can determine that a webpage that takes one mouse click from a domain of the website would have a page level of 1. If the webpage takes two mouse clicks from the domain of the website, the page level of the webpage would be 2, and so on. The page level can indicate a number of mouse clicks needed to reach that webpage from a domain of the website and therefore can be used to determine, by the computer system, whether to tag the webpage as a key page (or at least as satisfying one of multiple criteria that must be satisfied to be identified as a key page).

The webpage search engine ranking being within a user-defined ranking (236) criteria can be used to identify webpages as key pages depending on their ranking in search engine results. A webpage that appears in a top quantity of search engine results can be important to the website owner and thus identified as a key page. The user-defined ranking can be a numeric value indicating a top quantity of search engine results. For example, the user-defined ranking can be 10, which means that any webpage that is ranked and appears in a top 10 search results of a search engine can be identified as a key page.

The criteria 236 can require an average position of a webpage in a search result to be at least the user-defined ranking. The computer system can identify the average position of the webpage in search results of an SEO engine over a last 30 days. For example, when crawling the website, the computer system can request rankings information over the last 30 days from the SEO engine, or another third party data provider, for each of the webpages. The computer system can analyze the rankings information from the SEO engine to identify webpages that have an average position in search results ranking that satisfies the user-defined ranking. Any webpage that satisfies the user-defined ranking can be identified as a key page (or at least as satisfying one of multiple criteria that must be satisfied to be identified as a key page). Since page rank can change at any time, a list of key pages that satisfy the criteria 236 can also change at any time. For example, a webpage can rank within top 10 search results in a search engine yesterday, but today, the webpage can fall to a ranking of 11. Today, the webpage would no longer satisfy the criteria 236 and would be removed from the list of key pages. The next day, however, the webpage may return to being ranked in the top 10 search results and thus can be identified again as a key page.

The webpage quantity of clicks matching a user-defined quantity (238) criteria can be used to identify webpages as key pages based on how much traffic the webpages receive over some predetermined period of time. The predetermined period of time can be a last 30 days. Traffic can be defined based on a number of clicks/click-ins (e.g., visits) that a webpage gets from end users. Traffic can be assessed and determined by an analytics tool of the computer system and/or a third party analytics provider that is integrated with the computer system. Webpages with higher traffic can be important to the website owner and thus identified as key pages. As an example, the user-defined quantity can be 10,000 clicks (e.g., at least 10,000 clicks, within some range that includes 10,000 clicks, such as 7,500-10,000 clicks, less than 10,000 clicks, and/or exactly 10,000 clicks). When crawling the website, the computer system can request click information for each webpage from an analytics tool of the computer system and/or a third party analytics provider. The computer system can then determine whether the click information for a webpage satisfies the user-defined quantity of clicks. If the criteria 238 is met, the webpage can be identified as a key page (or at least as satisfying one of multiple criteria that must be satisfied to be identified as a key page).

The webpage being associated with a user-defined campaign(s) (240) criteria can be used to identify webpages as key pages if those webpages are part of one or more campaigns of the website owner. A campaign can include or otherwise be presentation of advertisements/ads. A webpage that runs a campaign, for example, can include particular ads. Thus, the website owner can select one or more user-defined campaigns from a drop down menu in the criteria 240. The campaigns that are run at the website may already be known by the computer system, and thus presented in the drop down menu to the website owner. An example campaign can be "Fall Costumes." When crawling the website, the computer system can identify any webpage that runs ads associated with the "Fall Costumes" campaign as key pages (or at least as satisfying one of multiple criteria that must be satisfied to be identified as a key page).

The webpage having a behavior map (242) criteria can be used to identify webpages as key pages based on whether those webpages are analyzed for end user behavior. The criteria can be a binary decision, such as "Yes the webpage has a behavior map" or "No the webpage does not have a behavior map". An analytics engine of the computer system (or another computing system) can generate a behavior map for one or more webpages (e.g., automatically or based on user input requesting a behavior map for a particular webpage).

The behavior map can track where end users click or hover their mice on the particular webpage. The behavior map can be color-coded to show most common user activity (e.g., clicks, hovering). For example, users can frequently click on (i) a text field where they input their email addresses and then (ii) a button to submit their email addresses so that they receive email updates about a particular product on the website. The behavior map can present shades of yellow to red on the text field and the button since those are portions of the page that are most frequently clicked on by end users. End users may also randomly click on other portions of the webpage. These random clicks can be depicted in other, cooler tone shades, such as blues and purples, to demonstrate less frequency in clicking.

For the criteria 242, elements that are most frequently clicked on in the webpage may not matter. Instead, whether the webpage has a behavior map that identifies where user input has interact with the page matters. Thus, when crawling the website, the computer system can request an indication of whether a webpage has a behavior map from the analytics engine. If the analytics engine returns a value (e.g., Yes or No, True or False) that matches the criteria 242, the computer system can identify the webpage as a key page (or at least as satisfying one of multiple criteria that must be satisfied to be identified as a key page).

The webpage being a target page (244) criteria can be used to identify webpages as key pages based on whether those webpages are categorized as target pages. In other words, this criteria can be used to determine whether a particular webpage is set up to be a page that end users land on for particular searches. The criteria can be a binary decision, such as Yes the webpage is a target page (e.g., the webpage is intended to be landed on during a search) or No the webpage is not a target page (e.g., the webpage is not intended to be landed on during a search). An analytics engine of the computer system (or another computing system) can also work with an SEO engine to identify and analyze target pages. When crawling the website, the computer system can request an indication from the analytics engine of whether a particular webpage is a target page (e.g., Yes the particular webpage is a target page or No the particular webpage is not a target page). If the indication returned by the analytics engine matches the criteria 244, the computer system can identify the particular webpage as a key page (or at least as satisfying one of multiple criteria that must be satisfied to be identified as a key page).

The webpage being monitored for performance (246) criteria can be used to identify webpages as key pages based on whether those key pages are analyzed by the computer system based on their performance. A webpage can be designated for performance analytics by the website owner. The website owner may desire only some webpages to be analyzed for performance because performance analytics can be time consuming, require significant processing power and resources, and be expensive to the website owner. During performance analytics, one or more components of the computer system, such as the analytics engine described above, can measure how long it takes for the webpage to load, how long it takes for JavaScript of the webpage to run, how long it takes to load image data on the webpage, etc. Therefore, the criteria 246 can be used to merely identify which webpages are analyzed based on performance. Webpages that are analyzed based on performance can be important to the website owner (hence the website owner decided to invest in this type of analytics) and therefore identified as key pages.

The criteria 246 can be a binary decision, such as “Yes the webpage is analyzed based on performance” or “No the webpage is not analyzed based on performance”. When crawling the website, the computer system can request an indication from the analytics engine of whether a particular webpage is analyzed based on performance (e.g., Yes or No). If the indication returned by the analytics engine matches the criteria 246, the computer system can identify the particular webpage as a key page (or at least as satisfying one of multiple criteria that must be satisfied to be identified as a key page).

Finally, the webpage being associated with a digital components provider (248) criteria can be used to identify webpages as key pages if those webpages are linked to third party digital components (e.g., ads) providers. For example, the website owner can link a particular webpage with an account at the third party provider to receive ads or other digital components from the third party provider and present such received content on the particular webpage. The website owner can, for example, pay the third party provider or have a subscription with the third party provider to receive ads and present them in the webpage(s). Therefore, if the webpage is a landing page for ads from the third party provider, then the webpage can be identified as a key page.

The criteria 248 can be a binary decision, such as “Yes the webpage is associated with a digital components provider” or “No the webpage is not associated with a digital components provider”. When crawling the website, the computer system can request an indication from the analytics engine or another component/engine of the computing system of whether a particular webpage is associated with a digital components provider (e.g., Yes or No). If the indication returned by the analytics engine matches the criteria 248, the computer system can identify the particular webpage as a key page (or at least as satisfying one of multiple criteria that must be satisfied to be identified as a key page).

The example criteria 224-248 is non-exhaustive. In some implementations, the website owner can create and customize additional criteria specific to the owner’s website. Any of the example criteria 224-248 can be defined with exact values, which can narrow a total quantity of webpages that are identified as key pages. The example criteria 224-248 may also be defined with ranges of values (e.g., within defined ranges) or thresholds (e.g., greater than or less than), which can return a larger quantity of webpages that are identified as key pages.

The website owner can also combine one or more criteria with logical operators, such as “AND” and “OR.” Combining multiple criteria with “AND” can be beneficial to return a narrowed list of key pages while combining multiple criteria with “OR” can be beneficial to return a larger list of key pages. As described herein, the criteria 224-248 can be supported by the services provided to the website owner by the computer system. Data/information, such as whether a particular webpage has a behavior map or a quantity of clicks associated with that webpage, may be determined in the background by other components/engines of the computer system that are not discussed in detail herein. Therefore, when the website owner defines the criteria to be used to identify key pages in 202, the data may already have been created by another computer component, is cached, and can simply be pulled by the computer system to identify key pages. This can allow for efficient use of compute resources and processing power. Results (e.g., list of key pages, a quantity of key pages, etc.) can also be returned quickly to the website owner during runtime. Refer to the example GUIs in FIG. 6-7 for additional discussion on selecting criteria to identify key pages.

Still referring to the process 200 in FIGS. 2A-C, the computer system can also retrieve code for webpages of the website using the website identifier (204). The website owner can define the key pages criteria for a particular website. The particular website can be identified using a website identifier. The computer system can receive the website identifier with the key pages criteria. The computer system can then poll one or more web servers for code for webpages of the website by providing the web servers with the website identifier. The web servers can then locate the code for the webpages of the website, and transmit the code to the computer system.

In 206, the computer system can locally execute and interpret the code to render the webpages. The webpages can be rendered as if they are being presented at a client computing device or other user device. In other words, the webpages can be rendered as they would appear to an end user who accesses the website through a web browser at their user device (e.g., mobile phone, smartphone, computer, laptop, tablet, etc.), although the rendering can be performed by a “headless” web browser that does not actually present content on a display device.

Then, the computer system can determine an initial quantity of the webpages that satisfy the user-defined criteria (208). As the user selects and defines the criteria in 202, the computer system can begin identifying key pages. In other words, as described herein, the computer system can continuously crawl the website to identify key pages. As the computer system identifies key pages, the computer system can keep a running count of how many webpages are identified as key pages. This count can be the initial quantity. Accordingly, the computer system can determine a first matching subset of webpages from the user-selected website that satisfy the user-specified criteria and identify an initial quantity of webpages of the user-selected website that satisfy the user-specified criteria and therefore form the first matching subset of webpages. The initial quantity of webpages can include at least two webpages from the user-selected website.

The computer system can transmit the initial quantity to the client computing device of the website owner to be presented to the website owner in 210. For example, as shown in FIGS. 7A-E, the initial quantity can be displayed as a count of estimated key pages. The initial quantity can indicate how many webpages of a total number of webpages in the website are identified as key pages using the current user-defined criteria. As soon as the website owner updates, changes, or adds criteria, the initial quantity of key pages can change and be reflected, in real-time, in the GUI display presented at the client computing device.

In 212, the computer system can tag one or more webpages that satisfy the user-defined criteria. Tagging webpages as key pages can be performed at the same time as blocks 208 and/or 210. As described herein, the computer system can continuously check webpages to see if they satisfy the user-defined key pages criteria. As the computer system continuously checks the webpages, the computer system can identify different quantities of key pages (e.g., the initial quantity), which can be outputted at the client computing device in real-time, as the computer system checks the webpages and/or the website owner adds and/or modifies the criteria. Each time a webpage is identified as a key page, the computer system tags it as a key page and updates the initial count. Tagging the webpage as a key page can include associating a label (e.g., tag or other identifier) with a URL designation for the webpage. Therefore, blocks 208, 210, and/or 212 can be performed at a same time.

The computer system can also add each tagged webpage to a list of key pages that corresponds to the user-defined criteria (214). Sometimes, the computer system can generate a different list for each set of key pages. Sometimes, the computer system can add all key pages to the same list, regardless of whether the key pages satisfy different criteria for different subsets of key pages.

The computer system can store a quantity of tagged webpages that are added to the list of key pages in 216. It can be preferred to store the quantity of identified key pages to efficiently use available compute resources and data storage rather than storing every list of key pages that is generated. The quantity of tagged webpages (e.g., the quantity of identified key pages) can be stored in a data store, such as the data store 106. The quantity of tagged webpages can then be accessed at a later time, by the computer system, for historical analysis. For example, the computer system can determine, over time (or over some predetermined amount of time), how many key pages are identified, how many key pages are added to the list, and/or how many key pages are removed from the list. The computer system can also make associations between the quantity of tagged webpages and quality scores for each of those webpages over time. For example, the computer system can assess whether the website owner actually makes improvements/changes to the key pages in the list by assessing whether the quality scores of those key pages improve over time. If, for example, over a predetermined amount of time, a webpage remains a key page and its quality score improves, then the computer system can determine that the webpage is still important to the website owner and that the website owner addressed one or more issues with that webpage.

The computer system can generate output in 218, which can then be presented in one or more GUI displays at the client computing device or another user device (e.g., refer to block 220). The output, as depicted in FIGS. 8-10 can include various information to assist the website owner in reviewing and updating their website. For example, the output can include code that can be rendered to generate a webpage that presents the list of key pages. For each of the key pages in the list, the output can include information that indicates one or more issues and quality scores. The output can include a presentation of user-selectable options to check issues associated with a key page. The output can also include a presentation of user-selectable options to address one or more issues associated with a key page. The output can also include a presentation of interface elements that provide filtering options to assist the website owner in prioritizing review of issues in the list of key pages. Refer to FIGS. 8-10 for additional discussion about output for the list of key pages.

In 220, the computer system can transmit the output to the client computing device to be presented to the website owner. In some implementations, the computer system can identify one or more privileges of the website owner to determine what key pages in the list of key pages (and/or what subset of key pages) the website owner is permitted to view/access. In some implementations, the output can be presented to another user associated with the website, who may only be allowed to view a particular subset of key pages (e.g., the user may only view key pages associated with the website's Holidays campaign). Thus, the computer system may identify the user's privileges and only provide the output to the client computing device that aligns with the user's privileges.

The output can be presented in one or more different dashboards, software applications, and/or modules that are provided by the computer system to the website owner. This can be beneficial to increase visibility of key pages and their associated issues to assist the website owner in prioritizing review of the key pages. For example, the output can be presented in a GUI display that is different than other GUI displays presented to the website owner. The output can also be presented within a plugin or other feature for the services provided by the computer system. For example, in the plugin, data about a particular webpage can be fetched and displayed. The criteria used to identify that webpage as a key page can also be outputted/presented in the plugin.

The particular webpage can already be published to the website. In some implementations, the particular webpage may not yet be published. Identifying the webpage as a key page prepublication can be beneficial to allow the website owner to check and update that webpage to improve its quality before it goes live. As another example, the output can be presented in a dashboard that lists all the webpages for the website. The dashboard can also include tags for each of the webpages. Webpages that have been identified as key pages can include tags indicating them as such. The key pages tags can therefore be outputted in the tags section of the dashboard and used by the website owner to see which webpages have been identified as key pages and thus should be prioritized.

The computer system may also determine whether it has received new or updated user-defined criteria (222). If the computer system received new or updated user-defined criteria, the computer system can return to block 208 and repeat blocks 208-220. As described herein, the computer system can continuously repeat through the process 200 to generate real-time updates to the list of key pages, regardless of whether new or updated user-defined criteria has been received by the computer system. Continuously repeating the process 200 can also be beneficial to help the website owner know what webpages are key pages and how to prioritize their review in real-time.

If the computer system does not receive new or updated user-defined criteria, the process 200 may stop. The process 200 may stop for a predetermined amount of time. Then, the process 200 can be automatically executed again by the computer system to determine whether any additional webpages can be identified as key pages.

The process 200 can also be used to remove webpages from the list of key pages. As described herein, the process 200 may be continuously executed and/or automatically executed at predetermined time intervals. Whenever the process 200 is performed, the computer system can crawl the website to identify key pages amongst all the webpages of the website. Thus, if a webpage was previously identified as a key page (and tagged as such) but no longer satisfies the criteria the next time the computer system performs the process 200, the webpage may be removed, by the computer system, from the list of key pages. The computer system can also remove the tag that indicates the webpage is a key page.

Figure 3:
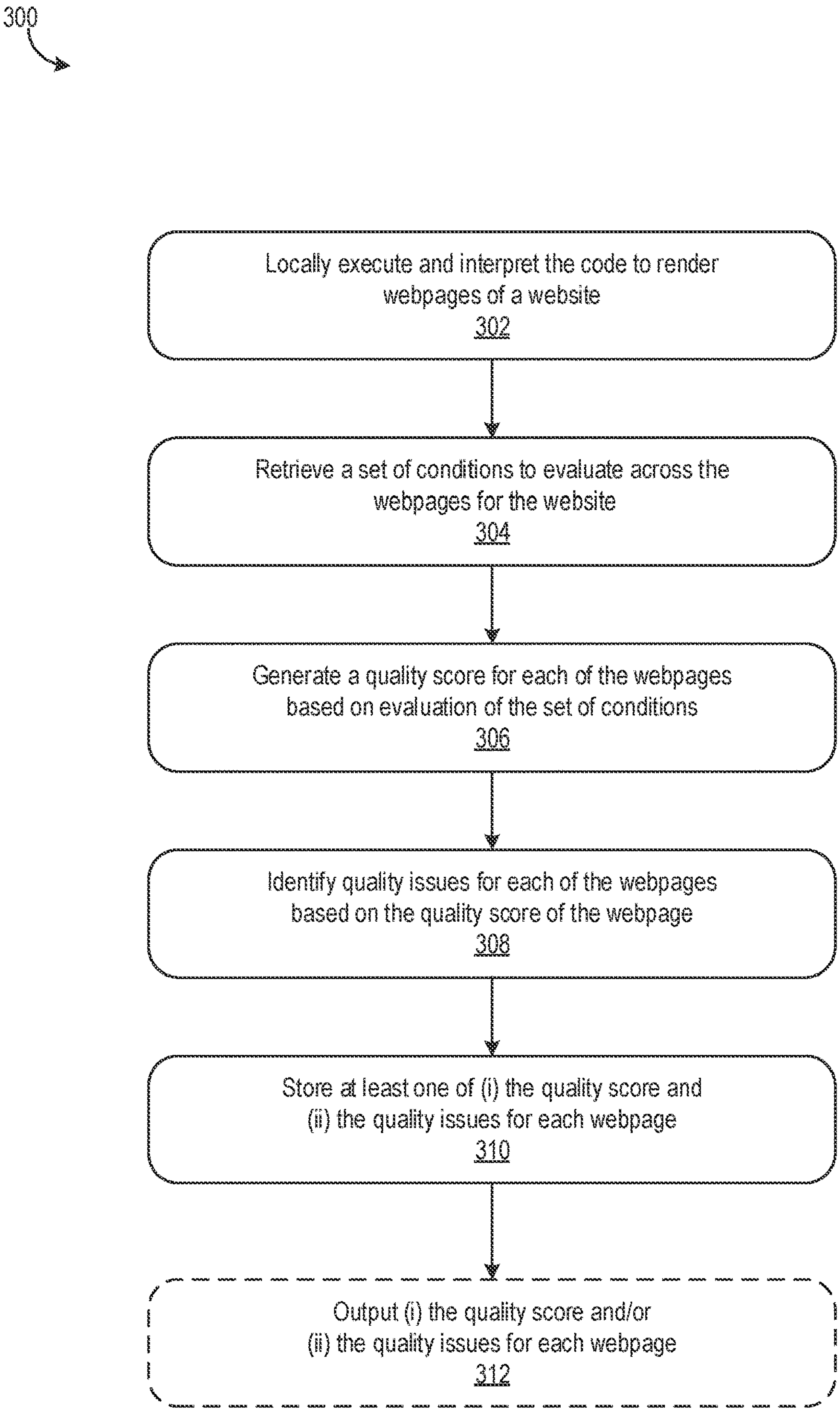
FIG. 3 is a flowchart of a process for determining quality scores for a website.

FIG. 3 is a flowchart of a process 300 for determining quality scores for a website. In particular, the process 300 can be used to determine an overall quality score for each webpage of the website. The overall quality score can be made up of multiple components that are combined for the webpage. In some implementations, the quality score of the webpage can be defined as a digital certainty index (DCI). The quality score can, for example, be composed of an SEO score, an accessibility score (e.g., indicating whether the website is accessible to people with disabilities), and a quality assurance score indicating quality of the webpage (e.g., broken links, misspellings). In some implementations, additional and/or alternate components can be used to determine the overall quality score for the webpage.

The use of scores associated with a website can be part of a quality assurance program used to uncover needle-in-a-haystack issues with a website. The issues can include, for example, broken links, misspelled words, and other characteristics. As an example, the use of the techniques and scores described in this disclosure can provide a complete and comprehensive overview of a website's web accessibility issues. User interfaces associated with presentation of the scores (and underlying determination thereof) can provide explanations of how the accessibility issues may affect users of the website, including providing specific recommendations on how to fix the accessibility issues. The quality scores can also be used to proactively manage SEO for the website and/or particular webpages in the website. The quality scores can be used to offer administrative tools for tasks such as managing keywords and page optimization relationships.

The quality scores of the website can be determined at predetermined time intervals. The quality scores can also be determined at request of a user, such as a website owner, via user input. In some implementations, the quality scores can be determined and periodically updated based on one or more changes that are identified in the website. The process 300 can also be used to determine an overall quality score for the website. In some implementations, the quality score for the website can be an aggregation of quality scores of the webpages that make up the website.

The process 300 can be performed by the web analysis server system 102. The process 300 can also be performed by one or more other computing systems, devices, computers, networks, cloud-based systems, and/or cloud-based services. For illustrative purposes, the process 300 is described from the perspective of a computer system.

Referring to the process 300, the computer system can locally execute and interpret code to render webpages of a website (302). Refer to FIGS. 1-2 for additional discussion about block 302.

The computer system can retrieve a set of conditions to evaluate across the webpages for the website in 304. The set of conditions can be used for scoring a webpage based on accessibility. Thus, a webpage can be scored on one or more conditions (e.g., criteria, factors). The set of conditions can relate to SEO, accessibility, and quality assurance. The same set of conditions can be used for assessing quality across different websites, which can beneficially provide a baseline metric for comparing quality of websites across the Internet as well as quality of an individual website over time. The same set of conditions can be used to generate quality scores for vertical comparison of websites, such as to compare all websites related to a same subject (e.g., cameras, sports, music, etc.), or to compare all websites in general. The use of such scoring techniques can be technically efficient to avoid large fluctuations that may otherwise occur with statistical weighting of metrics, which can permit for quality scores to be efficiently determined (e.g., real time website quality score determination).

The computer system can generate a quality score for each of the webpages based on evaluation of the set of conditions (306). For example, the computer system can determine whether each of the webpages satisfies the set of conditions. The quality score can be a numeric value on a scale of 0 to 100, where 100 can be a highest quality score and 0 can be a lowest quality score. The webpage can be assigned a predetermined amount of points based on how many of the conditions are satisfied (or not satisfied). For example, a webpage can start with a score of 100 and for each potential accessibility issue that is identified, the webpage's quality score can decrease a predetermined amount of points. The type of potential issue that is identified can also dictate how many points are to be deducted from the score.

Next, in 308, the computer system can identify one or more quality issues for each of the webpages. The quality issues can be identified based on the quality score of the webpage. In some implementations, the computer system may identify the quality issues and then determine a quantity of points to deduct from the webpage's quality score based on those identified quality issues. In 308, the computer system can identify potential quality issues. These issues can be identified as potential because they can require the website owner to go in and check if it is actually an issue.

As an example, the computer system can identify, based on reviewing page content in the website, that the word "tomato" is routinely spelt as "tomatoe." The computer system can flag this as a potential misspelling issue, which may prompt the website owner to review. The website owner can review this and determine that "tomatoe" is the correct spelling in their particular website and thus discard this as a potential issue. Once this potential issue is discarded (or resolved), the computer system can update the quality score for the webpage by assigning a predetermined amount of points that were deducted for this potential issue back to the quality score. In other words, the quality score for the webpage can be updated to include the predetermined amount of points that the potential issue initially cost the webpage quality score.

The computer system can store, for each webpage, at least one of (i) the quality score and (ii) the quality issues (310). (i)-(ii) can be stored in a data store, such as the data store 106. As described in reference to FIG. 2, the quality scores for the webpages can be stored and retrieved for historical analysis. In particular, quality scores of key pages at one or more different times can be retrieved and used by the computer system to determine whether the website owner prioritized review of their website by fixing the issues associated with the key pages. For example, an increase in a quality score of a key page can indicate that the website owner resolved one or more issues for that key page while a decrease in the quality score of the key page can indicate that the website owner has not prioritized review of their website and resolved the issue(s) for that key page.

Optionally, the computer system may also output at least one of (ii) the quality score and/or (ii) the quality issues for each webpage in a GUI display or other dashboard at the client computing device. Thus, the website owner can view a quality score and/or issues associated with a particular webpage. Outputting this information can provide visibility to the website owner about content of their website and how to improve the website to consequently improve end user experiences. Moreover, as described herein, the quality score and/or issues associated with a key page can be presented to the website owner in a variety of ways, views, and/or dashboards to increase visibility and help the website owner prioritize review of their website.

Figure 4:
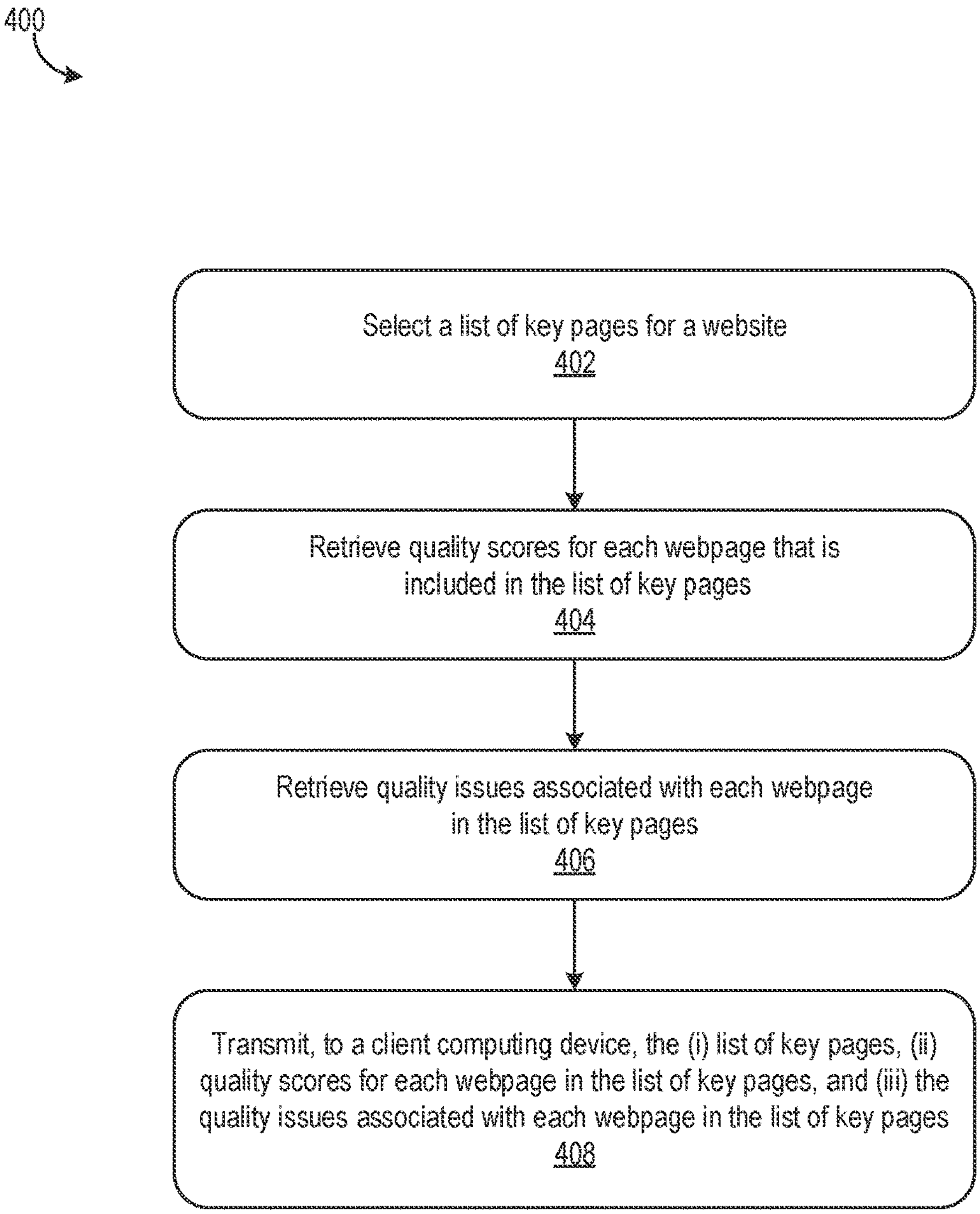
FIG. 4 is a flowchart of a process for generating output about key pages of a website.

FIG. 4 is a flowchart of a process 400 for generating output about key pages of a website. The process 400 can be performed to generate output such as the example GUI displays presented and described further in FIGS. 8-10. The process 400 can be performed by the web analysis server system 102. The process 400 can also be performed by one or more other computing systems, devices, computers, networks, cloud-based systems, and/or cloud-based services. For illustrative purposes, the process 400 is described from the perspective of a computer system.

Referring to the process 400 in FIG. 4, the computer system can select a list of key pages for a website in 402. In some implementations, the website may have a single list of key pages, which contains multiple subsets of key pages or a single set of key pages. The computer system can also receive user input designating what output the website owner would like to see. For example, the user can provide input that requests viewing a particular subset of key pages, such as all key pages that were identified for a set of "Christmas" key pages criteria. As another example, the computer system may select a list of key pages based on identifying privileges/access rights of the website owner or other relevant user who will view the list of key pages. Not all users that are associated with the website may have the same privileges to view the same information about the website. Therefore, the computer system can determine an appropriate set of key pages to show the user based on the user's privileges/access rights.

In 404, the computer system retrieves quality scores for each of the webpages that are included in the list of key pages. The quality scores can be stored in a data store, such as the data store 106. The computer system can retrieve most recently determined quality scores for the webpages in the list. Refer to FIG. 3 for additional discussion about generating the quality scores.

The computer system can also retrieve indications of quality issues that are associated with each of the webpages that are included in the list of key pages (406). As described herein, the quality scores and issues can be predetermined and then cached by one or more components of the computer system. As a result, during runtime, the computer system may simply retrieve this information quickly and efficiently, which saves compute resources and processing power.

The computer system can then transmit, to a client computing device, the (i) list of key pages, (ii) quality scores for each webpage in the list of key pages, and (iii) the quality issues associated with each webpage in the list of key pages (408). Items (i)-(iii) can be presented to the website user in one or more GUI displays, as described further in reference to FIGS. 8-10. The computer system can also transmit output that includes one or more options (e.g., buttons) that can be selected by the website owner to (i) filter the presented information, (ii) review more information about a particular key page in the list, and/or (iii) address, verify, change, or otherwise fix one or more issues that are identified for one or more of the key pages.

Figure 5:
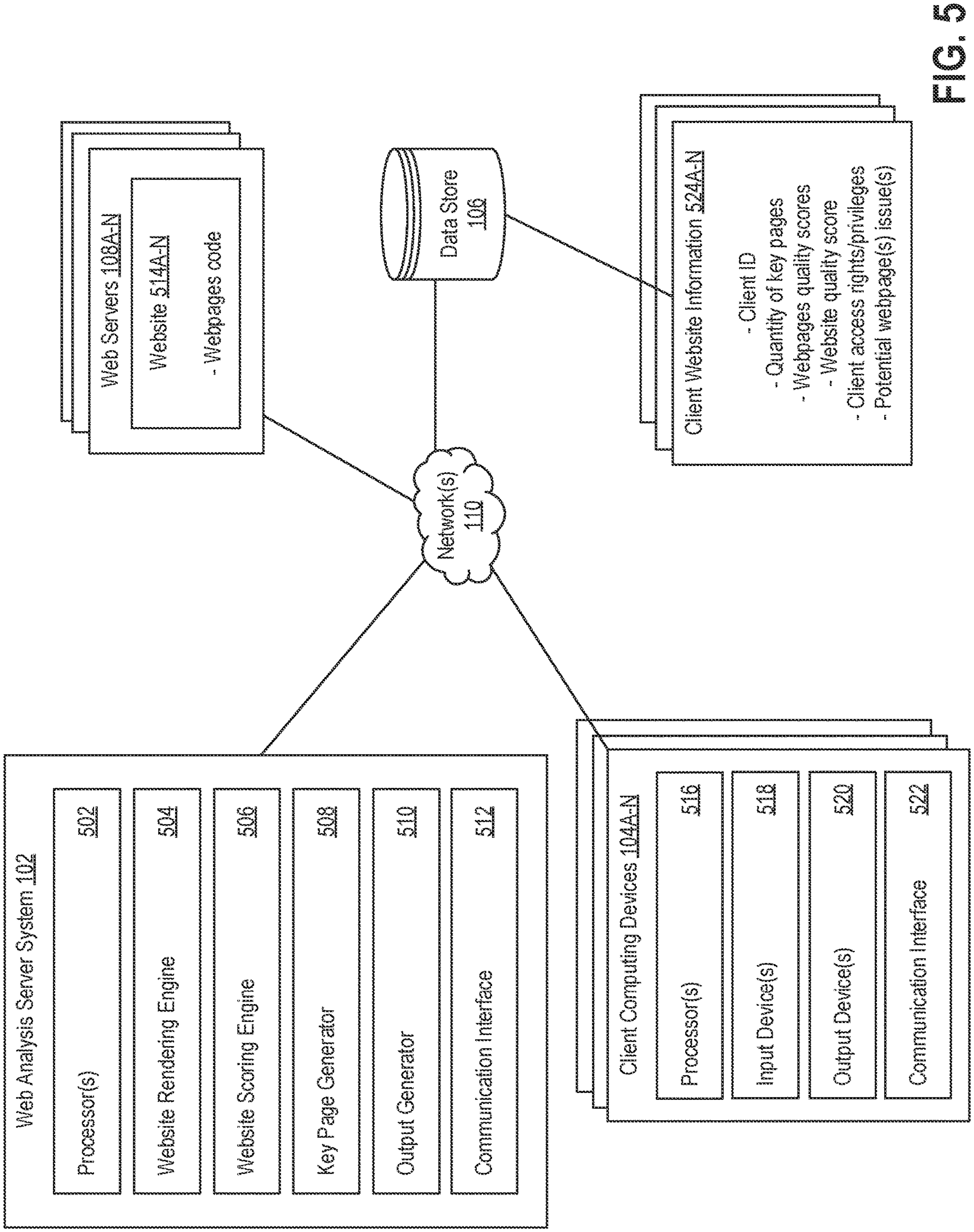
FIG. 5 is a system diagram depicting one or more components that can perform the techniques described herein.

FIG. 5 is a system diagram depicting one or more components that can perform the techniques described herein. As described herein, the web analysis server system 102, the client computing devices 104A-N, the data store 106, and the web servers 108A-N can be in communication via the network(s) 110.

The web analysis server system 102 can be configured to analyze websites, determine quality scores for the websites, identify key pages in the websites, identify issues in the websites, and provide a user, such as a website owner, with tools to assess and improve their website(s). Thus, the web analysis server system 102 can include a processor(s) 502, website rendering engine 504, website scoring engine 506, key page generator 508, output generator 510, and communication interface. The web analysis server system 102 can be any type of computing system, such as a computer or network of computers, and/or a cloud-based computing system and/or service.

The processor(s) 502 can be configured to execute instructions to perform one or more of the techniques described throughout this disclosure.

The website rendering engine 504 can be configured to render a website as it would appear at a user device, such as at the client computing devices 104A-N. As described herein, the website rendering engine 504 can retrieve webpage code for a website 514A-N from the web servers 108A-N. The engine 504 can then locally execute and render webpages of the website using the code. In some implementations, the engine 504 may also store a version of the rendered website in the data store 106 for fast retrieval during other processes.

The website scoring engine 506 can be configured to determine quality scores for each webpage of the website. The engine 506 can also be configured to identify potential issues in each webpage of the website. The engine 506 can also determine an overall quality score for the website based on an aggregation of quality scores for the webpages. The engine 506 can update the quality scores for the webpages based on real-time changes/modifications/updates that are made to the webpages of the website by the website owner. The quality scores for the webpages and/or the overall website quality score can be stored in the data store 106 as part of client website information 524A-N. As described herein, the quality scores can later be retrieved and used in historical analysis to determine whether the website owner is improving particular webpages and/or the website. The engine 506 can also store the identified potential issues in the client website information 524A-N at the data store 106.

The key page generator 508 can be configured to identify key pages using user-defined criteria. A dashboard or other GUI display presented at the client computing device 104A-N can provide the website owner with an opportunity to select and define criteria that can be used to identify key pages in the owner's website. The user-defined criteria can be transmitted by the client computing devices 104A-N to the key page generator 508. The generator 508 can continuously crawl the webpages of the rendered website to determine whether the webpages satisfy the criteria. The generator 508 can maintain a live count of how many webpages are identified as key pages. The generator 508 can also maintain a list of webpages that are identified as key pages.

As described herein, the user-defined criteria can be dynamically updated, set, and/or modified by the website owner. Whenever the criteria is updated, set, and/or modified, the generator 508 can automatically determine which webpages are key pages and update the live count in real-time. The live count can be transmitted to the client computing devices 104A-N and displayed therein as the website owner is defining the criteria and as the generator 508 is crawling the website and identifying key pages. Thus, the live count can update in real-time to reflect how many webpages are being identified as key pages using the user-defined criteria.

The live count can also be stored, as a quantity of key pages, in the client website information 524A-N at the data store 106. The quantity of key pages can be later retrieved by the web analysis server system 102 to perform a historical analysis to determine whether improvements have been made to the website, as described throughout this disclosure. Moreover, as described herein, the list of key pages may not be stored in the data store 106, especially since the list of key pages can dynamically change and include same or different webpages from one moment to the next. Instead, the list of key pages can be transmitted to the output generator 510.

The output generator 510 can be configured to generate output for presentation at the client computing devices 104A-N. Refer to FIGS. 8-10 for additional discussion about the output. The generator 510 can receive the list of key pages from the key page generator 508. The generator 510 can also retrieve one or more of the quantity of key pages, quality scores, and/or identified potential issues for the webpages in the list from the data store 106. The generator 510 can generate output that includes the list of key pages, the quantity of key pages, the quality scores for those webpages, and/or potential issues for those webpages. The generated output can also include information that can be rendered to present a user interface that includes one or more selectable options to filter the outputted information, view additional information about any of the webpages in the list, and/or respond to any of the issues that have been identified for any of the webpages in the list of key pages. The output generator 510 can then transmit the output to the client computing devices 104A-N to be presented to the website owner and/or other relevant users.

In some implementations, the generator 510 may also determine what type of output can be generated for a particular user, such as a website owner, a website developer, and/or a website operator. Each relevant user may have different access rights and/or privileges. Thus, not every relevant user may be allowed to view the same information about the website. The generator 510 can therefore retrieve the client access rights and/or privileges that are stored in the client website information 524A-N in the data store 106 to determine what information can be presented to what user. Then, the generator 510 can create the appropriate output to be presented to the appropriate user at the client computing devices 104A-N.

The client computing devices 104A-N can be any type of user device or computing device, including but not limited to a computer, laptop, tablet, cellphone, mobile phone, and/or smartphone. As described herein, each client computing device 104A-N can be operated and used by a website owner, client, website operator, or other relevant user. The website owner can review information about their website that is determined by the web analysis server system 102. This information can be used to identify issues in the website, assess quality of the website, and improve the website. The client computing devices 104A-N can deploy software, applications, or other services that are provided by the web analysis server system 102 to be used by the website owner in analyzing their website(s).

The client computing devices 104A-N can each include a processor(s) 516, input device(s) 518, output device(s) 520, and communication interface 522. The processor(s) 516 can execute instructions that cause the client computing devices 104A-N to perform one or more of the techniques described herein. The input device(s) 518 can include any type of device that can be used to provide input, by the website owners, to the client computing devices 104A-N. The input device(s) 518 can include but are not limited to keyboards, microphones, mice, and/or touchscreen displays.

The website owner can provide input via the input device (s) 518 such as selection of criteria that can be used by the web analysis server system 102 to identify key pages in the website. The website owner can also provide input via the input device(s) 518 to view one or more subsets of key pages and information corresponding to any of the outputted key pages. Moreover, the website owner can provide input via the input device(s) 518 to implement one or more changes that address issues across one or more key pages of the website.

The output devices(s) 520 can include any type of device that may provide output or otherwise display information to the website owner at the client computing devices 104A-N. The output device(s) 520 can include but is not limited to touchscreens, other types of display screens, speakers, headphones, and/or other types of devices for presenting information. The output device(s) 520 can display information, in a GUI display, such as the lists of key pages, issues associated with each key page, and/or quality scores of the key pages. The output device(s) 520 can also display selectable options for actions that can be taken in response to information presented at the client computing devices 104A-N. The selectable options can include but are not limited to selecting criteria to identify key pages, filtering a list of key pages based on issues, quality scores, and/or other features, checking one or more issues for listed key pages, and/or implementing changes to fix one or more of the issues for one or more of the key pages.

Finally, the communication interfaces 512 and 522 can be configured to provide communication between the components described herein.

FIG. 6 is an example GUI for user-selection of criteria that a system can use to identify key pages in a website. A key pages criteria GUI display 600 can be presented in a web browser at a user device, such as the client computing device 104 described herein. The display 600 can include a menu of options 602 that the website owner or other relevant user may select to view and access other modules, applications, and/or services provided by the web analysis server system 102 described herein.

The menu 602 can be presented on each GUI display in the web browser for increased ease of access to the different services provided to the relevant user. As an example, the menu 602 includes selectable options for digital certainty index (DCI), which can be used to view quality scores for the webpages of the website and/or an overall quality score for the website. The menu 602 also includes selectable options for quality assurance (a module that can be used to assess quality of particular webpages and/or the website as a whole), accessibility (a module that can be used to determine whether webpages and/or the website satisfy accessibility rules), SEO (a module that can be used to assess SEO of particular webpages and/or the website as a whole), policy (a module that can be used to determine whether a particular webpage, webpages, and/or the website satisfy one or more user-defined policies and rules), key pages (a module to view information about key pages and to set criteria for identifying key pages), analytics (a module to view information about various analytics that are performed on particular webpages and/or the website), response (a module to view information about whether a webpage and/or website is alive), data privacy (a module to assess whether particular webpages and/or the website are compliant with data privacy rules), ads (a module to assess ad performance, campaigns, and other information associated with digital content providers), performance (a module to analyze performance of particular webpages), and integrations (a module to view information about integrations of the web analysis server system 102 with third party analytics server providers). One or more additional or fewer selectable options can be presented in the menu 602. Moreover, the menu 602 can appear on each GUI display that is presented in the web browser.

In some implementations, selectable options in the menu 602 may vary depending on what module or GUI display is currently displayed. For example, in some implementations, the user interface is configured so that user interaction with one or more of the selectable options causes the selectable objects to expand to provide additional selectable options to the relevant user in the menu 602 when one of the selectable options is selected and presented in a GUI display. As an illustrative example, when the relevant user selects the Key Pages option, a new GUI display can be presented that outputs information about the key pages for the particular website. The menu 602 can be updated in the new GUI display to include two indented selectable options beneath Key Pages: Criteria and Results. The relevant user can select the Criteria option to create or modify key pages criteria that is used to identify key pages. The Results option can be selected to view a list of key pages that are identified using the user-defined criteria. One or more other options can also be provided in the menu 602.

In the example of FIG. 6, the relevant user is viewing the key pages criteria GUI display 600. Here, the relevant user can create a criteria set 604. As shown, the GUI display 600 can include a first section 612 that lists multiple different available types of criteria and a second section 614 that provides a region to present user-selected types of criteria. The GUI display 600 can receive user input to transfer a first type of criteria of the multiple different types of criteria from the first section 612 to the second section 614 to add the first type of criteria as a user-selected type of criteria.

The relevant user can define a criteria set name 606. The name 606 can be used to identify a subset of key pages that will be identified using the criteria that the relevant user selects. In some implementations, the name 606 may also be used as a tag that identifies webpages that are classified as key pages. The user can optionally select tags from a dropdown option 607 to tag the key pages with. Therefore, webpages that are identified as key pages using the user-specified criteria can also be tagged with the tags selected from the dropdown option 607. The user can search through and select from existing tags that populate the dropdown option 607. In other GUI displays described herein, the user can then search for key pages using the tags.

The GUI display 600 can also include an estimated key pages data element 608. As described herein, as the web analysis server system 102 crawls the website, webpages can be identified as key pages. As the webpages are identified as key pages, the system 102 can keep a live count of a total quantity of identified key pages. This live count can be displayed, and updated in real-time, in the estimated key pages data element 608. In the example of FIG. 6, the estimated key pages for the particular website that is being crawled, examplewebsitel .com, is "0" because the relevant user has not yet defined a key pages criteria. As the user defines the criteria, the "0" can be replaced by a rotating circle or other element that demonstrates that the website is being crawled. As webpages are identified as key pages, the rotating circle can be replaced with the live count of identified key pages.

The estimated key pages data element 608 can also indicate how many total webpages are part of the website, which can provide more scope to the relevant user about how many webpages are key pages relative to a total number of webpages in the website. After all, for example, if all the webpages are identified as key pages, or a significant quantity of the webpages are identified as key pages, then perhaps the relevant user should narrow their key pages criteria to generate a more curated list of webpages that matter the most for the website.

In the example of FIG. 6, from an initial crawl of the website, the web analysis server system 102 has identified a total of 3017 webpages in the website. The data element 608 also indicates that the total of 3017 webpages was determined during a last completed crawl of the website on Oct. 8, 2021. Whenever the website is crawled, the total number of webpages as well as the estimated number of key pages can be determined and updated in the estimated key pages data element 608. The data element 608 can also update to state when the last crawl occurred. In some implementations, the relevant user can navigate to one or more other dashboards or GUI displays to run a crawl of the website based on when the website was last crawled.

The GUI display 600 can also include a module element 610 for defining key pages criteria. The module element 610 can include a search field and a dropdown menu. The user can begin typing modules or criteria into the search field in order to view search results in the first section 612 (e.g., the criteria). The user can also select a module or criteria from a list of modules that appear when the user selects the dropdown menu. In some implementations, the module element 610 can also be in the form of another type of data element that has selectable options. The dropdown menu can include selectable options for all modules, ads, analytics, performance, quality assurance, and SEO. Each of these modules can be services that are provided by the web analysis server system 102 and/or one or more third party service providers that are integrated with the web analysis server system 102. When the relevant user selects one of these listed modules, criteria 612 (e.g., the first section) can be updated to include a set of criteria that can be used for identifying key pages in the selected module. Therefore, some of the criteria 612 depicted in the GUI display 600 may not be applicable to every module.

As shown in the example of FIG. 6, the relevant user has selected "All modules" from the drop down menu for the modules element 610. As a result of this selection, 15 criteria are presented in the criteria 612 that can then be selected by the relevant user and used to identify key pages. Since "All modules" have been selected, all available criteria that can be used to identify key pages are shown in the criteria 612. When the relevant user selects a particular module from the dropdown menu for the modules element 610, the 15 criteria can be filtered down to a set of criteria that are relevant to the user-selected module. In some implementations, one or more additional or fewer criteria can be presented in the criteria 612.

The criteria 612 can list multiple different criteria (e.g., conditions, factors) that can be selected by the relevant user and used, by the web analysis server system 102, to identify key pages in the website. The relevant user can select multiple of the criteria 612 by clicking on the + symbol/button next to each of the listed criteria 612. The listed criteria 612 can each include a brief description directly beneath a name of the criteria 612 to assist the relevant user in determining which criteria should be used for identifying key pages.

In some implementations, the relevant user may only desire to use one of the criteria 612 to identify key pages. When selecting multiple of the criteria 612, the relevant user may also select whether all of the selected criteria must be satisfied to identify a key page or whether one or more of the selected criteria must be satisfied. Thus, the relevant user can select what logical operators (AND, OR, NOT) to couple with the multiple criteria.

As described in reference to the process 200 in FIGS. 2A-C, the criteria 612 can include content match, new pages, referring pages, tagged pages, pages with specific HTML elements, page level, top-ranking pages, pages with high traffic, pages in funnels, pages in a campaign, pages with behavior maps, target pages, pages monitored for performance, and/or ads landing pages. One or more other criteria can also be defined and outputted as the criteria 612. In some implementations, the relevant user may also define new criteria that is not displayed as the criteria 612.

Moreover, whenever the relevant user selects one of the criteria 612, the selected criteria can appear in criteria block 614 (e.g., the second section). The user can provide user input to transfer the first type of criteria from the first section 612 to the criteria block 614. The user input can be selection of a visual depiction of the first type of criteria within the first section 612, such as a box with a plus symbol therein. When this user input is received, the GUI display 600 can be updated to remove the visual depiction of the first type of criteria from the first section 612. The criteria block 614 can also be updated to include a visual depiction of the first type of criteria. Moreover, the visual depiction of the first type of criteria within the first section 612 can include no user-editable field and the visual depiction of the first type of criteria within the criteria block 614 after its addition to the criteria block 614 can include at least one user-editable field, as shown and described in FIGS. 7A-E.

The criteria block 614 can include all of the selected criteria. In the criteria block 614, the relevant user may define one or more parameters that can further refine the selected criteria. Thus, webpages in the website would have to satisfy or meet the parameters that are defined for each of the selected criteria in the criteria block 614, as described in FIGS. 7A-E.

Figure 7A:
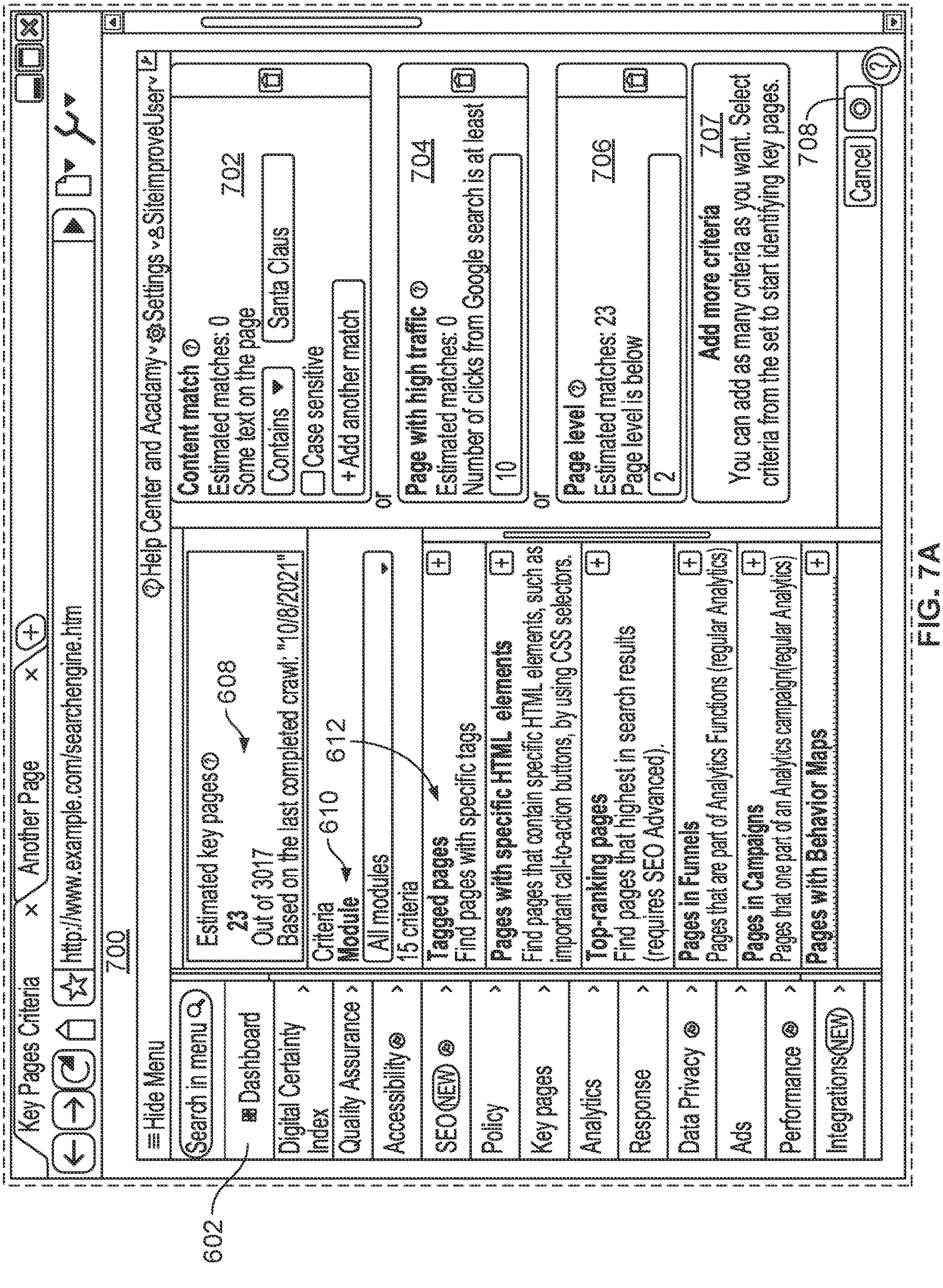
FIGS. 7A-E are example GUIs that enable user-selection of multiple criteria to identify key pages in a website.

FIGS. 7A-E are example GUIs that enable user-selection of key pages in a website. FIGS. 7A-E depict an updated key pages criteria GUI display 700. In the example of FIG. 7A, which is a continuation of the GUI display 600 in FIG. 6, the relevant user has selected three of the criteria 612 to be used in identifying key pages in the examplewebsite1.com. A first criteria 702 is content match, a second criteria 704 is pages with high traffic, and a third criteria 706 is page level. The relevant user has set/defined parameters for each of the criteria 702-706. In other words, the user can provide user input by interacting with the user-editable fields in each of the criteria 702-706 to specify values. Moreover, the relevant user has selected the logical operator of OR between each of the criteria 702-706, which means that a webpage must satisfy the parameters of any one of the criteria 702-706 to be identified as a key page. The relevant user may also add one or more additional criteria to be used for identifying the key pages by selecting the + symbol/button next to any of the criteria 612.

Based on defining the criteria 702-706, the web analysis server system 102 has already identified 23 out of the 3017 webpages of the website as key pages. The live count of 23 can be outputted in the estimated key pages data element 608. As the relevant user makes changes to the parameters of the criteria 702-704 and/or removes or adds criteria, the live count depicted in the data element 608 can be dynamically updated to reflect real-time crawling of the website. In other words, when the user provides user input indicating interaction with the user-editable fields of the criteria 702-706 to change any of the fields from first values to second values, the web analysis server system 102 can update the user-specified criteria for identifying key pages. The web analysis server system 102 can determine a second matching subset of webpages of the user-selected webpage that satisfy the updated criteria, including identifying an updated quantity of webpages of the user-selected website that satisfy the updated criteria and therefore form the second matching subset of webpages. The updated quantity of webpages can therefore be different from an initial quantity of webpages.

In the example GUI display 700 of FIG. 7A, each of the selected criteria 702-706 presents information to the relevant user. For example, the first criteria 702 for content match includes a question mark icon, which the user can hover over or select to view additional information about what content match is. The first criteria 702 can also present an estimated number of matches, which can be updated in real-time as the website is crawled. The estimated matches value can be aggregated with estimated matches values of the other criteria 704 and 706 to determine the estimated key pages presented in the data element 608.

In the first criteria 702, the relevant user can indicate particular text, characters, words, or string of words that, if appearing on the webpage, would qualify the webpage as a key page. Here, the relevant user decided that some text on the page should contain "Santa Claus" in order to qualify as a key page. The relevant user can change "contains" by clicking on the corresponding drop down menu. Instead of "contains," for example, the relevant user can select "is exactly" or one or more other parameters that can narrow or broaden a list of returned key pages. The relevant user can further narrow a list of identified key pages by selecting the checkbox for "case sensitive." The relevant user may also select the button/option to "+Add another match." Thus, the relevant user can add multiple content matches that can be used to identify a key page. In the example of FIG. 7A, the web analysis server system 102 has determined that 0 of 3017 webpages contain "Santa Claus" in the text of the webpages. Thus, no key pages are identified using the first criteria 702. Since the user defined the criteria 702-706 using the OR operator, the web analysis server system 102 can still identify key pages if either the criteria 704 or 706 are satisfied.

The second criteria 704 for pages with high traffic also includes a question mark icon that the user can hover over or select to view additional information about how pages with high traffic is defined and used as key pages criteria. The second criteria 704 can also present an estimated number of matches, which can be updated in real-time as the website is crawled. The estimated matches value can be aggregated with estimated matches values of the other criteria 702 and 706 to determine the estimated key pages presented in the data element 608.

In the second criteria 704, the relevant user can indicate a number of clicks from search engine results that it would take to reach a webpage (e.g., a number of times individuals have selects a search result that navigates to the webpage). Here, the relevant user defined the number of clicks as at least 10. Therefore, any webpage that takes 10 or more clicks from a search engine can be identified as a key page.

In the example of FIG. 7A, the web analysis server system 102 has determined that 0 of 3017 webpages take at least 10 clicks from the search engine to be reached. Thus, no key pages are identified using the second criteria 704. Since the user defined the criteria 702-706 using the OR operator, the web analysis server system 102 can still identify key pages if the criteria 706 is satisfied.

The third criteria 706 for page level also includes a question mark icon which the user can hover over or select to view additional information about how page level is used to identify key pages. The page level can be used to identify key pages based on their proximity to a homepage of the website (e.g., index URL, root URL). The third criteria 706 can also present an estimated number of matches, which can be updated in real-time as the website is crawled. The estimated matches value can be aggregated with estimated matches values of the other criteria 702 and 704 to determine the estimated key pages presented in the data element 608. In the third criteria 706, the relevant user can indicate a page level that is below some user-defined numeric value. Here, the relevant user decided that the page level should be below 2 (e.g., less than 2 page levels, which means less than 2 clicks are used to reach a webpage from the homepage of the website). In the example of FIG. 7A, the web analysis server system 102 has determined that 23 of 3017 webpages have a page level that is below 2. These 23 pages can be added to the live count in the estimated key pages data element 608. Since the criteria 702 and 704 did not return any estimated matches, the estimated key pages for the website exam plewebsite1.com only contains webpages that were identified using the third criteria 706.

Each criteria added to criteria block 707 (e.g., the second section, the right side of the GUI display 700, the criteria block 614 in FIG. 6) can include different fields for the relevant user to fill in and thus define the respective criteria. Moreover, the relevant user can add as many of the criterion from the criteria 612 to the criteria block 614. When the relevant user adds more of the criteria from the criteria 612 to the criteria block 707, the added criteria can be removed from the criteria 612.

Furthermore, a button 708 may be presented at a bottom portion of the GUI display 700. The button 708 may not be selectable while the relevant user is adding criteria to the criteria block 707. The button 708 may not be selected while the estimated key pages data element 608 is being calculated, updated, and/or presented in the GUI display 700. When the button 708 is not selectable, a spinning dial/circle may appear over the button 708. Once the button 708 becomes selectable (e.g., the estimated key pages data element 608 presents an updated quantity of key pages that match the selected criteria in the criteria block 707), the button 708 can be presented in an indicia, such as a color, with the text "Done" or "Save." The relevant user can select the button 708 to save the criteria that was added to and defined in the criteria block 707.

Figure 7B:
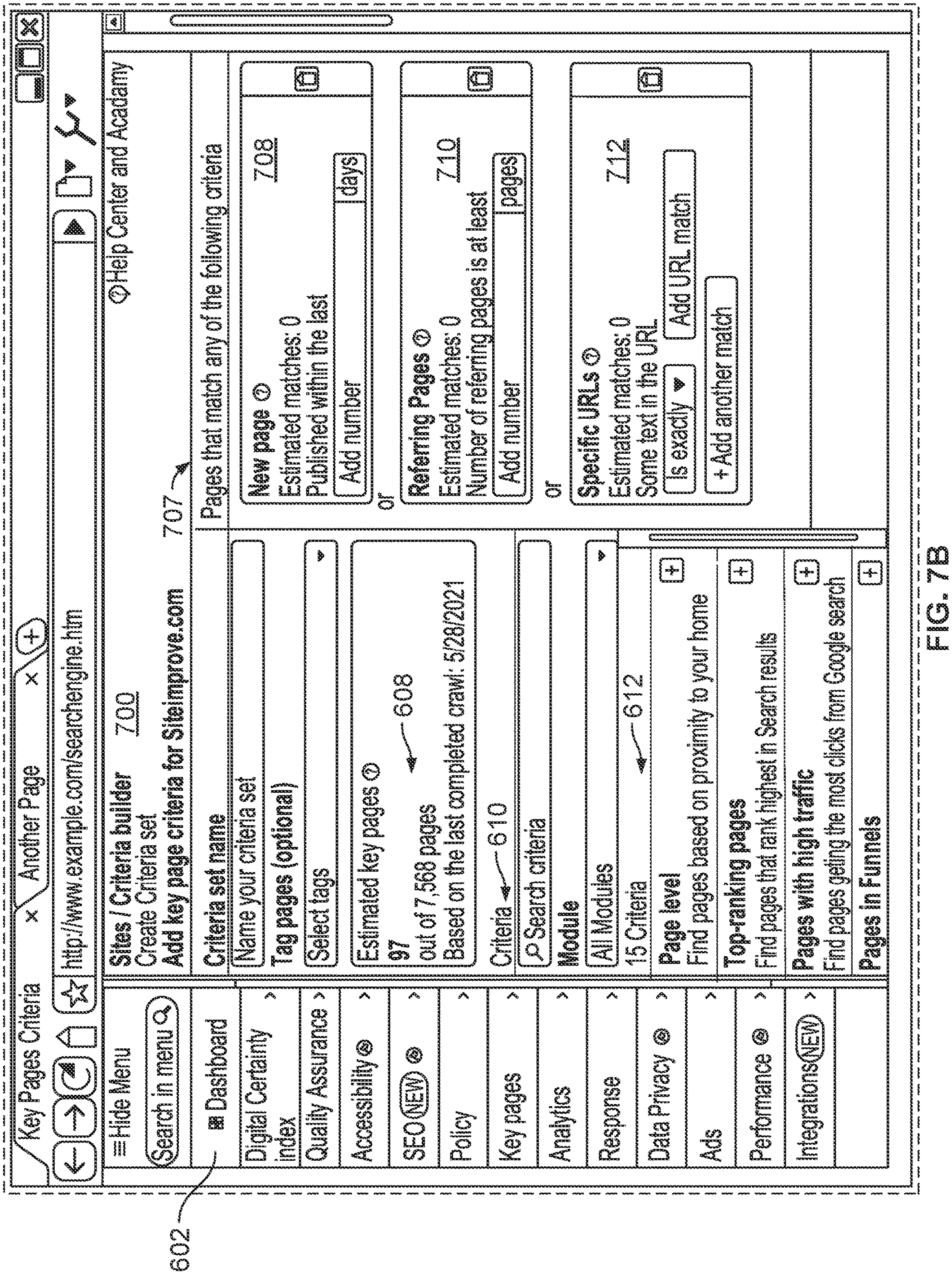

As shown in FIG. 7B, the relevant user has added the content match criterion 702, a new pages criterion 708, a referring pages criterion 710, and a specific URL criterion 712 to the criteria block 707. In brief, for the new pages criterion 708, the relevant user can input a number of last days that the new pages should be published within. For the referring pages criterion 710, the relevant user can input a minimum number of referring pages. For the specific URLs criterion 712, the relevant user can input at least some text that should appear in the specific URLs. The relevant user can choose whether the specific URLs should merely contain any of the text or exactly match the text. The relevant user can also input multiple URL matches for this criterion.

Moreover, the criteria 612 has now been updated in that the criteria 702, 708, 710, and 712 are no longer part of the criteria 612. In FIG. 6, before any of the criteria 612 was selected by the relevant user, a first criterion in the list of criteria 612 was "Content match." Now, as shown in FIG. 7B, the criterion at the top of the list of criteria 612 is "Tagged pages" since the content match criterion 702, the new pages criterion 708, the referring pages criterion 710, and the specific URL criterion 712 have been added to the criteria block 707.

Figure 7C:
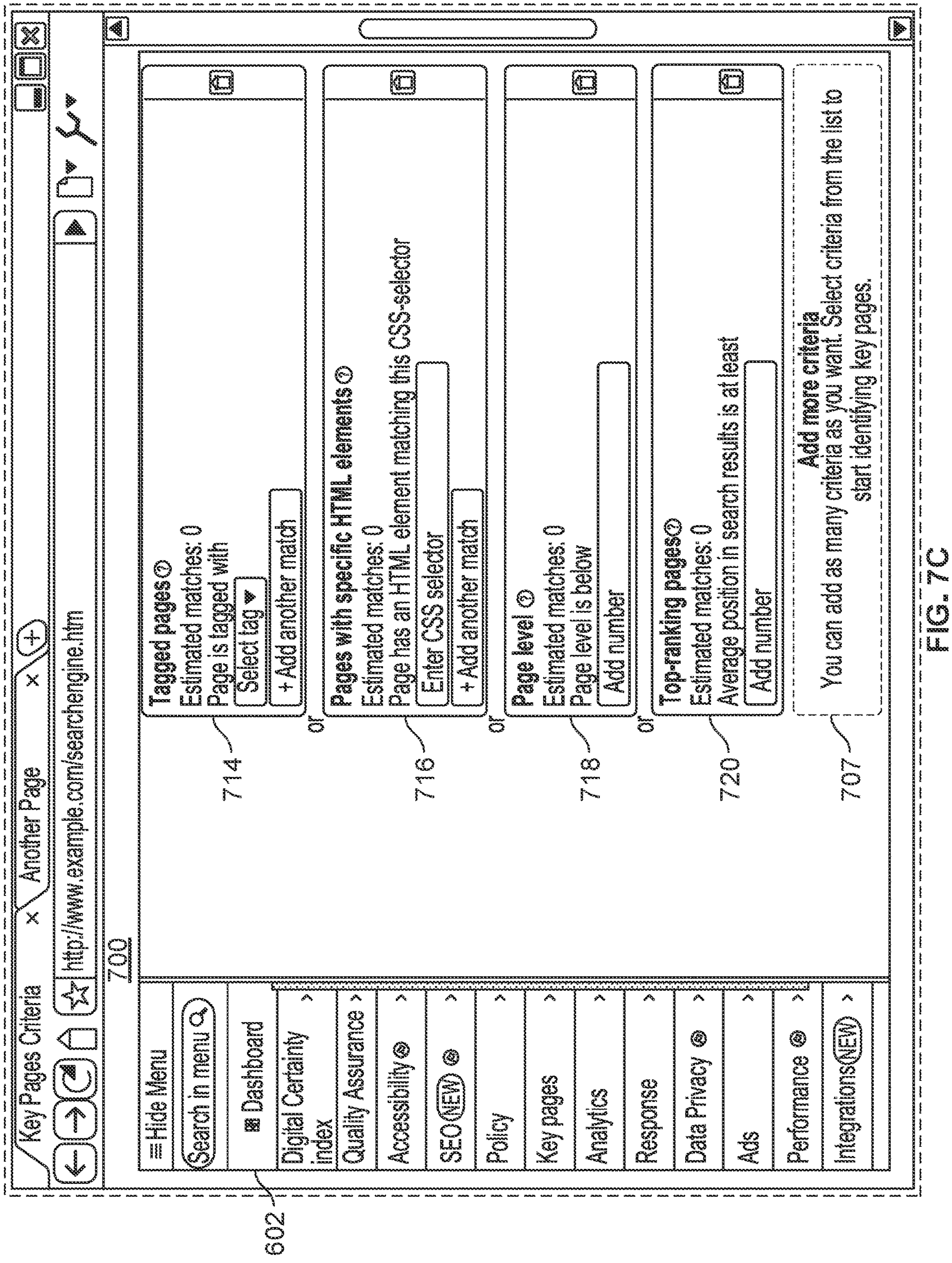

As shown in FIG. 7C, the relevant user has added additional criteria from the criteria 612 to the criteria block 707. The relevant user has selected a tagged pages criterion 714, a pages with specific HTML elements criterion 716, a page level criterion 718, and a top-ranking pages criterion 720. By selecting the criteria 714, 716, 718, and 720, and adding the selected criteria to the criteria block 707, the criteria block 707 has extended/expanded in length such that the relevant user is now scrolled midway from a top of the GUI display 700 (in FIGS. 7A-B, the relevant user was scrolled to a top of the GUI display 700 because less content was presented in the criteria block 707). As a result of being scrolled midway from the top of the GUI display 700, estimated key pages data element 608, module element 610, and criteria 612 may no longer be visible. To view estimated key pages data element 608, module element 610, and criteria 612, the relevant user may scroll back up in the GUI display 700.

In brief, for the tagged pages criterion 714, the relevant user can select tags from a dropdown menu that the page(s) should be tagged with. For the pages with specific HTML elements criterion 716, the user can input one or more CSS selectors of which the page(s) HTML elements should match. For the page level criterion 718, the relevant user can input a number indicating a level that the page(s) should be below. For the top-ranking pages criterion 720, the relevant user can input a minimum average position in search results that the page(s) should have.

Figure 7D:
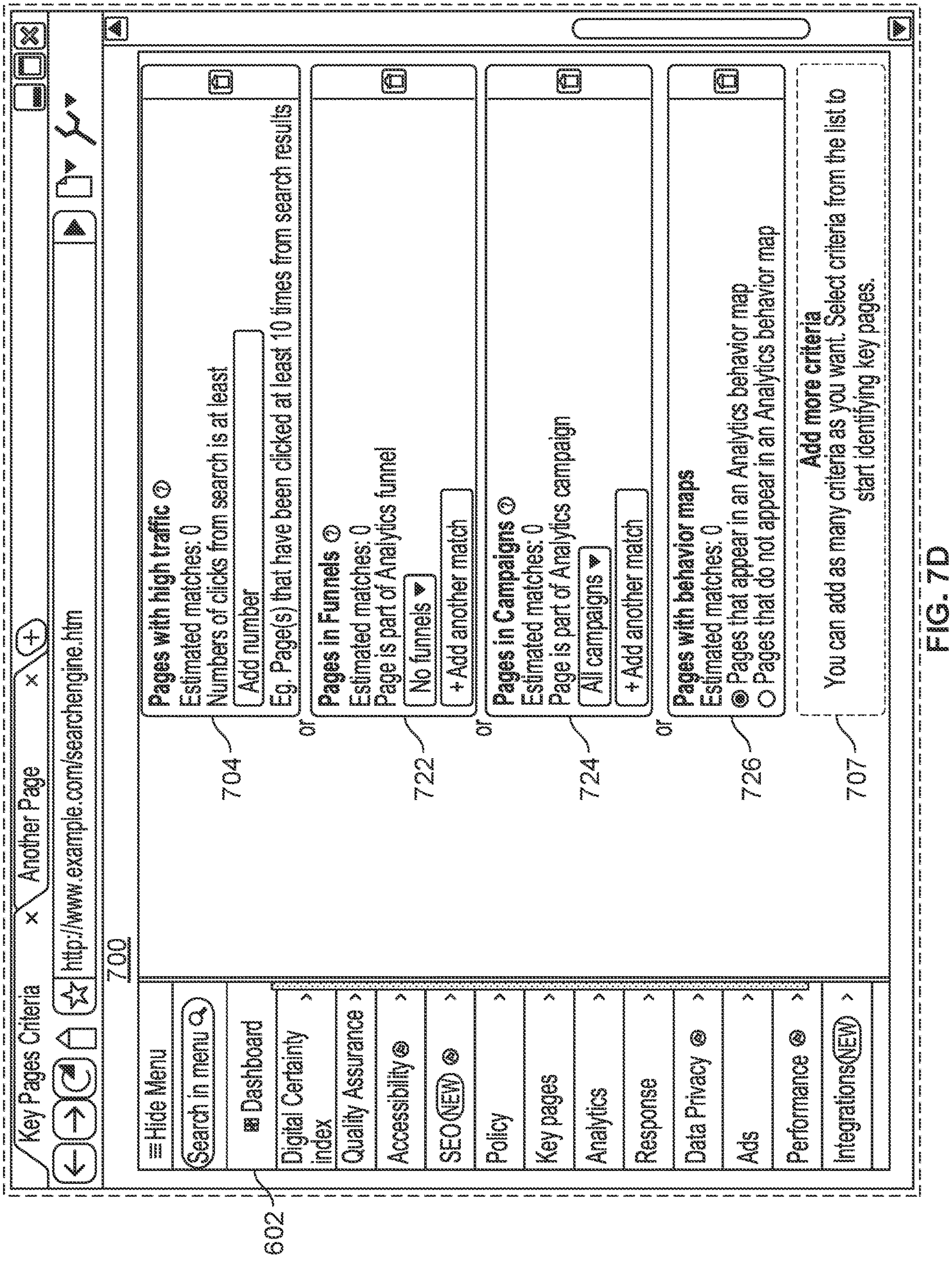

In FIG. 7D, the relevant user has added additional criteria to the criteria block 707. The user has selected the pages with high traffic criterion 704, pages in funnels criterion 722, pages in campaigns criterion 724, and pages with behavior maps 726. Since adding the criteria 704, 722, 724, and 726 to the criteria block 707, the GUI display 700 is scrolled further down in comparison to the GUI display 700 in FIGS. 7A-C.

For the pages with high traffic criterion 704, the relevant user can input a minimum number of clicks from a search engine that the page(s) should have. For the pages in funnels criterion 722, the relevant user can select, from a dropdown menu, whether the page is part of one or more analytics funnels. For the pages in campaign criterion 724, the user can select, from a dropdown menu, whether the page is part of one or more analytics campaigns. For the pages with behavior maps criterion 726, the user can select between an option for pages appearing in an analytics behavior map and an option for pages that do not appear in the analytics behavior map.

Figure 7E:
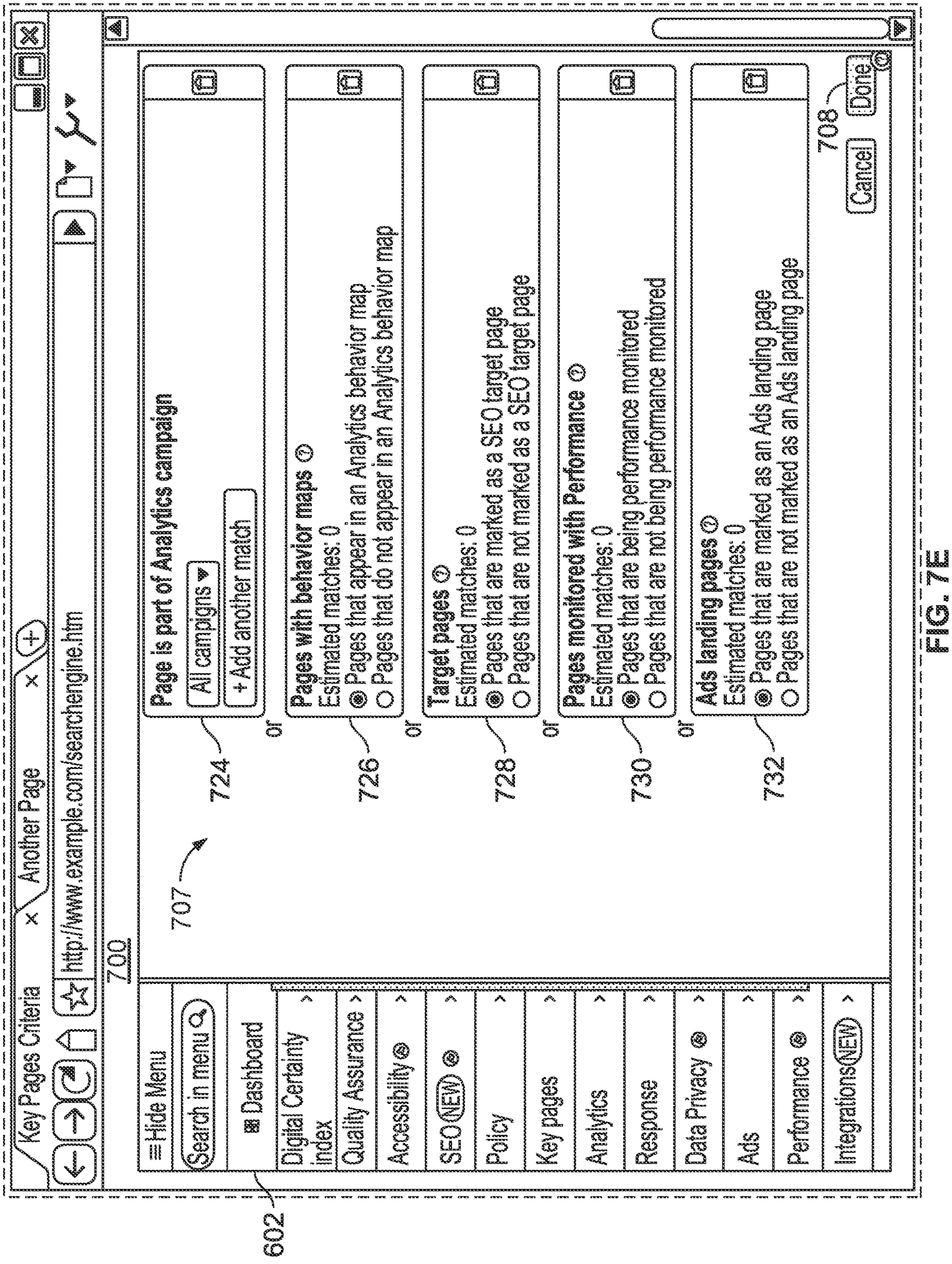

In FIG. 7E, the relevant user has added any remaining criteria from the criteria 612 to the criteria block 707. As a result, the GUI display 700 is scrolled to a bottom of the GUI display 700. The relevant user can now view buttons at the bottom of the GUI display 700, such as the button 708. As described herein, the button 708 is now selectable by the relevant user. The relevant user can also view at least a portion of the criteria that was previously added to the criteria block 707. For example, the relevant user can view a portion of the pages in campaign criterion 724 and the pages with behavior maps criterion 726.

Here, the relevant user added a target pages criterion 728, a pages monitored with performance criterion 730, and an ads landing page 732. For the target pages criterion 728, the user can select between an option for pages that are marked as SEO target pages and an option for pages that are not marked as SEO target pages.

For the pages monitored with performance criterion 730, the user can select between an option for pages that are being performance monitored and an option for pages that are not being performance monitored. For the ads landing page criterion 732, the user can select between an option for pages that are marked as an ads landing page and an option for pages that are not marked as an ads landing page.

Once the relevant user defines the criteria as shown in FIGS. 7A-E and the live count of identified key pages is outputted in the estimated key pages data element 608, the relevant user can select the button 708. By clicking on the button 708, the criteria defined in the criteria block 707 as well as a list of identified key pages can be saved (e.g., in a data store) and presented to the relevant user in another interface, GUI display, and/or dashboard. Identified key pages can also be aggregated into a list and presented to the relevant user in a table or other data element(s), as shown in FIGS. 8-10.

In some implementations, as described briefly above, the button 708 may not be selectable while the relevant user is defining or setting the criteria and/or when the web analysis server system 102 is crawling the website to identify key pages. For example, the button 708 can be grayed out or replaced by a rotating circle until the website is done being crawled and/or the estimated key pages is updated in the data element 608. Once the estimated key pages is determined (e.g., the live count of identified key pages) and/or the relevant user is finished with creating the criteria in the criteria block 707, the button 708 can no longer be grayed out, may no longer include the rotating circle, and can be selected by the relevant user. In some implementations, the criteria in the criteria block 707 and/or the live count can be automatically saved as the relevant user is defining the criteria in the criteria block 707 and/or the web analysis server system is crawling the website to identify key pages.

FIG. 8 is an example GUI for displaying key pages across multiple websites. In other words, the GUI depicted in FIG. 8 can be beneficial to view a more holistic overview of key pages per website and based on different sets of criteria for each of those websites. Using the GUI of FIG. 8, the relevant user can open additional displays and/or dashboards to get more granular views, visibility, and information about criteria used for a particular website, key pages identified for the particular website, and potential issues identified for the key pages of the particular website. Thus, the relevant user can work down from a broader view and understanding of key pages for various websites to a granular view and understanding of issues for key pages in a particular website by using GUIs such as the GUI depicted in FIG. 8.

Sites GUI display 800 can depict information about key pages based on website. As shown in FIG. 8 compared to FIGS. 6-7, menu 802 is an updated view of the menu 602. For example, the relevant user, such as the website owner, might have selected the Key Pages option in the menu 602 shown in FIGS. 6-7. When the relevant user selects that option, they are brought to the Sites GUI display 800. The relevant user may also be brought to a Pages GUI display, which is shown in FIGS. 9A-B. The menu 802 now shows that the relevant user has selected the Key Pages option and is currently looking at the Sites GUI display 800 (the word Sites in the menu 802 is highlighted or otherwise shown in an indicia (e.g., white, bold font) that designates Sites as being selected and viewed by the relevant user) and of the two subset selectable options, Pages and Sites for Key Pages.

The Sites GUI display 800 can present at least two tables to the relevant user: a manage key pages table 804 and a key pages criteria for a particular website table 806. The relevant user can select any of the websites that are listed in the table 804 to then view, in the table 806, information about what criteria was used to identify key pages in that website. Thus, the table 806 can be populated with information about the key pages criteria or criterion that was designated for the user-selected website from table 804.

The manage key pages table 804 can include columns or attributes including but not limited to name of the website, URL, total number of webpages for the website, total number of identified key pages (e.g., the live count in FIGS. 6-7), a quantity of sets of criteria, and a selectable option to add a criteria set for the website. The relevant user can sort the contents in the table 804 using any one or more of these attributes. For example, the relevant user can sort the websites based on most to least identified key pages. As another example, the websites can be sorted from most to least total pages, which is the sorting depicted in FIG. 8.

In the example in FIG. 8, 4 websites are listed in the table 804. "0" key pages were identified in "2" of the websites. One of those websites, DevSite.Examplewebsite.com has no set of criteria for identifying key pages. Upon viewing this information, the relevant user, such as the website owner, can decide to click the +button for this website to add a set of criteria, or multiple sets of criteria, to identify key pages in this website. Upon selecting the + button, the relevant user can be redirected to the GUI display 600 depicted in FIG. 6.

Websites that have sets of criteria can include a dropdown option/arrow next to the respective quantity of sets of criteria. Selecting this option can provide the relevant user with an expanded view of information about the criteria. This information can be presented in the key pages criteria for a particular website table 806.

In the example of FIG. 8, the relevant user has clicked on the dropdown option/arrow for Exam plewebsite.2018.com, the last website listed in the table 804. Of the 3,017 webpages in this website, 1,365 webpages were identified as key pages using five sets of criteria. These five sets of criteria are presented in the table 806.

The table 806 can include one or more of the parameters and other information that was defined by the relevant user in the GUI displays 600 and 700 in FIGS. 6-7. For example, the table 806 can include a name of the criteria set, information about who created the criteria set, when the criteria set was created, when the criteria set was modified, who modified the criteria set, how many criteria make up the set (e.g., as shown in FIGS. 6-7, the relevant user can select criteria from a list of potential criteria, where the list can include, in some implementations, fourteen types of criteria), how many key pages were identified using that criteria set, and selectable options represented by a button having " . . . " The criteria sets in the table 806 can be sorted using any one or more of these parameters and other information. For example, the criteria sets can be sorted based on most recent modifications to oldest or no modifications. The criteria sets can also be sorted based on most identified key pages to fewest identified key pages. In the example of FIG. 8, the criteria sets are sorted in alphabetical order by name.

In the table 806, the relevant user can select a dropdown arrow next to each quantity of criteria in a set. By clicking the dropdown arrow, the relevant user can view additional information about the particular criteria, including but not limited to parameters that were inputted and set by the relevant user in the GUI display 700 of FIG. 7. The relevant user can also view information such as how many pages were identified for each of the criteria in a set of criteria. In some implementations, the relevant user may also select any of the criteria that is displayed to be brought to another display and/or dashboard that presents information about the key pages that were identified using that criteria (e.g., refer to the GUIs in FIGS. 9A-B).

The relevant user can also select the " . . . " button to be presented with options to edit or delete a criteria set. If the relevant user selects the option to edit the criteria set, the relevant user can be brought to another GUI display, such as the GUI displays 600 and 700 in FIGS. 6-7. By selecting the option to delete the criteria set, the criteria set can be removed from the table 806 and the web analysis server system 102 can update information about a quantity of identified key pages and a number of sets of criteria for the associated website in the table 804.

FIG. 9A is an example GUI for displaying key pages in a particular website. In other words, the GUI depicted in FIG. 9A can be beneficial to view which particular key pages were identified for the particular website, which is a more granular view of key pages than the GUI display 800 in FIG. 8. Pages GUI display 900 can depict information about key pages for a particulate website that is selected by the relevant user. For example, the relevant user can select "examplewebsite.2018.com" from the Sites GUI display 800 in FIG. 8 to be directed to the Pages GUI display 900.

As shown in FIG. 9A, and as described in FIG. 8, the menu 802 is an updated view of the menu 602. For example, the relevant user, such as the website owner, might have selected the Key Pages option in the menu 602 shown in FIGS. 6-7. When the relevant user selects that option, they can be brought to the Pages GUI display 900. Thus, the web analysis server system 102 can receive user input indicating a request to view a list of first matching subset of webpages that satisfy the user-specified criteria. The web analysis server system 102 can provide information to a device of the user that causes the device to present the information in the GUI display 900.

The menu 802 now shows that the relevant user has selected the Key Pages option and is currently looking at the Pages GUI display 900 (the word Pages in the menu 802 is highlighted or otherwise shown in an indicia (e.g., white, bold font) that designates Pages as being selected and viewed by the relevant user) and of the two subset selectable options, Pages and Sites for Key Pages.

As shown in FIG. 9A, a key pages overview is presented in the Pages GUI display 900 as a total key pages that were identified 902 and an average quality score 904 (e.g., an indication of an overall quality score based on a combined analysis of all webpages in the first matching subset of webpages). The total key pages 902 can be a total count (e.g., the live count of FIGS. 6-7) indicating how many key pages were identified using user-defined key pages criteria in the website "examplewebsite.2018.com." The average quality score 904 can be an aggregation of quality scores for all of the identified key pages.

The total key pages 902 can be depicted in the Pages GUI display as a numerical value. In the example of FIG. 9A, the total key pages 902 for "examplewebsite.2018.com" is 3,795 webpages. The average quality score 904 can be depicted with a circle and a numerical value in the center of the circle. The circle can have a bar that extends around the perimeter of the circle. The bar can be shaded with two different indicia, where a total distance of the first indicia in the perimeter of the circle can represent the numerical value in the center of the circle. Any remaining distance of the perimeter of the circle that is not filled in by the first indicia can be filled in by the second indicia. In some implementations, the first and second indicia can be colors. For example, the first indicia can be a color that corresponds to one or more ranges of the average quality score. For example, average quality scores that are within a range of 0-50 can be represented by the first indicia in a red color. Average quality scores that are within a range of 50-75 can be represented by the first indicia in a yellow color. Average quality scores that are within a range of 75-100 can be represented by the first indicia in a green color. Thus, the green color can indicate a good quality score while the red color can indicate a poor quality score.

The second indicia can be a constant color. For example, the second indicia can be a grey tone. The second indicia can represent a quantity of points that the average quality score does not have, or rather, a quantity of points that are needed for the average quality score to equal 100.

In the example of FIG. 9A, the average quality score 904 for the 3,795 identified key pages is "92.2 out of 100." Thus, the perimeter of the circle is shaded with the first indicia in a green color to cover a distance of the perimeter of the circle that equates to 92.2% of the circle's total perimeter. A remaining 7.8% of the perimeter of the circle is shaded with the second indicia in a grey tone to show how close the average quality score 904 is to reaching a score of 100. The average quality score 904 is also outputted in the center of the circle as a numerical value. Outputting the average quality score 904 with the circle depiction as well as the numerical value can be beneficial to improve usability of services provided to the relevant user and to make it easy for the relevant user to quickly assess the key pages in their website.

The Pages GUI display 900 can also output key pages for the selected site table 906. The table 906 can be presented in the display 900 based on receiving user input indicating a request to view a listing of the first matching subset of webpages. The table 906 can therefore provide a list of all webpages in the website "examplewebsite.2018.com" that were identified as key pages using the user-specified criteria. The user can filter what webpages are shown in the table 906 using a criteria sets dropdown option 905. The dropdown option 905 can present a list of all criteria sets that have been identified and specified by the user. Once the user selects one of the listed criteria sets, the table 906 can be automatically and dynamically updated to present only a subset of webpages that have been identified using the particular selected criteria. The total key pages 902 and the average quality score 904 can also be automatically and dynamically updated based on the subset of webpages that were identified using the particular selected criteria. For example, if the user selects "Camp" criteria set from the dropdown option 905 and the table 906 is populated with one webpage that was identified using the "Camp" criteria set, then a quality score of the one webpage may become the average quality score 904. The total key pages 902 may also be updated to show "1."

For each webpage of at least a plurality of webpages in the first matching subset of webpages, a name or URL of the respective webpage and a quality score for the respective webpage determined by the web analysis server system 102 based on analysis of code of the respective webpage can be presented in the table 906. The table 906 can also include a number of issues identified for the respective webpage by the web analysis server system 102, the number of issues identified being provided as a less-than perfect value for the quality score.

The table 906 can therefore include one or more columns or attributes, including but not limited to a webpage title, webpage URL, tags, quality score of the webpage, and quantity of issues identified in the webpage. The table 906 can include additional information, including but not limited to a set of criteria that was used to identify the webpage as a key page. The information presented in the table 906 can be predetermined by one or more components (e.g., engines, modules, services) of the web analysis server system 102 and cached. When the table 906 is generated, the web analysis server system 102 can simply reference the cached data and present it in table format. This can be beneficial to prevent lagging in compute resources and processing efficiency that otherwise may result from calculating and determining all the information presented in the table 906 in real-time (e.g., when the table 906 is generated).

The relevant user can also sort the key pages based on one or more of the title, URL, quality score, and number of issues.

The relevant user may also filter the key pages using one or more filtering options 908A-N. For example, the relevant user can filter the list of key pages presented in the table 906 based on tags by selecting from dropdown menu 908A. The tags presented in the dropdown menu 908A can include tags that have been created by the relevant user using tagging (e.g., grouping) services provided by the web analysis server system 102. The tags can be related to webpages in the website. The user can begin typing tags into a search bar in the dropdown menu 908A to view related or relevant tags. The user can also scroll through the tags presented in the dropdown menu 908A and select one or more of those tags. Moreover, the user can toggle between showing items with at least one of the selected tag(s) and all the selected tags. Once the user makes a selection or selections in the dropdown menu 908A, the user can select an option to "Confirm" their selection(s). When this option is selected, the table 906 can be automatically and dynamically updated based on the user input in the dropdown menu 908A.

Each user can define different tags, and thus, the tags presented in the dropdown menu 908A can be unique and different for each user. Moreover, an unlimited number of tags can be presented in the dropdown menu 908A. For example, a first user can create 10 tags for their website. All 10 tags can appear as selectable options in the dropdown menu 908A. A second user, on the other hand, can create 100 tags and all 100 of these tags can be presented as selectable options in the dropdown menu 908A.

The relevant user may also search through the list of key pages and identify a particular key page by typing in one or more search strings into search box 908N. For example, the relevant user may select a searching option 908B to be URL. The relevant user can then input a particular URL into the search box 908N that the user wants to identify in the table 906. As the relevant user types in the particular URL, the results in the table 906 can narrow down to key pages having the part of the URL that the relevant user is typing into the search box 908N. By the time the relevant user finishes typing in the particular URL into the search box 908N, the table 906 may only present the key page associated with the particular inputted URL. As another example, the relevant user can filter the key pages using the criteria that was used to identify the key pages.

Referring back to the table 906, the quality score for each webpage can be represented similarly to the average quality score 904. Thus, the quality score for each webpage can be depicted as a circle with a perimeter that is shaded in the first and second indicia. The quality score can also be depicted as a numerical value in the center of the circle.

The relevant user may also select a dropdown arrow next to the quantity of identified issues for any of the webpages in the table 906. By clicking on the dropdown arrow, the relevant user can view additional information about the particular issues identified for that webpage. For example, by clicking on the dropdown arrow, the Pages GUI display 900 can be updated to include issues for the particular webpage as shown and described in FIG. 9B. This display of issues can be beneficial to improve visibility of issues for key pages and assist the relevant user in prioritizing updating the webpages in the website. Moreover, since the relevant user can view identified issues and select options to respond to those issues within one GUI display 900, the relevant user may not have to navigate to different modules provided by the web analysis server system to respond to the issues. The disclosed GUI display 900 therefore provides for a user friendly interface that assists the user in quickly visualizing and addressing issues in the website.

FIG. 9B is an example GUI for displaying issues in a key page of a particular website. When the relevant user selects the dropdown arrow for a quantity of issues for a particular webpage in the table 906 of FIG. 9A, the Pages GUI display 900 can be updated to include issues on this page table 910. The table 910 can therefore be presented in the same Pages GUI display 900 to provide information about each of the issues that were identified for the particular webpage selected by the relevant user.

In the example of FIG. 9B, the relevant user selected the dropdown arrow next to 36 identified issues for webpage "examplewebsite.2018/webpage1.com." All thirty-six potential issues associated with this webpage are then outputted in the table 910. The table 910 can present a certain quantity of the issues at a time to be more user friendly and easy for the relevant user to digest. The relevant user can then toggle through multiple pages of the table 910 to view all of the issues identified for the particular webpage.

The table 910 can include columns or attributes including but not limited to the issue, module, points the relevant user can gain, tasks, and a selectable options button. The issue column can include a description that briefly identifies the type of issue. Example descriptions include, but are not limited to, "Broken links at page level 3 and deeper," "pages with misspellings," "frequency of new content," pages with frames or iFrames," and "images with empty alt attributes." One or more other descriptions can be used to identify other types of issues for the webpage. Moreover, the relevant user can click on any of the descriptions in the issue column to be brought to another GUI display in which the relevant user can review the selected issue, determine whether it is in fact an issue, and address/remedy the issue.

The issue column can also include a graphical depiction that indicates whether the issue is a potential issue, an actual issue, or a resolved issue (e.g., not an issue). For example, the graphical depiction can be a red circle with a red "!" inside the circle. This can indicate that an actual issue that has been identified and that can be addressed by the relevant user. As another example, the graphical depiction can be an orange triangle, which can indicate a potential issue that has been identified and that should be checked by the relevant user to determine whether it is in fact an actual issue and thus should be addressed/resolved. As yet another example, the graphical depiction can be a green checkmark or other tick mark, which can indicate that a potential or actual issue is now a resolved issue. The same graphical depictions can be used across all analytics services provided by the web analysis server system to provide the relevant user with consistent, visually appealing, and user-friendly components and visualizations.

The module column can indicate what module or service the issue is associated with. This column can also indicate which module identified the potential issue. As described herein, the web analysis server system can provide multiple services to the relevant user to assist them in assessing their website and improving it. The different services provided are included in the menu 602 in FIGS. 6-7. These services can include but are not limited to DCI, quality assurance, accessibility, SEO, policy, key pages, analytics, response, data privacy, ads, performance, and integrations. Each of these services can run/execute at different times to determine particular information about the website and/or webpages of the website. Information determined by these services can be cached and then retrieved and referenced by the web analysis server system 102 to output information, such as in the table 910. In the example table 910, the first three issues were identified by the Quality Assurance service and the following two issues were identified by the SEO service. The relevant user can sort the issues based on the module (e.g., group the issues based on module).

The points to gain column in the table 910 can indicate how many points the relevant user may gain on the quality score for the particular webpage by addressing each issue. The relevant user may sort the issues based on the points they can gain. In the example of FIG. 9B, the table 910 is sorted based on points to gain, from most points to least amount of points. Here, if the relevant user fixes the first issue listed, the quality score for the webpage can gain 7 points. On the other hand, if the relevant user fixes the fifth issue listed, the quality score for the webpage can gain 0.67 points. The web analysis server system 102 can determine the points to gain based on how many points are deducted from a perfect quality score because of that issue. In other words, the system 102 can determine how many points the quality score would be assigned if the particular issue did not exist. That quantity of points can be the amount of points the quality score can gain by fixing the issue. In some implementations, if the relevant user clicks into one of the issues and determines that it is not actually an issue, the points to gain can be automatically added to the quality score for the webpage.

The tasks column in the table 910 can indicate one or more tasks that have been designated by the relevant user or other users that are associated with the webpage. The tasks can be activities that the relevant user or other users plan to perform in order to fix and/or address the identified issues. The tasks can indicate who will be fixing the issue and what they will be doing. An issue can have multiple tasks. The relevant user can click into any of the tasks to view more information about those tasks. The relevant user can also generate tasks by clicking on the selectable option/button next to the tasks. When there are no tasks for a particular issue, as shown for all five of the outputted issues, the tasks button can be greyed out and thus not selectable. The tasks button can also include text that says "No tasks." If tasks are identified for an issue, then the tasks button can be full opacity and selectable. The tasks button can also indicate how many tasks are identified for the issue. For example, if five tasks have been made for an issue, the tasks button can have text that states "5 tasks."

FIG. 10 is an example GUI for displaying key pages based on policies of a website. As described throughout this disclosure, key pages are visible and accessible through multiple dashboards (e.g., accessibility, SEO, ads, policies, etc.) to be more user-friendly and to assist the relevant user in prioritizing, reviewing, and addressing issues associated with key pages, regardless of what dashboard or analytics service they are using.

My Policies GUI display 1000 is another option for the relevant user to view key pages. As shown in FIG. 10 compared to FIGS. 6-7, menu 1002 is an updated view of the menu 602. For example, the relevant user, such as the website owner, might have selected the "Policy" option in the menu 602 shown in FIGS. 6-7. When the relevant user selects that option, they are brought to the My Policies GUI display 1000. This policy module can be used by the relevant user to run checks on the user's website's adherence to one or more pre-set policies. Therefore, the relevant user can stay informed as to whether the website ever violates a rule or standard in the pre-set policies. As described further below, key pages is also baked into the My Policies GUI display 1000 so that the relevant user can not only view potential policy violations and run policy violation scans, but also view key pages.

The menu 1002 now shows that the relevant user has selected the "Policy" option and is currently looking at the My Policies GUI display 1000 (the words My Policies in the menu 1002 are highlighted or otherwise shown in an indicia (e.g., white, bold font) that designates My Policies as being selected and viewed by the relevant user) of the four subset selectable options, "Policy Overview," "My Policies," "Policy Library," and "My Sites."

The My Policies GUI display 1000 includes a graph 1004. The relevant user can toggle between a trend graph and a multi-graph. Depicted in FIG. 10 is a trend graph. The graph 1004 can depict matches (a number of webpages that have issues with a policy) and occurrences (a number of times that the issues appear in a webpage) over time for webpages of a particular website. In the graph 1004, 273 matches and 333 occurrences are depicted, all of which begin around Sep 10, 2021 and continue to Oct. 5, 2021. The relevant user may also adjust a timeframe that is shown along the x axis of the graph.

The My Policies GUI display 100 also includes a table 1006. The table 1006 can list the webpages that are identified as matches and/or occurrences in the graph 1004. The relevant user can then sift through the webpages listed in the table 1006 and click into them to view additional information. The table 1006 can include, for each webpage, a refresh button, title, URL, selectable option to view more information about the webpage, page level, when a match was detected, number of occurrences, details, tags, an edit button, and a tasks button. The relevant user may also sort through the webpages in the table based on title, URL, when the match was detected, and occurrences.

Moreover, the relevant user can filter through the table 1006 using filtering options 1008A-N. For example, the relevant user can select dropdown option 1008A to filter the table 1006 based on matches. The relevant user can filter between all matches or ignore one or more matches. To ignore one or more matches, the relevant user can select a button having a cancel symbol next to each of the listed URLs in the table 1006 that the relevant user desires to ignore. In this example, the relevant user has selected "All matches" in the dropdown option 1008A.

The relevant user can also select dropdown option 10086 to filter the table 1006 based on tags or other attributes represented in the table 1006. As described above, the dropdown option 10086 can include a list of tags that have been defined by the relevant user for the particular webpage and/or website. In some implementations, if the relevant user wants to view key pages in the table 1006, the relevant user can select tags from the dropdown option 10086 that the relevant user knows are associated with or otherwise applied to key pages that satisfy the user-defined criteria set(s) (e.g., refer to the dropdown option 607 in FIG. 6). Here, the relevant user has selected "Filter by tag." As a result, all results in the table 1006 are filtered and grouped by tags.

The relevant user can also select dropdown option 1008C to select an attribute to search by in the table 1006 for one or more particular table entries. The dropdown option 1008C can include selectable options for "URL" and "webpage title." Therefore, the relevant user can search for entries in the title based on either a URL or a title of the webpage. Here, the relevant user has selected "URL." In search box 1008N, the relevant user may input a URL or part of a URL. The relevant user can then press the magnifying glass icon/button next to the search box 1008N to cause the web analysis server system 102 to search the table 1006 for any entries containing the string that was entered by the relevant user into the search box 1008N. The table 1006 can then be updated to include only the search results.

Key pages can be identified in the My Policies GUI display 1000 using the tags. The relevant user may not only filter the table 1006 by tags but can also search the table 1006 for particular tags using the search box 1008N. Therefore, the relevant user can view only webpages in the My Policies GUI display 1000 that are identified as key pages. The relevant user may desire to prioritize review of potential policy issues for just the identified key pages. As previously described, when a webpage is identified as a key page, the web analysis server system 102 can tag the webpage as a key page, which can provide for easy and quick identification of key pages for a website. Here, the relevant user filtered by tags. As a result, the webpages listed in the table 1006 are grouped together based on their tags. The first four webpages have the same three tags. One of those tags is "AKeyPagesTest1." In the example of FIG. 10, this tag can represent a key page. Therefore, the relevant user can see that these four webpages are key pages, which can alter the relevant user's plan to address potential issues, such as policy violations, in these webpages.

Although FIG. 10 depicts and describes identifying key pages from the My Policies GUI display 1000, key pages can also be identified in similar ways in various other GUI displays provided by the web analysis server system 102. For example, in a quality assurance pages readability GUI display, a list of webpages can be presented in a table based on their readability levels, as determined by the web analysis server system 102. The relevant user can sort through the list and update what pages are presented in the table based on filtering with tags. The relevant user can, for example, select tags that are associated with key pages, or otherwise assigned to webpages that are identified by the web analysis server system 102 as satisfying the user-specified criteria. As another example, in a websites GUI display, a list of websites associated with the user can be presented in a table. The relevant user can sort through the list based on tags, as described herein. Therefore, the relevant user can view all websites that have tags associated with user-specified criteria. In other words, the relevant user can view all websites that have key pages.

Figure 11:
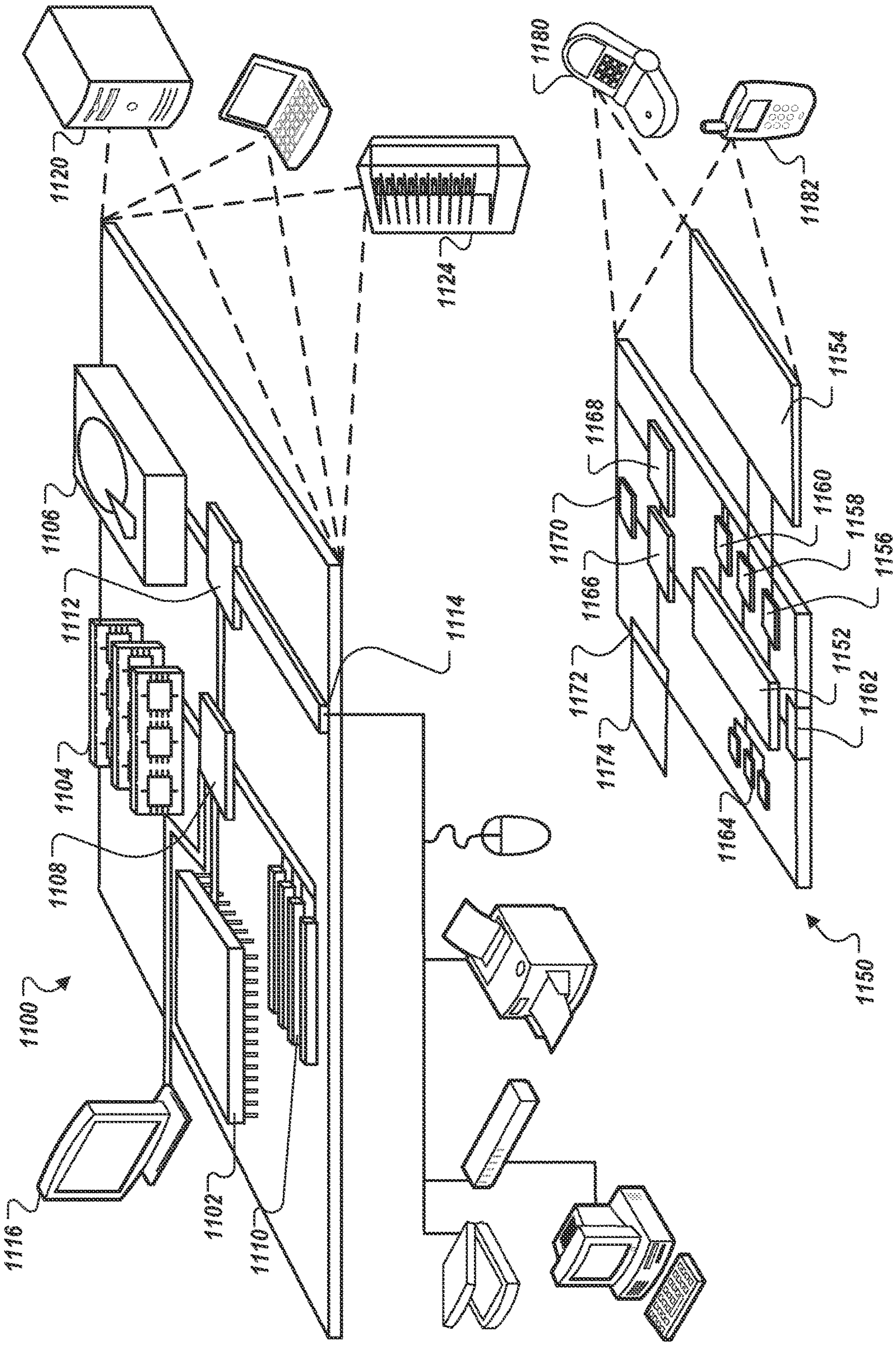
FIG. 11 is a schematic diagram that shows an example of a computing device and a mobile computing device.

FIG. 11 shows an example of a computing device 1100 and an example of a mobile computing device that can be used to implement the techniques described here. The computing device 1100 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 1100 includes a processor 1102, a memory 1104, a storage device 1106, a high-speed interface 1108 connecting to the memory 1104 and multiple high-speed expansion ports 1110, and a low-speed interface 1112 connecting to a low-speed expansion port 1114 and the storage device 1106. Each of the processor 1102, the memory 1104, the storage device 1106, the high-speed interface 1108, the high-speed expansion ports 1110, and the low-speed interface 1112, are interconnected using various busses, and can be mounted on a common motherboard or in other manners as appropriate. The processor 1102 can process instructions for execution within the computing device 1100, including instructions stored in the memory 1104 or on the storage device 1106 to display graphical information for a GUI on an external input/output device, such as a display 1116 coupled to the high-speed interface 1108. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 1104 stores information within the computing device 1100. In some implementations, the memory 1104 is a volatile memory unit or units. In some implementations, the memory 1104 is a non-volatile memory unit or units. The memory 1104 can also be another form of computer-readable medium, such as a magnetic or optical disk.

The storage device 1106 is capable of providing mass storage for the computing device 1100. In some implementations, the storage device 1106 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 1104, the storage device 1106, or memory on the processor 1102.

The high-speed interface 1108 manages bandwidth-intensive operations for the computing device 1100, while the low-speed interface 1112 manages lower bandwidth-intensive operations. Such allocation of functions is exemplary only. In some implementations, the high-speed interface

1108 is coupled to the memory 1104, the display 1116 (e.g., through a graphics processor or accelerator), and to the high-speed expansion ports 1110, which can accept various expansion cards (not shown). In the implementation, the low-speed interface 1112 is coupled to the storage device 1106 and the low-speed expansion port 1114. The low-speed expansion port 1114, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 1100 can be implemented in a number of different forms, as shown in the figure. For example, it can be implemented as a standard server 1120, or multiple times in a group of such servers. In addition, it can be implemented in a personal computer such as a laptop computer 1122. It can also be implemented as part of a rack server system 1124. Alternatively, components from the computing device 1100 can be combined with other components in a mobile device (not shown), such as a mobile computing device 1150. Each of such devices can contain one or more of the computing device 1100 and the mobile computing device 1150, and an entire system can be made up of multiple computing devices communicating with each other.

The mobile computing device 1150 includes a processor 1152, a memory 1164, an input/output device such as a display 1154, a communication interface 1166, and a transceiver 1168, among other components. The mobile computing device 1150 can also be provided with a storage device, such as a micro-drive or other device, to provide additional storage. Each of the processor 1152, the memory 1164, the display 1154, the communication interface 1166, and the transceiver 1168, are interconnected using various buses, and several of the components can be mounted on a common motherboard or in other manners as appropriate.

The processor 1152 can execute instructions within the mobile computing device 1150, including instructions stored in the memory 1164. The processor 1152 can be implemented as a chipset of chips that include separate and multiple analog and digital processors. The processor 1152 can provide, for example, for coordination of the other components of the mobile computing device 1150, such as control of user interfaces, applications run by the mobile computing device 1150, and wireless communication by the mobile computing device 1150.

The processor 1152 can communicate with a user through a control interface 1158 and a display interface 1156 coupled to the display 1154. The display 1154 can be, for example, a TFT (Thin-Film-Transistor Liquid Crystal Display) display or an OLED (Organic Light Emitting Diode) display, or other appropriate display technology. The display interface 1156 can comprise appropriate circuitry for driving the display 1154 to present graphical and other information to a user. The control interface 1158 can receive commands from a user and convert them for submission to the processor 1152. In addition, an external interface 1162 can provide communication with the processor 1152, so as to enable near area communication of the mobile computing device 1150 with other devices. The external interface 1162 can provide, for example, for wired communication in some implementations, or for wireless communication in other implementations, and multiple interfaces can also be used.

The memory 1164 stores information within the mobile computing device 1150. The memory 1164 can be implemented as one or more of a computer-readable medium or media, a volatile memory unit or units, or a non-volatile memory unit or units. An expansion memory 1174 can also be provided and connected to the mobile computing device 1150 through an expansion interface 1172, which can include, for example, a SIMM (Single In Line Memory Module) card interface. The expansion memory 1174 can provide extra storage space for the mobile computing device 1150, or can also store applications or other information for the mobile computing device 1150. Specifically, the expansion memory 1174 can include instructions to carry out or supplement the processes described above, and can include secure information also. Thus, for example, the expansion memory 1174 can be provide as a security module for the mobile computing device 1150, and can be programmed with instructions that permit secure use of the mobile computing device 1150. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 1164, the expansion memory 1174, or memory on the processor 1152. In some implementations, the computer program product can be received in a propagated signal, for example, over the transceiver 1168 or the external interface 1162.

The mobile computing device 1150 can communicate wirelessly through the communication interface 1166, which can include digital signal processing circuitry where necessary. The communication interface 1166 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 1168 using a radio-frequency. In addition, short-range communication can occur, such as using a Bluetooth, WiFi, or other such transceiver (not shown). In addition, a GPS (Global Positioning System) receiver module 1170 can provide additional navigation- and location-related wireless data to the mobile computing device 1150, which can be used as appropriate by applications running on the mobile computing device 1150.

The mobile computing device 1150 can also communicate audibly using an audio codec 1160, which can receive spoken information from a user and convert it to usable digital information. The audio codec 1160 can likewise generate audible sound for a user, such as through a speaker, e.g., in a handset of the mobile computing device 1150. Such sound can include sound from voice telephone calls, can include recorded sound (e.g., voice messages, music files, etc.) and can also include sound generated by applications operating on the mobile computing device 1150.

The mobile computing device 1150 can be implemented in a number of different forms, as shown in the figure. For example, it can be implemented as a cellular telephone 1180.

It can also be implemented as part of a smart-phone 1182, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A computer-implemented method for determining a set of website pages based on automated website analysis, the method comprising:

identifying, by a computing system, a user-selected website to evaluate, the user-selected website comprising multiple webpages;

retrieving, by the computing system, code for the multiple webpages of the user-selected website from one or more web server systems that host the user-selected website;

locally executing and interpreting, by the computing system, the code to render the multiple webpages as client computing devices would render the multiple webpages;

receiving, by the computing system, an indication that user input at a remote computing device indicated user-specified criteria that specify webpage characteristics, wherein the user-specified criteria comprises a combination of criteria that spans across multiple different types of webpage elements, wherein the combination of criteria comprises webpage content, webpage code elements, user webpage behavior, and webpage performance metrics, wherein the webpage content is dynamic content that is displayed to a user as executed in a browser at a client computing device, wherein the webpage code elements are static content from webpage files that are provided by the web server systems that host the user-selected website, wherein the user webpage behavior is determined from user data and browser data indicating user interactions with the dynamic content, wherein the webpage performance metrics are generated from one or more search engines;

determining, by the computing system, a first matching subset of webpages from the user-selected website that satisfy the user-specified criteria, including identifying an initial quantity of webpages of the user-selected website that satisfy the user-specified criteria and form the first matching subset of webpages;

iteratively tagging, by the computing system, each webpage in the first matching subset of webpages as a key page amongst the multiple webpages of the user-selected website based on a process comprising:

retrieving data indicating at least user behavior associated with the webpage, determining whether the retrieved data for the webpage satisfies the user-specified criteria, and tagging the webpage based on a determination that the retrieved data satisfies the user-specified criteria; and returning, by the computing system, information to the remote computing device to cause the remote computing device to present (i) an indication of the initial quantity of webpages that satisfy the user-specified criteria, and (ii) information associated with the initial quantity of webpages to be used for modifying at least one of the tagged webpages.

2. The computer-implemented method of claim 1, comprising:

providing, by the computing system, information to the remote computing device to cause the remote computing device to present a user interface that:

(i) includes a first section that lists multiple different available types of criteria;

(ii) includes a second section provides a region to present user-selected types of criteria; and (iii) is configured to receive user input to transfer a first type of criteria of the multiple different types of criteria from the first section to the second section to add the first type of criteria as a user-selected type of criteria.

3. The computer-implemented method of claim 2, wherein:

receiving user input to transfer the first type of criteria from the first section to the second section includes receiving user selection of a visual depiction of the first type of criteria within the first section of the user interface.

4. The computer-implemented method of claim 2, wherein:

responsive to receiving user input to transfer the first type of criteria from the first section to the second section, the user interface is configured to add a visual depiction of the first type of criteria to the second section of the user interface.

5. The computer-implemented method of claim 4, wherein:

responsive to receiving user input to transfer the first type of criteria from the first section to the second section, the user interface is configured to remove the visual depiction of the first type of criteria from the first section of the user interface.

6. The computer-implemented method of claim 4, wherein:

the visual depiction of the first type of criteria within the first section of the user interface includes no user-editable field; and the visual depiction of the first type of criteria within the second section of the user interface after its addition to the second section of the user interface includes a user-editable field.

7. The computer-implemented method of claim 6, wherein the user input at the remote computing device that indicated user-specified criteria includes user input that interacts with the user-editable field to specify a first value.

8. The computer-implemented method of claim 7, comprising:

receiving, by the computing system, an indication that user input at the remote computing device interacted with the user-editable field to change the field from the first value to a second value, to update the user-specified criteria to an updated user-specified criteria;

determining, by the computing system, a second matching subset of webpages of the user-selected website that satisfy the updated user-specified criteria, including identifying an updated quantity of webpages of the user-selected website that satisfy the updated user-specified criteria and form the second matching subset of webpages, the updated quantity of webpages being different from the initial quantity of webpages; and returning, by the computing system, information to the remote computing device to cause the remote computing device to modify presentation of (i) the indication of the quantity of webpages that satisfy the user-specified criteria, to (ii) an indication of the updated quantity of webpages that satisfy the updated user-specified criteria.

9. The computer-implemented method of claim 2, wherein:

the user input at the remote computing device that indicated user-specified criteria includes the user input that transferred the first type of criteria from the first section to the second section;

the identifying the initial quantity of webpages that satisfy the user-specified criteria is based on the user-specified criteria including the first type of criteria and not including a second type of criteria;

the method comprises receiving, by the computing system an indication that user input at the remote computing device transferred the second type of criteria from the first section to the second section to update the user-specified criteria to an updated user-specified criteria that includes both the first type of criteria and the second type of criteria;

the method comprises determining, by the computing system, a second matching subset of webpages of the user-selected website that satisfy the updated user-specified criteria, by satisfying both the first type of criteria and the second type of criteria, including identifying an updated quantity of webpages of the user-selected website that satisfy the updated user-specified criteria; and the method comprises returning, by the computing system, information to the remote computing device to cause the remote computing device to present an indication of the updated quantity of webpages that satisfy the updated user-specified criteria, the updated quantity of webpages being different from the initial quantity of webpages.

10. The computer-implemented method of claim 9, wherein the remote computing device presenting the indication of the updated quantity of webpages includes the user interface replacing the presentation of the initial quantity of webpages with the updated quantity of webpages while continuing to present the user interface.

11. The computer-implemented method of claim 1, comprising:

receiving, by the computing system after the computing system has received the indication that user input at the remote computing device indicated the user-specified criteria, a request to view a list of the first matching subset of webpages that satisfy the user-specified criteria; and returning, by the computing system responsive to receiving the request to view the listing of the first matching subset of webpages, information to the remote computing device to cause the remote computing device to present:

(1) an indication of an overall quality score based on a combined analysis of webpages in the first matching subset of webpages; and (2) for each respective webpage of at least a portion of webpages in the first matching subset of webpages:

(i) a name or URL of the webpage, and (ii) a quality score for the webpage determined by the computing system based on analysis of the multiple different types of webpage elements of the webpage.

12. The computer-implemented method of claim 11, wherein the information returned to the remote computing device responsive to receiving the request to view the listing of the first matching subset of webpages is configured to cause the remote computing device to present, for each respective webpage of the at least portion of webpages in the first matching subset of webpages:

(iii) a number of issues identified for the webpage by the computing system, the number of issues identified for the webpage resulting in the webpage being provided as a less-than perfect value for the quality score.

13. A computer-implemented system, comprising:

one or more processors; and one or more computer-readable devices including instructions that, when executed by the one or more processors, cause the computer-implemented system to perform operations that include:

identifying a user-selected website to evaluate, the user-selected website comprising multiple webpages;

retrieving code for the multiple webpages of the user-selected website from one or more web server systems that host the user-selected website;

locally executing and interpreting the code to render the multiple webpages as client computing devices would render the multiple webpages;

receiving an indication that user input at a remote computing device indicated user-specified criteria that specify webpage characteristics, wherein the user-specified criteria comprises a combination of criteria that spans across multiple different types of webpage elements, wherein the combination of criteria comprises webpage content, webpage code elements, user webpage behavior, and webpage performance metrics, wherein the webpage content is dynamic content that is displayed to a user as executed in a browser at a client computing device, wherein the webpage code elements are static content from webpage files that are provided by the web server systems that host the user-selected website, wherein the user webpage behavior is determined from user data and browser data indicating user interactions with the dynamic content, wherein the webpage performance metrics are generated from one or more search engines;

determining a first matching subset of webpages from the user-selected website that satisfy the user-specified criteria, including identifying an initial quantity of webpages of the user-selected website that satisfy the user-specified criteria and form the first matching subset of webpages;

iteratively tagging each webpage in the first matching subset of webpages as a key page amongst the multiple webpages of the user-selected website based on a process comprising:

retrieving data indicating at least user behavior associated with the webpage, determining whether the retrieved data for the webpage satisfies the user-specified criteria, and tagging the webpage based on a determination that the retrieved data satisfies the user-specified criteria; and returning information to the remote computing device to cause the remote computing device to present (i) an indication of the initial quantity of webpages that satisfy the user-specified criteria, and (ii) information associated with the initial quantity of webpages to be used for modifying at least one of the tagged webpages.

14. The computer-implemented system of claim 13, the operations further comprising:

providing information to the remote computing device to cause the remote computing device to present a user interface that:

(i) includes a first section that lists multiple different available types of criteria;

(ii) includes a second section provides a region to present user-selected types of criteria; and (iii) is configured to receive user input to transfer a first type of criteria of the multiple different types of criteria from the first section to the second section to add the first type of criteria as a user-selected type of criteria.

15. The computer-implemented system of claim 14, wherein:

receiving user input to transfer the first type of criteria from the first section to the second section includes receiving user selection of a visual depiction of the first type of criteria within the first section of the user interface.

16. The computer-implemented system of claim 14, wherein:

responsive to receiving user input to transfer the first type of criteria from the first section to the second section, the user interface is configured to add a visual depiction of the first type of criteria to the second section of the user interface.

17. The computer-implemented system of claim 16, wherein:

responsive to receiving user input to transfer the first type of criteria from the first section to the second section, the user interface is configured to remove the visual depiction of the first type of criteria from the first section of the user interface.

18. The computer-implemented system of claim 16, wherein:

the visual depiction of the first type of criteria within the first section of the user interface includes no user-editable field; and the visual depiction of the first type of criteria within the second section of the user interface after its addition to the second section of the user interface includes a user-editable field.

19. The computer-implemented system of claim 18, wherein the user input at the remote computing device that indicated user-specified criteria includes user input that interacts with the user-editable field to specify a first value.

20. The computer-implemented system of claim 19, the operations further comprising:

receiving an indication that user input at the remote computing device interacted with the user-editable field to change the field from the first value to a second value, to update the user-specified criteria to an updated user-specified criteria;

determining a second matching subset of webpages of the user-selected website that satisfy the updated user-specified criteria, including identifying an updated quantity of webpages of the user-selected website that satisfy the updated user-specified criteria and form the second matching subset of webpages, the updated quantity of webpages being different from the initial quantity of webpages; and returning information to the remote computing device to cause the remote computing device to modify presentation of (i) the indication of the quantity of webpages that satisfy the user-specified criteria, to (ii) an indication of the updated quantity of webpages that satisfy the updated user-specified criteria.

* * * * *